(12) United States Patent
Kobayashi et al.

(10) Patent No.: US 7,712,921 B2
(45) Date of Patent: *May 11, 2010

(54) LIGHT SOURCE DEVICE, METHOD OF MANUFACTURING LIGHT SOURCE, AND PROJECTOR

(75) Inventors: Hiroyuki Kobayashi, Matsumoto (JP); Shohei Fujisawa, Matsumoto (JP); Yuji Takado, Matsumoto (JP); Takeshi Takezawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 164 days.

This patent is subject to a terminal disclaimer.

(21) Appl. No.: 12/000,418

(22) Filed: Dec. 12, 2007

(65) Prior Publication Data

US 2008/0186458 A1      Aug. 7, 2008

Related U.S. Application Data

(63) Continuation of application No. 10/849,891, filed on May 21, 2004, now Pat. No. 7,329,011.

(30) Foreign Application Priority Data

May 22, 2003   (JP) ............................. 2003-145125
Sep. 12, 2003   (JP) ............................. 2003-321447

(51) Int. Cl.
*F21V 7/04* (2006.01)

(52) U.S. Cl. .................... 362/255; 362/256; 362/304; 353/99

(58) Field of Classification Search ................. 362/263, 362/297, 298, 300, 302–305, 346, 255, 256; 353/99

See application file for complete search history.

(56) References Cited

U.S. PATENT DOCUMENTS

| 3,752,579 A | 8/1973 | Keller et al. |
| 5,803,592 A | 9/1998 | Lawson |

(Continued)

FOREIGN PATENT DOCUMENTS

JP    A 05-087630    4/1993

(Continued)

*Primary Examiner*—Thomas M Sember
(74) *Attorney, Agent, or Firm*—Oliff & Berridge, PLC

(57) ABSTRACT

A light source unit comprising an arc tube 11 having a light emitting section 111 sealed sections 1121, 1122, an oval reflector 12, and a secondary reflecting mirror 13 for covering the front side of the arc tube 11 and reflecting a luminous flux radiated from the arc tube 11 toward the oval reflector 12, the center of discharging emission from the arc tube 11 is disposed at a first focal position L1 of the oval reflector 12, and the secondary reflecting mirror 13 is configured as a separate member from the arc tube 11, so that the outer peripheral portion of the secondary reflecting mirror 13 is accommodated within a circular cone shown by boundaries L3, L4 connecting a second focal position L2 of the oval reflector 12 and the distal end of the sealed section 1122 of the arc tube 11 when being mounted to the front sealed section 1122 of the arc tube 11.

10 Claims, 30 Drawing Sheets

U.S. PATENT DOCUMENTS

| | | |
|---|---|---|
| 6,734,628 B2 | 5/2004 | Seki et al. |
| 7,145,665 B2 | 12/2006 | Iwadare et al. |
| 7,377,670 B2 * | 5/2008 | Takezawa .................. 362/264 |
| 2005/0024880 A1 | 2/2005 | Moench et al. |
| 2005/0218769 A1 | 10/2005 | Ritz et al. |

FOREIGN PATENT DOCUMENTS

| | | |
|---|---|---|
| JP | U 05-031102 | 4/1993 |
| JP | A 05-313117 | 11/1993 |
| JP | A 06-289394 | 10/1994 |
| JP | A 08-031382 | 2/1996 |
| JP | A 08-064180 | 3/1996 |
| JP | A 08-069775 | 3/1996 |
| JP | A 08-069777 | 3/1996 |
| JP | A 09-120067 | 5/1997 |
| JP | A 11-143378 | 5/1999 |
| JP | A 2000-357405 | 12/2000 |
| JP | A 2001-125197 | 5/2001 |
| JP | A 2002-006396 | 1/2002 |
| JP | A 2003-109404 | 4/2003 |
| JP | A 2003-109405 | 4/2003 |
| WO | WO 02/055925 | 7/2002 |

* cited by examiner (A)

(B)

(A)

(B)

(A)

(B)

(A)

(B)

(A)

(B)

(A)

(B)

(C)

(A)

(B)

(C)

_LIGHT SOURCE DEVICE, METHOD OF MANUFACTURING LIGHT SOURCE, AND PROJECTOR_

This is a Continuation of application Ser. No. 10/849,891 filed May 21, 2004, now U.S. Pat. No. 7,329,011. The disclosure of the prior application is hereby incorporated by reference herein in its entirety.

FIELD OF THE INVENTION

The present invention relates to a light source unit including: an arc tube having a light emitting section in which discharging emission between electrodes is performed out and sealed sections provided at both ends of the light emitting section; an oval reflector for emitting a luminous flux radiated from the arc tube in a certain uniform direction; and a secondary reflecting mirror having a reflecting surface opposed to a reflecting surface of the oval reflector, covering the front side of the arc tube in the direction of emission of the luminous flux and reflecting the luminous flux radiated from the arc tube toward the oval reflector, and a projector having the light source unit, and a method of manufacturing the light source unit.

DESCRIPTION OF THE RELATED ART

In the related art, a projector for enlarging and projecting an optical image by modulating a luminous flux emitted from a light source according to image information is used. Such a projector is used for presentation in conferences or the like with a personal computer. Also, in response to desire to view movies or the like on a large screen at home, this kind of projector is used for a home theater.

As a light source of this type of projector, an electric discharging arc tube such as a metal halide lamp, or a high-pressure mercury lamp is used, and the electric discharging arc tube includes a spherical light emitting section in which discharging emission is carried out between a pair of electrodes disposed at a distance from each other, and sealed sections provided at both ends of the light emitting section and containing metal foil for applying voltage to the electrodes therein.

As regards the electric discharging arc tube, as described in JP-A-8-69775 (See [0020] and FIG. 2), for example, an electric discharging arc tube formed with a reflecting and thermal insulating film containing silica/alumina deposited thereon on the front portion of the light-emitting section on the luminous flux outgoing side is proposed.

According to this type of electric discharging arc tube, since the luminous flux radiated from the light-emitting section is converted into heat at the reflecting and thermal insulating film, which contributes to increase in temperature in the light-emitting section, a vapor pressure of additive in the arc tube, such as halogen, can be stabilized, whereby unevenness of color or unevenness of illumination intensity of the projected image of the projector caused by the electric discharging arc tube can be advantageously prevented.

DISCLOSURE OF THE INVENTION

However, since the reflecting and protecting film of the electric discharging arc tube in the related art is formed of mixture of white alumina and silica coated thereon, there are problems in that the reflecting efficiency of the reflecting and protecting film is low and hence the luminous efficiency of light emitted from the light emitting section is low, so that the illumination intensity of the light source unit is lowered.

In addition, since the reflecting and protecting film is formed by deposition, there is also a problem in that the reflecting surface of the film depends on the external shape of the spherical light emitting section of the arc tube, and hence the optimal reflecting surface for using as light from a light source cannot be necessarily formed.

An object of the present invention is to provide a light source unit which can significantly improve the luminous efficiency of light from the light source using a secondary reflecting mirror having a reflecting surface disposed so as to oppose to a reflecting surface of an oval reflector, a projector, and a method of manufacturing the light source unit.

The light source unit of the present invention includes: an arc tube having a light emitting section in which discharging emission is performed between electrodes and sealed sections provided at both ends of the light emitting section; an oval reflector for emitting a luminous flux radiated from the arc tube in a certain uniform direction, and a secondary reflecting mirror having a reflecting surface disposed so as to oppose a reflecting surface of the oval reflector, covering the front side of the arc tube, and reflecting the luminous flux radiated from the arc tube toward the oval reflector, characterized in that the sealed sections are provided on the front side and the rear side of the light emitting section, the arc tube includes the center of electric discharging light emission disposed at a first focal position of the oval reflector, in that the secondary reflecting mirror is mounted on the front sealed section of the arc tube as a separate member from the arc tube, in that the outer peripheral portion of the secondary reflecting mirror is accommodated within a circular cone shown by a line connecting a second focal position of the oval reflector and the distal end of the front sealed section of the arc tube.

According to the above-described configuration of the present invention, since the secondary reflecting mirror is a separate member, a reflecting film does not depend on the external shape of the light emitting section as in the case of depositing the reflecting film on the light emitting section of the arc tube. Therefore, since the reflecting surface can be formed into a shape which realizes an effective use of light reflected by the secondary reflecting mirror in the oval reflector and, in addition, the positional adjustment can be performed among the arc tube, the secondary reflecting mirror, and oval reflector, the luminous efficiency of light from the light source can be significantly improved in the light source unit using the secondary reflecting mirror.

Also, since the outer peripheral portion of the secondary reflecting mirror is accommodated within the circular cone shown by the lines connecting between the second focal position of the oval reflector and the distal end of the front sealed section of the arc tube, light reflected by the oval reflector is not intercepted by the outer peripheral portion of the secondary reflecting mirror and the front sealed section, and hence the luminous efficiency of light from the light source can further be improved.

Preferably, in the present invention, the secondary reflecting mirror preferably covers the light emitting section so that the angle θ becomes 105° or below, where θ represents the maximum angle formed between the rear portion of the center axis of the luminous flux emitted from the oval reflector and the luminous flux emitted from the arc tube and directly entering the oval reflector.

According to the above-described configuration of the present invention, since the secondary reflecting mirror covers the light emitting section so that the maximum angle θ formed between the rear portion of the center axis of the luminous flux emitted from the oval reflector in the direction of emission of the luminous flux and the luminous flux emitted from the arc tube and directly entering the oval reflector becomes 105° or smaller, the length of the luminous flux emitted from the oval reflector in the direction of the center axis, can be reduced, and hence the light source unit can be downsized.

Preferably, in the present invention, the rear end surface of the secondary reflecting mirror is formed into such inclined surface that the angle formed between the rear portion of the center axis of the luminous flux emitted from the oval reflector is larger than the angle θ, where θ represents the maximum angle formed between the rear portion of the center axis of the luminous flux emitted from the oval reflector and the luminous flux emitted from the arc tube and entering the oval reflector.

According to the above-described configuration of the present invention, since the rear end surface of the secondary reflecting mirror is formed so that the angle formed between the rear portion of the center axis of the luminous flux emitted from the oval reflector in the direction of emission of the luminous flux and the rear end surface of the secondary reflecting mirror is larger than the maximum angle θ formed between the rear portion of the center axis of the luminous flux emitted from the oval reflector in the direction of emission of the luminous flux and the luminous flux emitted from the arc tube and directly entering the oval reflector, the luminous flux emitted from the arc tube can be guided into the oval reflector without being intercepted by the rear end surface of the secondary reflecting mirror in the direction of emission of the luminous flux, and hence the light emitted from the arc tube can be used positively as light from the light source.

Preferably, in the present invention, the secondary reflecting mirror has an outer peripheral surface of a truncated conical shape which is tapered gradually toward the distal end of the front sealed section.

Further preferably, in the present invention, the angle of inclination of the outer peripheral surface of the secondary reflecting mirror of a truncated conical shape with respect to the center axis of the luminous flux emitted from the oval reflector is substantially equal to, or larger than the angle of inclination of the line connecting the second focal position and the distal end of the front sealed section with respect to the center axis of the luminous flux emitted from the oval reflector.

According to the above-described configuration of the present invention, since the secondary reflecting mirror has the outer peripheral surface of a truncated conical shape, interception of light around the outer peripheral portion of the secondary reflecting mirror can be prevented easily and, in particular, interception of light around the outer peripheral portion of the secondary reflecting mirror can be prevented positively by setting the angle of inclination of the outer peripheral surface of the secondary reflecting mirror of a truncated conical shape with respect to the center axis of the luminous flux emitted from the oval reflector is substantially equal to, or larger than the angle of inclination of the line connecting the second focal position and the distal end of the front sealed section with respect to the center axis of the luminous flux emitted from the oval reflector, the luminous efficiency of light from the light source can further be improved. Also, by forming the outer peripheral surface of the secondary reflecting mirror in the shape described above, the cross-sectional area of the secondary reflecting mirror in the direction of optical axis can be increased, the strength of the secondary reflecting mirror can be improved.

Preferably, in the preset invention, the reflecting surface of the secondary reflecting mirror has a spherical surface corresponding to the external shape of the light emitting section, and the outer peripheral surface of the secondary reflecting mirror is a spherical surface having the center of curvature positioned forwardly of the center of curvature of the reflecting surface on the center axis of the luminous flux emitted form the oval reflector.

According to the above-described configuration of the present invention, since the thicknesses of the reflecting surface and the outer peripheral surface of the secondary reflecting mirror can be determined to be thinner on the rear portion of the secondary reflecting mirror and thicker on the front portion thereof by displacing the center of the curvature of the outer peripheral surface from the center of the curvature of the reflecting surface forwardly in the direction of emission of the luminous flux on the center axis of the luminous flux emitted from the oval reflector, the secondary reflecting mirror can easily be accommodated within a circular cone shown by the line connecting between the second focal position of the oval reflector and the distal end of the front sealed section on the rear portion of the secondary reflecting mirror, and can be increased in adhering area on the front side of the reflecting mirror, and hence the adhesive strength between the arc tube and the secondary reflecting mirror can be improved.

Preferably, in the present invention, the secondary reflecting mirror includes a reflecting surface formed by polishing the inner surface of the cylindrical member into a curved surface corresponding to the external shape of the light emitting section, and being formed with a reflecting film on the inner surface of the cylindrical member.

According to the above-described configuration of the present invention, since the reflecting surface can be formed by polishing the multi-purpose cylindrical member and hence accuracy of the curvature of the reflecting surface, for example, can be improved, the luminous efficiency of light from the light source can further be improved.

In the present invention, the secondary reflecting mirror is preferably formed into a bowl shape obtained by polishing the outer peripheral portion of the cylindrical member so as to follow the curved polished portion on the inner surface of the cylindrical member.

According to the above-described configuration of the present invention, since surface accuracy of the outer peripheral portion can be ensured by polishing the outer peripheral portion of the secondary reflecting mirror, interception of light by the secondary reflecting mirror is reliably prevented and hence the luminous efficiency of light from the light source can further be improved.

Also, by polishing the inner surface and the outer peripheral portion, material constituting the secondary reflecting mirror is hardly be exerted to a mechanical load, and hence compact and light-weight secondary reflecting mirror is achieved.

Preferably, in the present invention, the secondary reflecting mirror includes an inclined surface, whereof the angle of inclination with respect to the rear portion of the center axis of the luminous flux emitted from the oval reflector is larger than the angle θ when the secondary reflecting mirror is mounted to the front sealed section of the arc tube, where θ represents the maximum angle formed between the rear portion of the center axis of the luminous flux emitted from the oval reflector and the luminous flux emitted from the arc tube and directly entering the oval reflector, and is formed by polishing the end surface of the cylindrical member on the side where the reflecting surface is polished.

According to the above-described configuration of the present invention, since the inclined surface formed by polishing the end surface of the cylindrical member on the side where the reflecting surface is polished is formed to have an angle of inclination larger than the maximum angle θ formed between the rear portion of an illumination axis in the direction of emission of the luminous flux and the luminous flux emitted from the arc tube and directly entering the oval reflector when the secondary reflecting mirror is mounted to the sealed section on the distal side of the arc tube, light emitted from the arc tube can enter the oval reflector without being intercepted by the end surface of the cylindrical member on the side where the reflecting surface is polished, and hence the luminous efficiency of light from the light source can be improved reliably while preventing the secondary reflecting mirror from intercepting light emitted from the light emitting section.

Preferably, in the present invention, the secondary reflecting mirror is formed by integrally press-molding the inner surface and the outer peripheral portion in a curved surface corresponding to the external shape of the light emitting section, and is formed with a neck portion extending toward the distal end of the front sealed section at the front end of the secondary reflecting mirror.

According to the above-described configuration of the present invention, since the secondary reflecting mirror can be manufactured by press-molding, the secondary reflecting mirror with a high degree of accuracy can be manufactured in large quantities for a short time.

Also, since there is the neck portion formed on the secondary reflecting mirror, the adhering area with respect to the sealed section can be increased, and hence the secondary reflecting mirror can be firmly fixed to the arc tube.

Preferably, in the present invention, the secondary reflecting mirror is provided with translucency so that the adhering surface can be seen from the outer peripheral surface.

According to the above-described configuration of the present invention, the filling amount of an adhesive agent can be adjusted so as not to flow over the reflecting surface while viewing the filling state of the adhesive agent between the adhering surface and the sealed section from the outside.

Therefore, hindering of the reflective property of the secondary reflecting mirror by the adhesive agent can be prevented. In addition, since management of filling of the adhesive agent is easy as described above, the opposing areas the adhering surface and the sealed section can be reduced and hence the large reflecting surface can be secured, thereby contributing to improvement of the luminous efficiency of light from the light source.

Preferably, in the present invention, the secondary reflecting mirror has an adhering surface opposing to the outer peripheral surface of the front sealed section of the arc tube, and is fixed to the arc tube by applying the adhesive agent between the outer peripheral surface of the front sealed section and the adhering surface.

More preferably, in the present invention, the adhering surface is not applied with a reflecting film which forms the reflecting surface of the secondary reflecting mirror.

According to the above-described configuration of the present invention, since the adhering surface of the secondary reflecting mirror and the outer peripheral surface of the sealed section are fixed by the adhesive agent, and hence the secondary reflecting mirror can be firmly mounted to the front sealed section of the arc tube, positional displacement between the secondary reflecting mirror and the arc tube is prevented, and hence the optimal state of using of light from the light source can be maintained.

In the present invention, the adhesive agent may be applied entirely between the outer peripheral surface of the front sealed section and the adhesive surface, and it may be applied intermittently.

When applying intermittently, the adhesive agent is preferably applied on the cross-sections of the sealed section and the secondary reflecting mirror taken along the plane orthogonal to the illumination axis at three or four places about the axis.

According to the above-described configuration of the present invention, when applying the adhesive agent entirely, since the entire surface of the outer peripheral portion of the front sealed section and the adhering surface of the secondary reflective mirror is fixed by the adhesive agent, adhesion and fixation between the arc tube and the secondary reflecting mirror can be enhanced. On the other hand, when applying intermittently, a gap is formed at the adhered portion, and hence the space between the light emitting section and the reflecting surface of the secondary reflecting mirror can be communicated with the external space via the space, and cooling of the light emitting section can be performed.

Preferably, in the present invention, the adhering surface is formed into a tapered surface so as to gradually approach the outer peripheral surface of the front sealed section from side of the outer peripheral surface of the secondary reflecting mirror toward the reflecting surface.

According to the above-described configuration of the present invention, when the secondary reflecting mirror is mounted to the sealed section on the distal side of the arc tube and thereafter the adhesive agent for fixation is applied thereto for fixing the same, the adhesive agent can easily be injected into the space between the outer peripheral surface of the sealed section and the adhering surface, and hence the fixing operation can be facilitated.

Preferably, in the present invention, the adhering surface is formed into a tapered surface so as to gradually approach the outer peripheral surface of the front sealed section from the side of the reflecting surface of the secondary reflecting mirror to the side of the outer peripheral surface thereof.

In addition, preferably, in the present invention, the angle of the tapered surface is set to the range between 1° and 10° inclusive with respect to the center axis of the luminous flux emitted from the oval reflector.

According to the above-described configuration of the present invention, after the adhesive agent filled between the tapered surface which is formed so as to gradually approach the outer peripheral surface of the front sealed section from the reflecting surface of the secondary reflecting mirror toward the outer peripheral surface and the outer peripheral surface of the front sealed section has cured, the secondary reflecting mirror may be mechanically restricted from moving rearwardly of the direction of emission of the luminous flux with respect to the arc tube.

In addition, by setting the angle of the tapered surface to the range between 1° and 10° inclusive with respect to the center axis of the luminous flux emitted from the oval reflector, the sufficient area of the reflecting surface is ensured and the luminous flux radiated from the light emitting section can be utilized laconically, thereby contributing to the luminous efficiency of light from the light source while restricting the movement of the secondary reflecting mirror.

Preferably, in the present invention, the adhering surface includes a surface continuing from the reflecting surface of the secondary reflecting mirror and is formed with a shoulder projecting toward the front sealed section.

According to the above-described configuration of the present invention, since the adhesive agent filled between the adhering surface and the sealed section is blocked by the shoulder, the adhesive agent is prevented from being flown over and contaminating the reflecting surface.

Also, on the side of the reflecting surface, since the area of the reflecting surface can be increased due to the presence of the shoulder, the luminous efficiency of light can be improved. At the same time, on the side of the outer peripheral surface, the distance between the adhering surface and the sealed section can be increased, and hence the adhesive agent can easily be filled in.

Furthermore, after the adhesive agent has cured, the secondary reflecting mirror may be mechanically restricted from moving rearwardly of the direction of emission of the luminous flux with respect to the arc tube because of the presence of the shoulder.

Preferably, in the present invention, a chamfered portion is formed at the meeting point between the rear end surface of the secondary reflecting mirror and the adhering surface.

According to the above-described configuration of the present invention, since the chamfered portion is formed at the meeting point between the adhering surface of the secondary reflecting mirror and the outer peripheral surface, the adhesive agent can be flown between the outer peripheral surface of the sealed section and the adhering surface when mounting the secondary reflecting mirror to the sealed section on the distal side of the arc tube and then applying the adhesive agent for fixation thereof and fixing the same, so that fixing operation can be facilitated.

Preferably, in the present invention, the secondary reflecting mirror is formed with a plurality of grooves by notching the ridge at the meeting point between the rear end surface of the secondary reflecting mirror and the adhering surface.

According to the above-described configuration of the present invention, when the adhesive agent filled in the groove formed on the ridge at the meeting point between the rear end surface of the secondary reflecting mirror and the adhering surface is cured, rotation of the secondary reflecting mirror with respect to the arc tube is restricted, and hence displacement of the secondary reflecting mirror can be prevented. Therefore, lowering of the illumination intensity of illumination emitted from the light source unit is prevented.

Also, preferably, in the present invention, the adhesive agent applied between the adhering surface of the secondary reflecting mirror and the outer peripheral surface of the front sealed section is applied so as to be mounded on the outer peripheral surface of the secondary reflecting mirror.

According to the above-described configuration of the present invention, since the adhesive agent is applied so as to be mounted on the outer peripheral surface of the secondary reflecting mirror, the secondary reflecting mirror may be restricted from moving forward in the direction of emission of the luminous flux with respect to the arc tube after the adhesive agent is cured. Therefore, the secondary reflecting mirror can be held and fixed to the arc tube reliably.

According to the combination of the tapered surface and the adhesive agent mounded on the outer peripheral surface, the meeting point with respect to the outer peripheral surface of the secondary reflecting mirror is formed into an acute angle, and hence the adhesive agent is filled in such a manner that the portion of acute angle clamps the adhering surface and the outer peripheral surface from both sides to achieve firm adhesion, whereby movement of the secondary reflecting mirror is restricted further reliably.

A method of manufacturing a light source unit according to the present invention is a method of manufacturing a light source unit for manufacturing a light source including an arc tube having a light emitting section in which discharging emission is performed between electrodes and sealed sections provided at both ends of the light emitting section; an oval reflector for emitting a luminous flux radiated from the arc tube in a certain uniform direction, and a secondary reflecting mirror having a reflecting surface disposed so as to oppose a reflecting surface of the oval reflector, covering the front side of the arc tube in the direction of emission of the luminous flux, and reflecting the luminous flux emitted from the arc tube toward the oval reflector, including the steps of inserting the secondary reflecting mirror to the sealed section of the arc tube which is positioned and held so that the center of discharging emission is located in the vicinity of a first focal position of the oval reflector in advance, and illuminating the arc tube; detecting the illumination intensity of a luminous flux emitted from the oval reflector by illuminating the arc tube; adjusting the position of the secondary reflecting mirror with respect to the arc tube while detecting the illumination intensity of the luminous flux so that the detected illumination intensity becomes the largest value; and fixing the secondary reflecting mirror to the arc tube at the position where the detected illumination intensity becomes the largest value.

Here, although detection of the illumination intensity may be performed by directly measuring the illumination flux emitted from the oval reflector, it is also possible to measure the illumination flux which is passed through an optical system which constitutes optical instrument in which the light source unit is used. Measurement of the illumination intensity can be made by image processing using a CCD camera, by an illuminometer, or by an integrating sphere.

According to the above-described configuration of the present invention, since the secondary reflecting mirror can be fixed to the arc tube at an optimal illumination intensity by adjusting the position of the secondary reflecting mirror with respect to the arc tube so that the highest illumination intensity is detected while detecting the illumination intensity of the luminous flux from the arc tube reflected directly on the oval reflector and the illumination intensity of the luminous flux advancing via the secondary reflecting mirror and reflected on the oval reflector, the light source unit in which the luminous efficiency of light from the light source is significantly improved can be manufactured reliably.

Another method of manufacturing a light source unit of the present invention is a method of manufacturing a light source unit including: an arc tube having a light emitting section in which discharging emission is performed between electrodes and sealed sections provided at both ends of the light emitting section; an oval reflector for emitting a luminous flux radiated from the arc tube in a certain uniform direction, and a secondary reflecting mirror having a reflecting surface disposed so as to oppose a reflecting surface of the oval reflector, covering the front side of the arc tube in the direction of emission of the luminous flux, and reflecting the luminous flux radiated from the arc tube toward the oval reflector, including the steps of: inserting the secondary reflecting mirror to the sealed section of the arc tube which is positioned and held so that the center of discharging emission is located in the vicinity of a first focal position of the oval reflector in advance, and illuminating the arc tube; detecting an arc image formed between the electrodes in the arc tube and a reflected arc image formed by being reflected on the secondary reflecting mirror; adjusting the position of the secondary reflecting mirror with respect to the arc tube while detecting the arc image and the reflected arc image, so that the arc image and the reflected arc image overlap partly with each other; and fixing the secondary reflecting mirror to the arc tube at the position where the arc image and the reflected arc image overlap partly with each other.

According to the above-described configuration of the present invention, since both of the arc images contribute to improve light from the light source by preventing temperature increase within the light emitting section due to plasma absorption in association with the overlap of the arc image and the reflected arc image, the light source unit in which the luminous efficiency of light from the light source is positively improved can be manufactured easily with high degree of accuracy.

Another method of manufacturing a light source unit according to the present invention is a method of manufacturing a light source unit including: an arc tube having a light emitting section in which discharging emission is performed between electrodes and sealed sections provided at both ends of the light emitting section; an oval reflector for emitting a luminous flux radiated from the arc tube in a certain uniform direction, and a secondary reflecting mirror having a reflecting surface disposed so as to oppose a reflecting surface of the oval reflector, covering the front side of the arc tube in the direction of emission of the luminous flux, and reflecting the luminous flux radiated from the arc tube toward the oval reflector, including the steps of: inserting the secondary reflecting mirror to the sealed section of the arc tube which is held by the oval reflector in advance; detecting image of the electrodes and the reflected image of the electrodes detected as the reflected image of the secondary reflecting mirror; adjusting the position of the secondary reflecting mirror with respect to the arc tube so that displacement of the image of the electrodes and the reflected image of the electrodes become a predetermined amount of deviation while detecting the image of the electrodes and the reflected image of the electrodes; and fixing the secondary reflecting mirror to the arc tube at the position where displacement of the image of the electrodes and the reflected image of the electrodes become to the predetermined amount of deviation.

According to the above-described configuration of the present invention, the position where the image of the electrodes and the reflected image of the electrodes are formed can be figured out without illuminating the arc tube, the step of illuminating the arc tube can be omitted. Also, since the image of the electrodes and the image of the reflected electrodes are displaced by the predetermined amount of deviation, temperature increase in the light emitting section due to plasma absorption in association with the overlap of the arc image and the reflected arc image, which is generated when the arc tube is illuminated may be prevented to make both of the arc images contribute to improve light from the light source, and hence the light source unit in which the luminous efficiency of light from the light source is positively improved can be manufactured easily with high degree of accuracy.

Another method of manufacturing a light source unit including: an arc tube having a light emitting section in which discharging emission is performed between electrodes and sealed sections provided at both ends of the light emitting section; an oval reflector for emitting a luminous flux radiated from the arc tube in a certain uniform direction, and a secondary reflecting mirror having a reflecting surface disposed so as to oppose a reflecting surface of the oval reflector, covering the front side of the arc tube in the direction of emission of the luminous flux, and reflecting the luminous flux radiated from the arc tube toward the oval reflector, including the steps of: inserting the secondary reflecting mirror to the sealed section of the arc tube which is positioned and held so that the center of discharging emission is located in the vicinity of a first focal position of the oval reflector; calculating the center of curvature of the reflecting surface from the curvature of the reflecting surface of the secondary reflecting mirror; calculating the center of discharging emission between the electrodes from the positions of the electrodes; adjusting the secondary reflecting mirror to the arc tube so that positional displacement between the center of curvature and the center of light emission becomes a predetermined amount of deviation based on the calculated center of curvature of the reflecting surface of the secondary reflecting mirror and center of light emission between the electrodes; and fixing the position of the secondary reflecting mirror with respect to the arc tube at the position where displacement between the center of curvature and the center of light emission becomes the predetermined amount of deviation.

According to the above-described configuration of the present invention, since the center of curvature of the reflecting surface of the secondary reflecting mirror and the center of light emission between the electrodes can be calculated and figured out without illuminating the arc tube on, the step of illuminating the arc tube can be omitted. Also, since the center of curvature of the reflecting surface of the secondary reflecting mirror and the center of light emission between the electrodes are displaced by the predetermined amount of deviation, temperature increase within the light emitting section due to plasma absorption in association with the overlap between the arc image and the reflected arc image generated when the arc tube is illuminated is prevented to make both of the arc images contribute to improve light from the light source, and hence the light source unit in which the luminous efficiency of light from the light source is positively increased can be manufactured easily with high degree of accuracy.

Preferably, in the method of manufacturing a light source unit and another method of manufacturing a light source unit according to the present invention, the step of fixing the secondary reflecting mirror to the arc tube performed by applying the adhesive agent to the sealed section and the secondary reflecting mirror and curing the adhesive agent after the step of adjusting the position of the secondary reflecting mirror with respect to the arc tube.

According to the above-described configuration of the present invention, since the adhesive agent is applied to the sealed section and the secondary reflecting mirror after the position of the secondary reflecting mirror with respect to the arc tube is adjusted, the position can be adjusted without the possibility that the adhesive agent is cured during adjustment of the position of the secondary reflecting mirror, and in addition, the adhesive agent may be prevented from contaminating other portions of the arc tube during positional adjustment.

Preferably, in the method of manufacturing a light source unit or another method of manufacturing a light source unit according to the present invention, the step of fixing the secondary reflecting mirror to the arc tube is performed by curing and fixing the adhesive agent applied before the step of adjusting the position of the secondary reflecting mirror with respect to the arc tube.

According to the above-described configuration of the present invention, since the adhesive agent is interposed between the sealed section and the secondary reflecting mirror before adjusting the position of the secondary reflecting mirror with respect to the arc tube, the adhesive agent can be distributed evenly on the adhesive surface of the sealed section and the secondary reflecting mirror upon positional adjustment, and hence the manufacturing method can be simplified and the strong adhesion and fixation are achieved.

The projector according to the present invention is a projector for forming an optical image by modulating a luminous flux emitted from a light source according to image information and projecting the enlarged image, characterized in that the aforementioned light source unit or the light source unit obtained by the aforementioned method of manufacturing the light source unit is provided.

According to the above-described configuration of the present invention, since the light source unit has operation and effects as described above, the same operation and the effects may be obtained, and the projector in which the luminous efficiency of light from the light source is significantly improved is obtained.

BRIEF DESCRIPTION OF THE DRAWINGS

FIG. 1 is a diagram showing the structure of a projector according to an embodiment of the present invention.

FIG. 2 is a diagram showing the structure of a light source unit according to a first embodiment of the present invention.

FIG. 3 is a schematic perspective view showing the structure of a light source lamp according to the first embodiment of the present invention.

FIG. 4 shows a front view and a cross-sectional view of the structure of a secondary reflecting mirror according to the first embodiment of the present invention.

FIG. 5 is a cross-sectional view taken along the direction of the optical axis showing a state in which the secondary reflecting mirror is fixed to the light source lamp according to the first embodiment of the present invention.

FIG. 6 is a cross-sectional view taken along the direction of the optical axis and in the direction orthogonal to the optical axis, showing a state in which an adhesive agent is applied according to the first embodiment of the present invention.

FIG. 7 is a cross-sectional view taken along the direction of the optical axis and the direction orthogonal to the optical axis, showing a state in which the adhesive agent is applied according to the first embodiment of the present invention.

FIG. 8 is a side view showing a manufacturing device for the light source unit according to the first embodiment of the present invention.

FIG. 9 is a side view showing the structure of a secondary reflecting mirror holder constituting the manufacturing device according to the first embodiment of the present invention.

FIG. 10 is a plan view showing the structure of the secondary reflecting mirror holder constituting the manufacturing device according to the first embodiment of the present invention.

FIG. 11 is a front view showing the shape of a grip member of the secondary reflecting mirror holder according to the first embodiment of the present invention.

FIG. 12 is a flowchart showing a method of manufacturing the light source unit according to the first embodiment of the present invention.

FIG. 13 is a diagram showing a method of applying the adhesive agent according to the first embodiment of the present invention.

FIG. 14 is a cross-sectional view showing the structure of a principal portion of the secondary reflecting mirror according to a second embodiment of the present invention.

FIG. 15 is a cross-sectional view showing the structure of the principal portion of the secondary reflecting mirror according to the second embodiment of the present invention.

FIG. 16 is a cross-sectional view showing the structure of the principal portion of the secondary reflecting mirror constituting the light source unit according to a third embodiment of the present invention.

FIG. 17 is a cross-sectional view showing the structure of the principal portion of the secondary reflecting mirror constituting the light source unit according to a fourth embodiment of the present invention.

FIG. 18 is a cross-sectional view showing a masking state of the secondary reflecting mirror according to the fourth embodiment of the present invention.

FIG. 19 is a cross-sectional view showing the structure of a principal portion of the secondary reflecting mirror constituting the light source unit according to a fifth embodiment of the present invention.

FIG. 20 is a cross-sectional view showing the structure of a principal portion of the secondary reflecting mirror constituting the light source unit according to a sixth embodiment of the present invention.

FIG. 21 is a cross-sectional view showing the structure of a principal portion of the secondary reflecting mirror constituting the light source unit according to a seventh embodiment of the present invention.

FIG. 22 is a cross-sectional view showing the structure of a principal portion of the secondary reflecting mirror constituting the light source unit according to an eighth embodiment of the present invention.

FIG. 23 is a cross-sectional view showing the structure of the principal portion of the secondary reflecting mirror constituting the light source unit according to the eighth embodiment of the present invention.

FIG. 24 shows a cross-sectional view showing the structure of the principal portion of the secondary reflecting mirror constituting the light source unit and a plan view of the same when viewed from the front side in the direction of emission of the luminous flux according to the eighth embodiment of the present invention.

FIG. 25 is a cross-sectional view showing the structure of a principal portion of the secondary reflecting mirror constituting the light source unit according to a ninth embodiment of the present invention.

FIG. 26 is a cross-sectional view showing the structure of a principal portion of the secondary reflecting mirror constituting the light source unit according to a tenth embodiment of the present invention.

FIG. 27 is a flowchart showing a method of manufacturing the light source unit according to the eleventh embodiment of the present invention.

FIG. 28 is a diagram showing a method of applying the adhesive agent according to an eleventh embodiment of the present invention.

FIG. 29 is a diagram showing a procedure of determination of the optimal value for the amount of displacement between an arc image and a reflected arc image according to the eleventh embodiment of the present invention.

FIG. 30 is a diagram showing a procedure of determination of the optimal value for the amount of displacement between an image of electrodes and a reflected image of the electrodes according to a method of manufacturing the light source unit according to a twelfth embodiment of the present invention.

FIG. 31 is a diagram showing a procedure of determination of the optimal value for the amount of displacement between the center of light emission and the center of curvature of the reflecting surface according to a method of manufacturing the light source unit according to a thirteenth embodiment of the present invention.

BEST MODE FOR CARRYING OUT THE INVENTION

Figure 1:
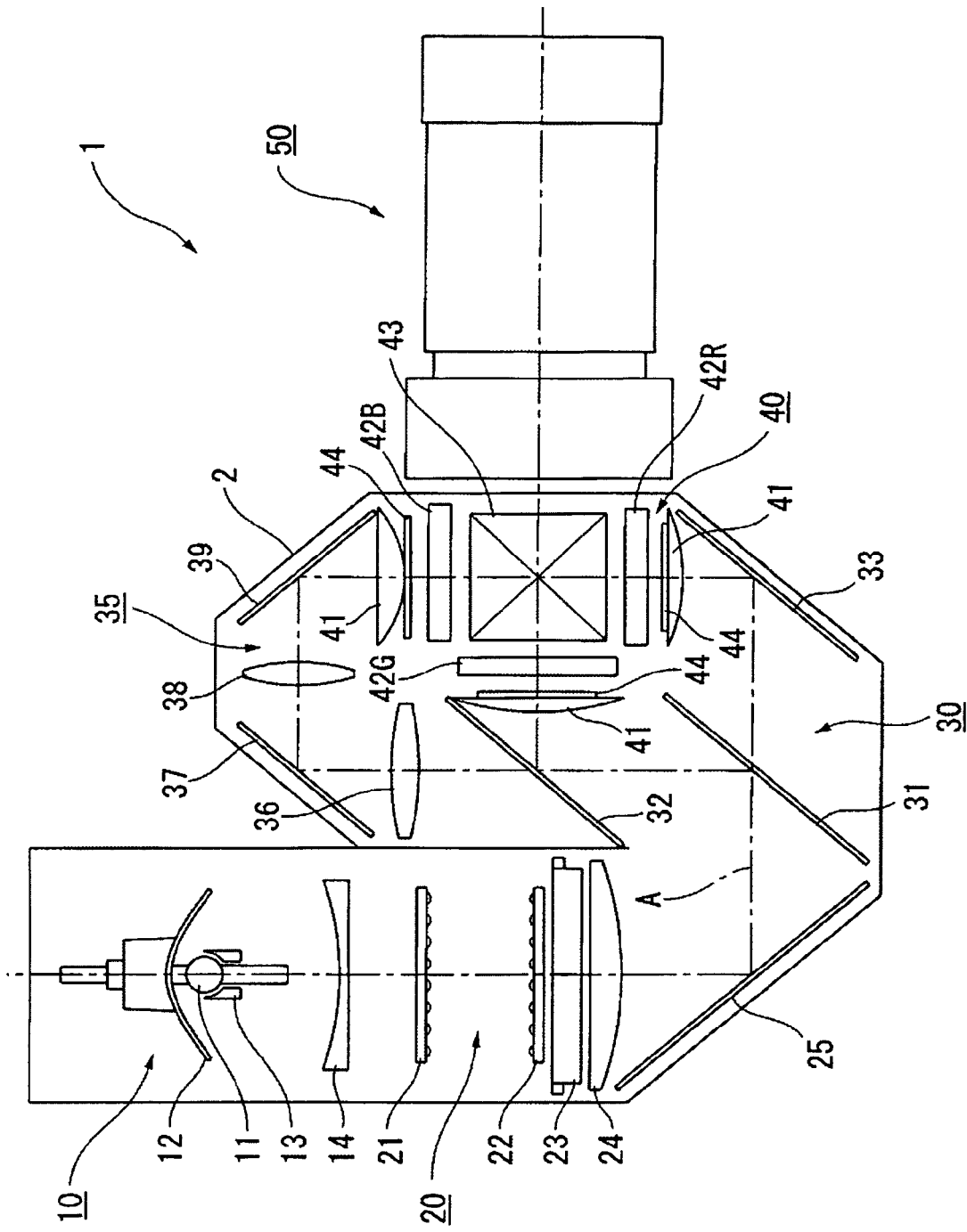
[FIG. 1]

Referring now to the drawings, an embodiment of the present invention will be described.

[1] First Embodiment (Structure of Projector)

FIG. 1 is a pattern diagram showing an optical system of a projector 1 according to a first embodiment of the present invention. The projector 1 is an optical instrument for forming an optical image by modulating a luminous flux emitted from a light source according to image information and projecting an enlarged image on a screen, and includes a light source unit 10, an uniformly illuminating optical system 20, a color separating optical system 30, a relay optical system 35, an optical device 40, and a projecting optical system 50. Optical elements constituting the optical systems 20-35 are positionally adjusted and stored in an optical component enclosure 2 having a preset the illumination axis A.

The light source unit 10 emits a luminous flux radiated from a light source lamp 11 in a certain uniform direction to illuminate the optical device 40 and, though details are described later, includes the light source lamp 11, an oval reflector 12, a secondary reflecting mirror 13, and a lamp housing, not shown, for holding these members. A parallelizing concave lens 14 is provided on the downstream of the oval reflector 12 in the direction of emission of the luminous flux. The parallelizing concave lens 14 may be integrated with the light source unit 10 or provided separately.

The luminous flux radiated from the light source lamp 11 is emitted as convergent beam to be emitted uniformly toward the front of the light source unit 10 by the oval reflector 12, parallelized by the parallelizing concave lens 14, and emitted to the uniformly illuminating optical system 20.

The uniformly illuminating optical system 20 is an optical system for splitting the luminous flux emitted from the light source unit 10 into a plurality of partial luminous fluxes to uniformize the illumination intensity in the surface of the illuminating area, and includes a first lens array 21, a second lens array 22, a polarized light converting element 23, and a superimposed lens 24, and a reflecting mirror 25.

The first lens array 21 has a function as a luminous flux splitting optical element for splitting the luminous flux emitted from the light source lamp 11 into a plurality of partial luminous fluxes, and includes a plurality of small lenses arranged in a matrix manner in a plane orthogonal to the illumination axis A. The contours of the respective small lenses are determined so as to be similar to the shapes of the image forming areas of liquid crystal panels 42R, 42G, 42B constituting the optical device 40, which will be described later.

The second lens array 22 is an optical element for converging the plurality of partial luminous fluxes split by the first lens array 21 described above, and has a structure including a plurality of small lenses arranged in a matrix manner in a plane orthogonal to the illumination axis A as in the case of the first lens array 21. However, since it is intended for conversion of light, the contours of the respective small lenses are not required to have shapes corresponding to the image forming areas of the liquid crystal panels 42R, 42G, 42B.

The polarized light converting element 23 is a polarized light converting element for converting the direction of polarization of the respective partial luminous fluxes divided by the first lens array 21 into linearly polarized light in a certain uniform direction.

The polarized light converting element 23, not shown, has a structure in which polarized light splitting films and reflecting mirrors being disposed obliquely with respect to the illumination axis A are arranged alternately. The polarized light splitting film transmits one of P-polarized luminous flux and S-polarized luminous flux contained in the respective partial luminous fluxes, and reflects the other polarized luminous flux. The other polarized luminous flux, which is reflected, is bent by the reflecting mirror, and is emitted in the direction of emission of one of the polarized luminous fluxes, that is, in the direction along the illumination axis A. Some of the emitted polarized luminous fluxes are polarized by a wave plate provided on a luminous flux emitting surface of the polarized light converting element 23, and all the polarized luminous fluxes are directed in the same direction. With such a polarized light converting element 23, since the luminous fluxes emitted from the light source lamp 11 can be polarized and directed into the same direction, the luminous efficiency of light from the light source used in the optical device 40 can be improved.

The superimposing lens 24 is an optical element for converging the plurality of partial luminous fluxes passed through the first lens array 21, the second lens array 22, and the polarized light converting element 23 and superimposing them onto the image forming areas of the liquid crystal panels 42R, 42G, 42B. The superimposing lens 24 in this example is a spherical lens having a flat end surface on the incoming side of the luminous flux transmitting area and a spherical end surface on the outgoing side thereof. However, an aspherical lens having a hyperboloidal end surface on the outgoing side may be employed.

The luminous flux emitted from the superimposing lens 24 is redirected on the reflecting mirror 25 and emitted toward the color separating optical system 30.

The color separating optical system 30 includes two dichroic mirrors 31, 32, and a reflecting mirror 33, and has a function to separate the plurality of partial luminous flux emitted from the uniformly illuminating optical system 20 into light in three colors of red (R), green (G), and blue (B) by the dichroic mirrors 31, 32.

The dichroic mirrors 31, 32 each are an optical element formed with a wavelength selecting film which reflects a luminous flux of a predetermined certain range of wavelength and transmits a luminous flux of other wavelength on a base plate. The dichroic mirror 31 disposed on the upstream side of the optical path is a mirror which transmits red light and reflects light in other colors. The dichroic mirror 32 disposed on the downstream side of the optical path is a mirror which reflects green light and transmits blue light.

A relay optical system 35 includes an incoming side lens 36, a relay lens 38, and reflecting mirrors 37, 39, and has a function to guide blue light passed through the dichroic mirror 32 constituting the color separating optical system 30 to the optical device 40. The reason why such a relay optical system 35 is provided in the optical path of blue light is, to prevent lowering of the luminous efficiency of light due to divergence of light since the length of the optical path of blue light is longer than the optical paths of light in other colors. Since the length of the optical path of blue light in this example, the structure as describe above is employed. However, when the optical path of red light is long, an arrangement in which the relay optical system 35 is provided on the optical path of red light is also applicable.

Red light separated from the above-described dichroic mirror 31 is redirected by the reflecting mirror 33 and supplied to the optical device 40 via a field lens 41. Green light separated by the dichroic mirror 32 is supplied to the optical device 40 via the field lens 41 as is. Further, blue light is converged and redirected by the lenses 36, 38 and the reflecting mirrors 37, 39 which constitute the relay optical system 35 and supplied to the optical device 40 via the field lens 41. The field lens 41 provided on the upstream side of the optical paths of light of the respective colors in the optical device 40 is provided for converting the respective partial luminous flux emitted from the second lens array 22 into a luminous flux parallel with the illumination axis.

The optical device 40 forms a color image by modulating the incoming luminous flux according to image information, and includes the liquid crystal panels 42R, 42G, 42B as optical modulating units, which are objects to be illuminated, and a cross dichroic prism 43 as a color synthesis optical system. An incoming side polarizing plate 44 is interposed between the field lens 41 and the respective liquid crystal panels 42R, 42G, 42B, and an outgoing side polarizing plate is interposed between the respective liquid crystal panels 42R, 42G, 42B and the cross dichroic prism 43, not shown, whereby light modulation of incoming light of the respective colors is performed by the incoming side polarizing plate 44, the liquid crystal panels 42R, 42G, 42B, and the outgoing side polarizing plate.

The liquid crystal panels 42R, 42G, 42B each are formed by hermetically encapsulating liquid crystal, which is an electro-optical substance, into a pair of transparent glass plates, and for example, modulate the polarizing direction of the polarized luminous flux emitted from the incoming side polarizing plate 44 according to supplied image signals with a polysilicon TFT as a switching element. The image forming areas of the liquid crystal panels 42R, 42G, 42B are rectangular, and have a diagonal size of 0.7 inches for example.

The cross dichroic prism 43 is an optical element for forming a color image by synthesizing optical images which are modulated for each color of light emitted from the outgoing side polarizing plate. The cross dichroic prism 43 is formed by adhering four rectangular prisms and is square in plan view. On the interfaces between the respective adjacent rectangular prisms, there are formed dielectric multi-layer films in a substantially X-shape. One of the dielectric multi-layer films of the substantially X-shape reflects red light, and the other dielectric multi-layer film reflects blue light. Red light and blue light are redirected by the dielectric multi-layer film and directed into the same direction as green light, so that light in three colors are synthesized.

Then, the color image emitted from the cross dichroic prism 43 is enlarged and projected by the projecting optical system 50 to form a big screen image on a screen, not shown.

(Structure of Light Source Unit)

Figure 2:
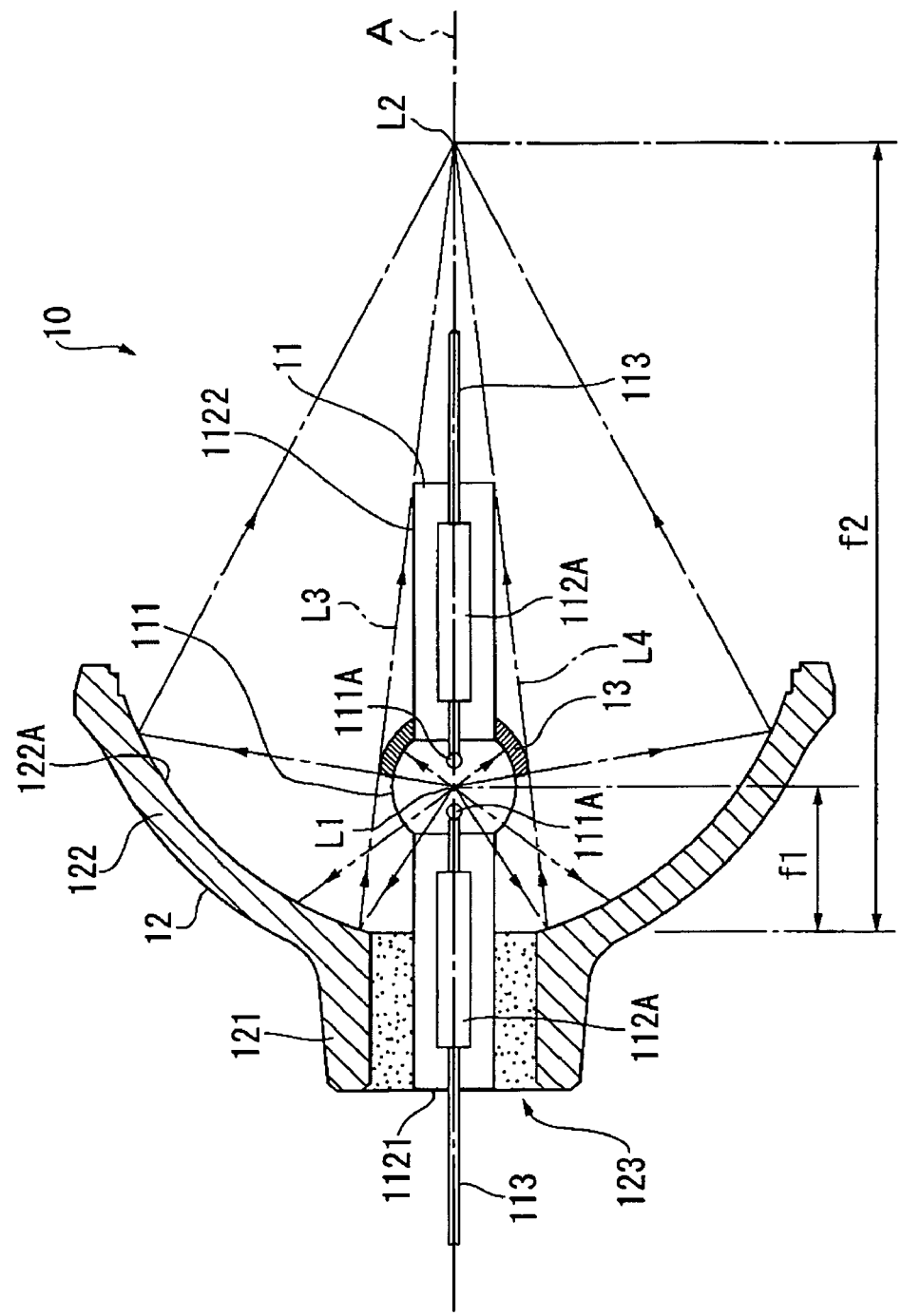
[FIG. 2]

The light source unit 10 has a structure including the light source lamp 11 as an arc tube provided within the oval reflector 12 as shown in FIG. 2. In the present invention, the direction of emission of the luminous flux of the light source unit 10 is represented as the front side or the distal side, and the opposite direction from the direction of emission of the luminous flux of the light source unit 10 is represented as the rear side or the proximal side.

The light source lamp 11 as the arc tube is formed of a quartz glass tube swelling at the center into a spherical shape, and the center portion serves as a light emitting section 111, and the sections extending on both the front side and the rear side of the light emitting section 111 are designated as sealed sections 1121, 1122.

A pair of electrodes 111A formed of tungsten and disposed at a distance from each other, mercury, rare gas, and a small amount of halogen are encapsulated in the light emitting section 111.

Molybdenum metallic foils 112A to be electrically connected to the electrodes of the light emitting section 111 are respectively inserted into the sealed sections 1121, 1122 extending on both the front side and the rear side of the light emitting section 111, and are sealed by glass material or the like. The respective metallic foils 112A are connected to lead wires 113 as electrode leader lines, and the lead wires 113 extend to the outside of the light source lamp 11.

Figure 3:
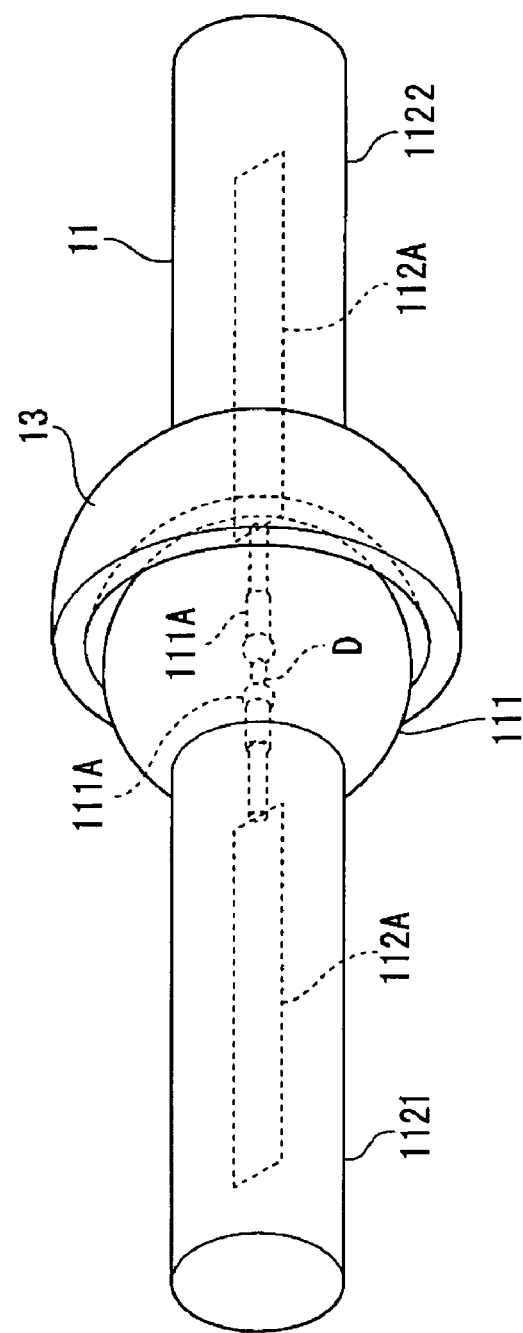
[FIG. 3]

When a voltage is applied to the lead wires 113, as shown in FIG. 3, a potential difference is generated between the electrodes 111A via the metallic foils 112A and thus electric discharge occurs, an arc image D is generated, and the light emitting section 111 emits light.

As shown in FIG. 2, the oval reflector 12 is an integrally molded member formed of glass and provided with a neck portion 121 through which the proximal (rear) sealed section 1121 of the light source lamp 11 is inserted, and an reflecting portion 122 of a flat oval shape extending from the neck portion 121.

The neck portion 121 is formed with an insertion hole 123 at the center thereof, and the sealed section 1121 is disposed at the center of the insertion hole 123.

The reflecting portion 122 is formed by depositing metallic film on the flat oval shaped glass surface, and the reflecting surface 122A of the reflecting portion 122 is formed into a cold mirror which reflects visual light and transmits infrared ray and ultraviolet ray.

The reflecting surface 122A of the oval reflector 12 is a flat oval shape having a first focal point L1 and a second focal point L2, and the first focal point L1 and the second focal point L2 are disposed on the illumination axis A.

The light source lamp 11 disposed in the reflecting portion 122 of such an oval reflector 12 is disposed so that the center of light emission between the electrodes 111A in the light emitting section 111 is located in the vicinity of the first focal L1 of the oval surface of the reflecting surface 122A of the reflecting portion 122.

Then, when the light source lamp 11 is illuminated, the luminous flux radiated from the light emitting section 111 reflects on the reflecting surface 122A of the reflecting portion 122, and converted into a converged light which converges at the second focal position L2 of the oval reflector 12. The center axis of the luminous flux emitted from the oval reflector 12 substantially coincides with the illumination axis A.

At this time, the area within a circular cone shown by boundaries L3 and L4 which connect the second focal position L2 of the oval reflector 12 and the distal end of the distal (front) sealed section 1122 in the direction of emission of the luminous flux of the light source lamp 11 is a luminous flux unusable area in which the luminous flux cannot be guided to the second focal position L2 since the luminous flux reflected on the oval reflector 12 is blocked by the sealed section 1122. In other words, the boundaries L3 and L4 connecting the second focal position L2 of the oval reflector 12 and the distal end of the distal (front) sealed section 1122 in the direction of emission of luminous flux of the light source lamp 11 are boundary beams which define boundaries between beam blocked by the sealed section 1122 and luminous fluxes reflected on the oval reflector 12 and reaching the second focal position L2.

The light source lamp 11 is fixed to such a oval reflector 12 by inserting the back sealed section 1121 of the light source lamp 11 into the insertion hole 123 of the oval reflector 12, disposing the center of light emission between the electrodes 111A in the light emitting section 111 at the location in the vicinity of the first focal position L1 of the oval reflector 12, and filling inorganic adhesive agent containing silica/alumina in the insertion hole 123 as a main component.

The dimension of the reflecting portion 122 in the direction of the optical axis is shorter than the length of the light source lamp 11. Therefore, when the light source lamp 11 is fixed to the oval reflector 12 as described above, the front sealed section 1122 of the light source lamp 11 protrudes from a luminous flux emitting port of the oval reflector 12.

Figure 4:
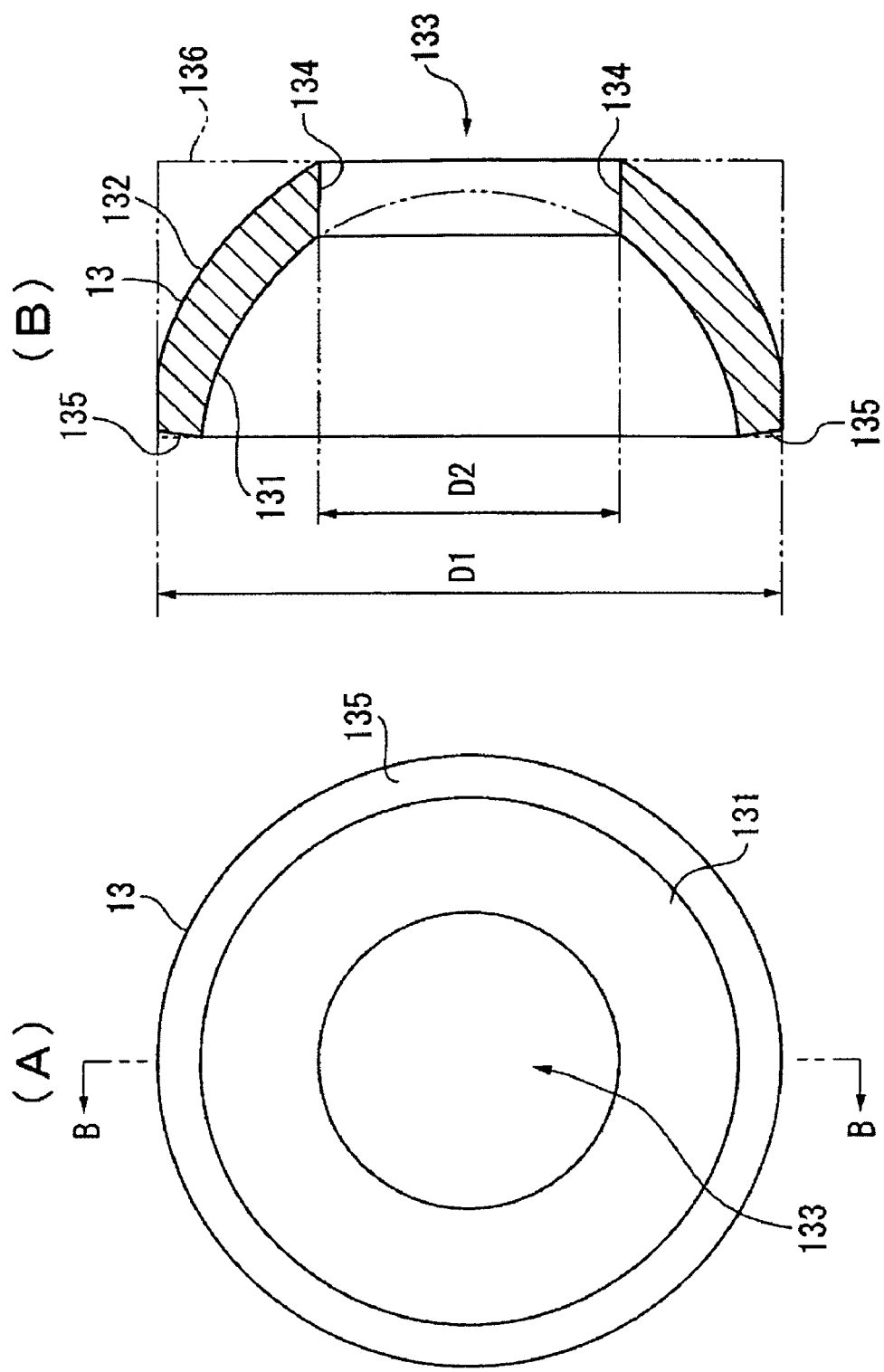
[FIG. 4]

The secondary reflecting mirror 13 is a reflecting member for covering the substantially front half of the light emitting section 111 of the light source lamp 11, and as shown in FIG. 4, the inner side serves as a spherical reflecting surface 131 and the outer peripheral surface 132 is formed into a bowl shape of a curved surface so as to follow the curvature of the reflecting surface 131. The reflecting surface 131 is formed with a reflecting film by depositing metal, and the reflecting film serves as a cold mirror as the reflecting surface 122A of the oval reflector 12.

An opening 133 is formed on the bowl-shaped bottom portion of the secondary reflecting mirror 13, and the inner peripheral surface of the opening 133 is, as described later, used as an adhering surface 134 on which an adhesive agent for fixing to the sealed section 1122 is filled.

In addition, the bowl-shaped upper end surface (left end surface in FIG. 4(B)) of the secondary reflecting mirror 13 is formed into an inclined surface 135 gradually reducing in height of the bowl shape from the edge of the reflecting surface 131 toward the edge of an outer peripheral surface 132.

Figure 5:
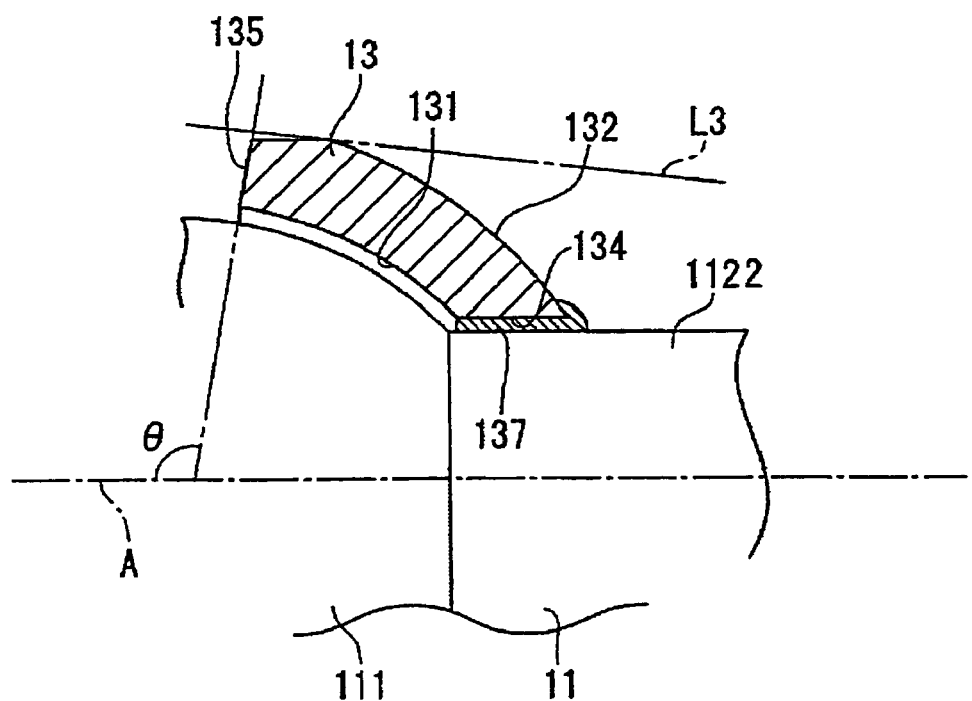
[FIG. 5]
Figure 5:
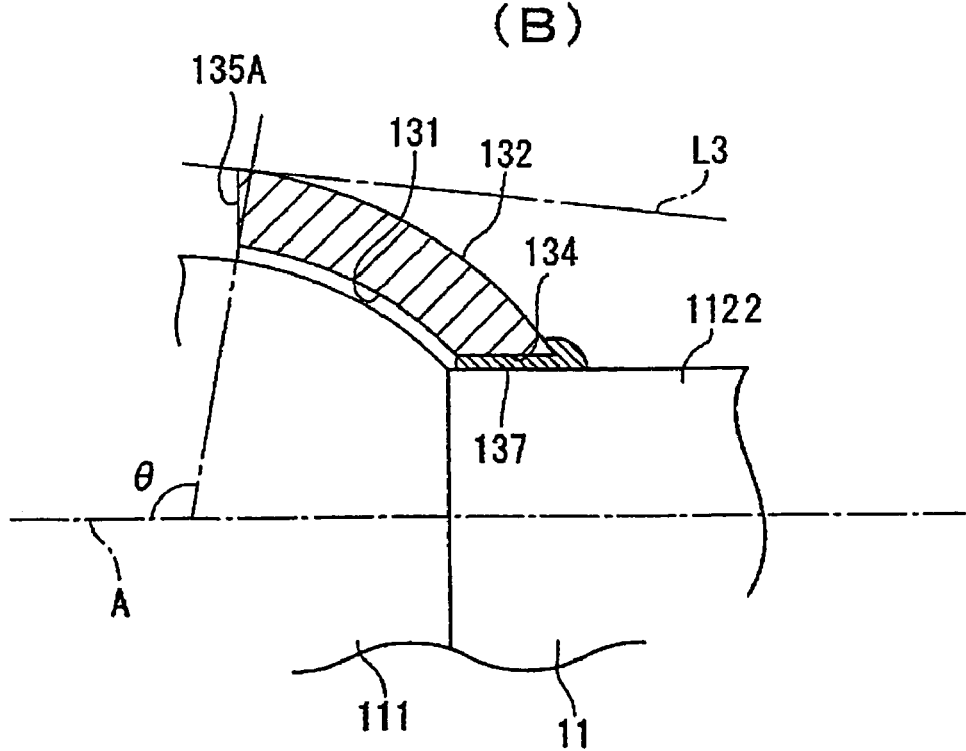

As shown in FIG. 5(A), the inclined surface 135 has a truncated conical shape inclining along the maximum angle θ formed between the proximal side (back side) of the illumination axis A in the direction of emission of the luminous flux and the luminous flux emitted from the light emitting section 111 and directly entering the oval reflector 12. The angle θ is the maximum angle formed with respect to the luminous flux emitted from the light emitting section 111 and directly entering the oval reflector 12, and is preferably 105° or below in order to shorten the length of the oval reflector 12 in the direction of the illumination axis A.

The secondary reflecting mirror 13 as described above is formed of inorganic material such as quartz or alumina ceramics, or crystallized glass such as quartz, Neo Ceram (trade mark of a product from Asahi Glass Co., Ltd.), or material such as sapphire or alumina ceramics. More specifically, as shown in FIG. 4(B), it can be manufactured by polishing a thick cylindrical member 136 having an outer diameter D1 and an inner diameter D2.

In a first place, one of the end surfaces of the cylindrical member 136 is polished into a recessed curved surface to form the reflecting surface 131, then the outer peripheral surface 132 in the shape of the projecting curved surface is polished so as to follow the reflecting surface 131, and the inclined surface 135 is polished. As the last procedure, a dielectric multi-layer film of tantalum pentoxide (Ta2O5) and silica dioxide (SiO2) is deposited and formed on the reflecting surface 131.

The mounting position of the secondary reflecting mirror 13 with respect to the light emitting section 111 of the light source lamp 11 is, as shown in FIG. 5(A), at the position where the inclined surface 135 is disposed along the maximum angle θ formed between the proximal (back) side of the illumination axis A in the direction of emission of the luminous flux and the luminous flux radiated from the light emitting section 111 and directly entering the oval reflector 12, and at the position in the direction orthogonal to the illumination axis A where the outer peripheral surface 132 of the secondary reflecting mirror 13 does not protrude from the circular cone indicated by the boundaries L3 and L4.

Also, though the inclined surface 135 is an inclined surface along the angle θ in this example, it may be positioned so that the end surface 135A of the secondary reflecting mirror 13 on the side of the light emitting section 111 is orthogonal to the illumination axis A as long as the amount of the luminous flux which does not enter the reflecting surface 131 of the secondary reflecting mirror 13 and is blocked by an end surface 135A of the secondary reflecting mirror 13 is small, as shown in FIG. 5(B).

As shown in FIG. 5(A), fixation of the secondary reflecting mirror 13 to the light source lamp 11 is performed by adhering and fixing the secondary reflecting mirror 13 with the intermediary of an adhesive agent 137 between the adhering surface 134 and the outer peripheral surface of the sealed section 1122 of the distal (front) side of the light source lamp 11. The adhesive agent 137 is applied so as to mound on the outer peripheral surface 132 of the secondary reflecting mirror 13. As material of the adhesive agent 137, an inorganic adhesive agent containing silica/alumina as in the case of adhering and fixing the light source lamp 11 to the oval reflector 12 can be employed.

Figure 6:
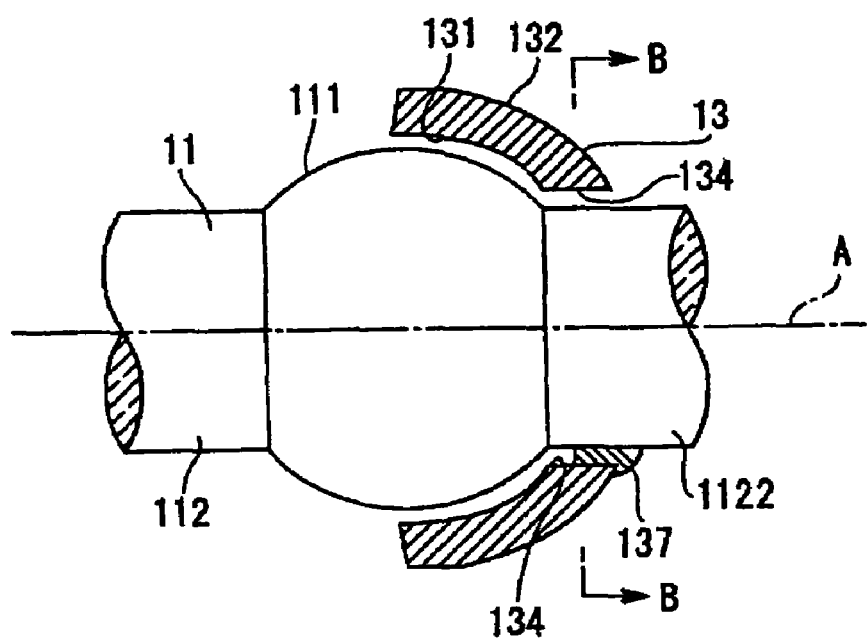
[FIG. 6]
Figure 6:
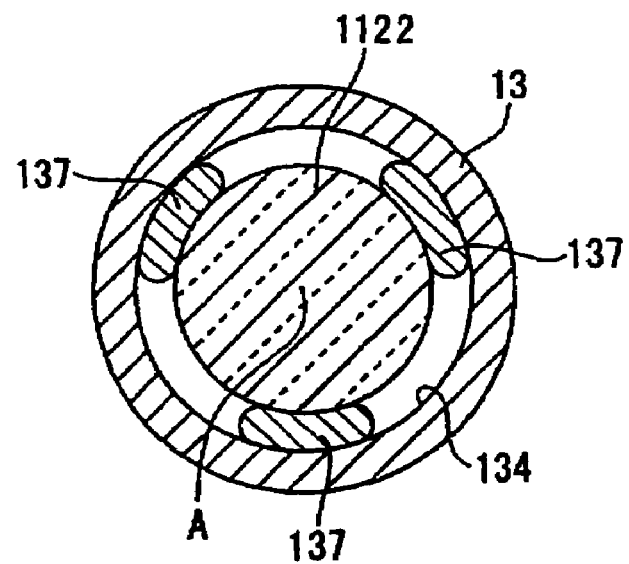
Figure 7:
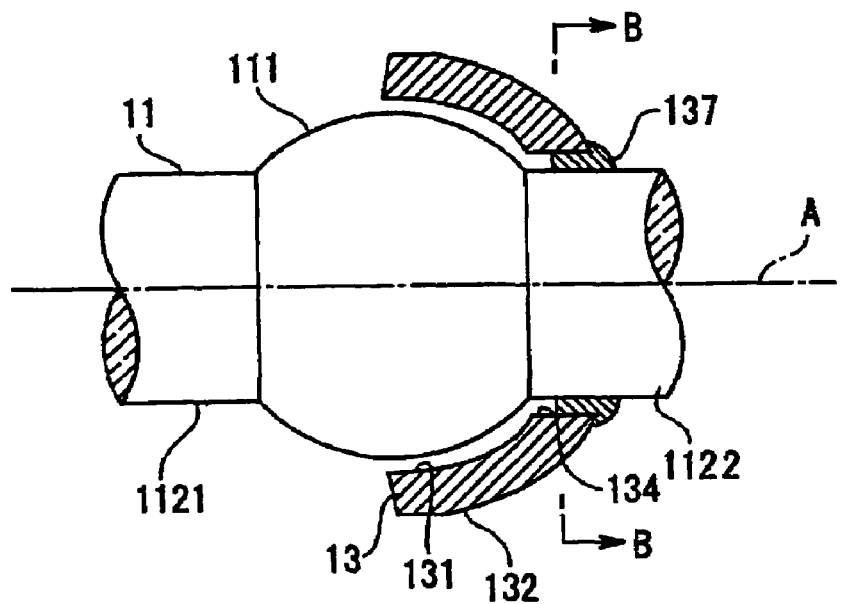
[FIG. 7]
Figure 7:
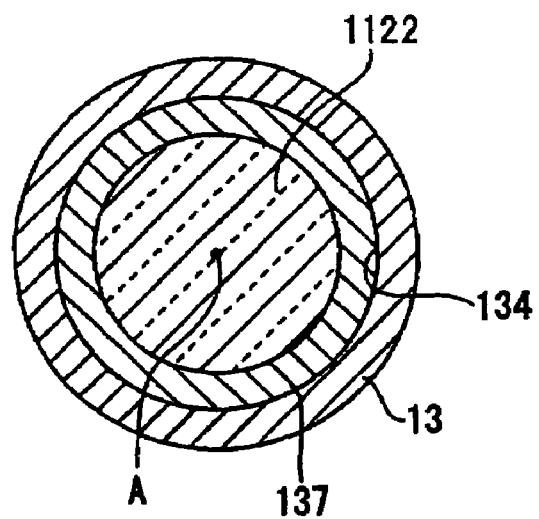

The adhesive agent 137 may be applied intermittently about the illumination axis A as shown in FIG. 6(A), (B), or may be applied entirely around the illumination axis A as shown in FIG. 7(A), (B).

(Structure of Manufacturing Device for Light Source Unit)

Figure 8:
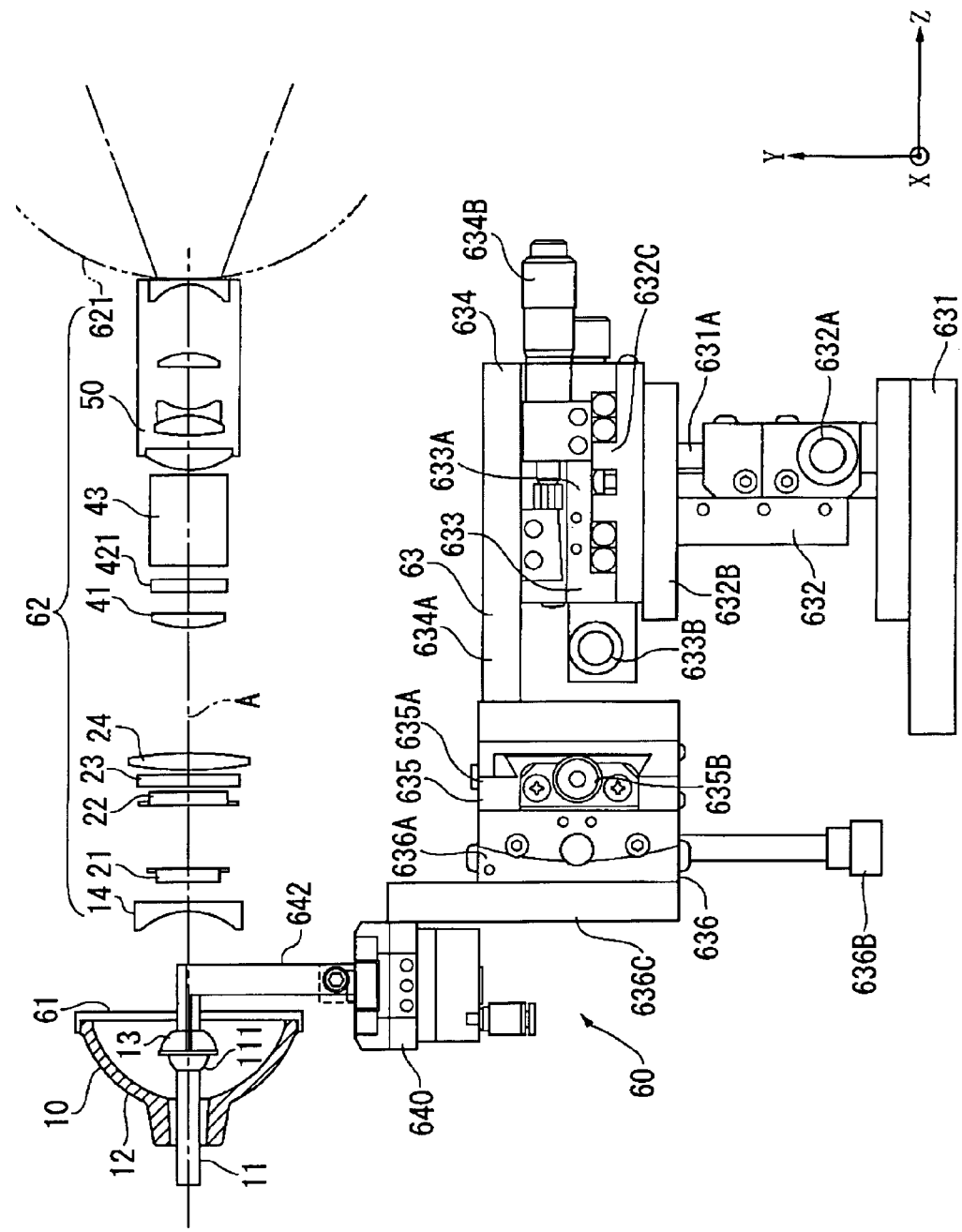
[FIG. 8]

A manufacturing device 60 for manufacturing the above-described light source unit 10 is shown in FIG. 8. The manufacturing device 60 includes a retaining frame 61, a luminous flux detecting unit 62, and a position adjusting mechanism 63.

The retaining frame 61 is a member for retaining a main body of the light source unit including the oval reflector 12 and the light source lamp 11 built integrally therein, and is formed as a frame-shaped member having an opening corresponding to the luminous flux emitting port of the oval reflector 12 for retaining the luminous flux emitting port of the reflector by engaging the frame end.

The luminous flux detecting unit 62 is a member for detecting the luminous flux emitted from the oval reflector 12 when the light source lamp 11 of the light source unit 10 attached to the retaining frame 61 is turned on, and includes an optical elements which is the same as the optical elements 14, 21, 22, 23, 24, 41, 43, 50 constituting the projector 1 and a frame member 421 linearly aligned along the illumination axis A. The disposition of the optical elements 14, 21, 22, 23, 24, 41, 43, 50 are determined corresponding to the length of the optical path of green light of the projector 1. The frame member 421 includes an opening having the same shape as the image forming areas of the respective liquid crystal panels 42R, 42G, 42B of the projector 1 described above, and is disposed on the luminous flux outgoing side of the field lens.

An integrating sphere 621 is provided on the downstream side of the optical path of the projecting optical system 50, which is disposed on the last position on the downstream side, and a luminous flux passed through these optical elements 14, 21, 22, 23, 24, 41, through the opening of the frame member 421, and through the optical elements 43, 50 is measured in illumination intensity by the integrating sphere 621.

The position adjusting mechanism 63 is a mechanism for adjusting the position of the secondary reflecting mirror 13 with respect to the light source lamp 11 fixed to the oval reflector 12 mounted to the retaining frame 61 three-dimensionally, and is adapted to be capable of adjusting the inclination of the secondary reflecting mirror 13 with respect to the direction of a Z-axis, which corresponds to the direction of emission of the luminous flux of the center axis of the luminous flux emitted from the oval reflector 12, the direction of an X-axis and the direction of an Y-axis which are orthogonal to the Z-axis, and a X-Y plane. The position adjusting mechanism 63 includes a base 631, a Y-axis direction adjusting unit 632, an X-axis direction adjusting unit 633, a Z-axis direction adjusting unit 634, an angular position about Y-axis adjusting unit 635, an angular position about X-axis adjusting unit 636, and a secondary reflecting mirror holder 640.

The base 631 is provided with a shaft member 631A extending in the Y-axis direction, and the shaft member 631A supports the Y-axis direction adjusting unit 632 so as to be capable of sliding freely along the direction of extension of the shaft member 631A.

The Y-axis direction adjusting unit 632, not shown, includes a pinion which meshes with a rack formed on the shaft member 631A and moves upward and downward in the Y-axis direction along the shaft member 631A when a micrometer head 632A is rotated.

The top surface of the Y-axis direction adjusting unit 632 is a table 632B, and the table 632B is provided with a rail 632C extending in the X-axis direction thereon.

The X-axis direction adjusting unit 633 is slidably mounted to the rail 632C, and is provided with a table 633A and a micrometer head 633B. The table 633A moves along the X-axis direction when the micrometer head 633B is rotated.

A rail extending in the Z-axis direction, not shown, is provided on the table 633A, and slidably supports the Z-axis direction adjusting unit 634 thereon.

The Z-axis direction adjusting unit 634 is provided with an arm 634A extending in the Z-axis direction and a micrometer head 634B, and the arm 634A moves in the Z-axis direction when the micrometer head 634B is rotated.

The distal end surface of the arm 634A, not shown, is formed into an arcuate shape about the Y-axis, which is a convex surface, and the angular position about Y-axis adjusting unit 635 is provided on the convex surface.

The angular position about the Y-axis adjusting unit 635 is provided with a main body 635A and a micrometer head 635B, and the main body 635A rotates about the Y-axis along the convex surface when the micrometer head 635B is rotated.

Then, the distal end surface of the main body 635A is formed into an arcuate shape about the X-axis, which is a convex surface, and the angular position about X-axis adjusting unit 636 is provided on the convex surface.

The angular position about X-axis adjusting unit 636 is provided with a main body 636A and a micrometer head 636B, and the main body 636A rotates about the X-axis when the micrometer head 636B is rotated.

The main body 636A is provided with the secondary reflecting mirror holder 640 at the distal end thereof via an arm 636C.

Figure 9:
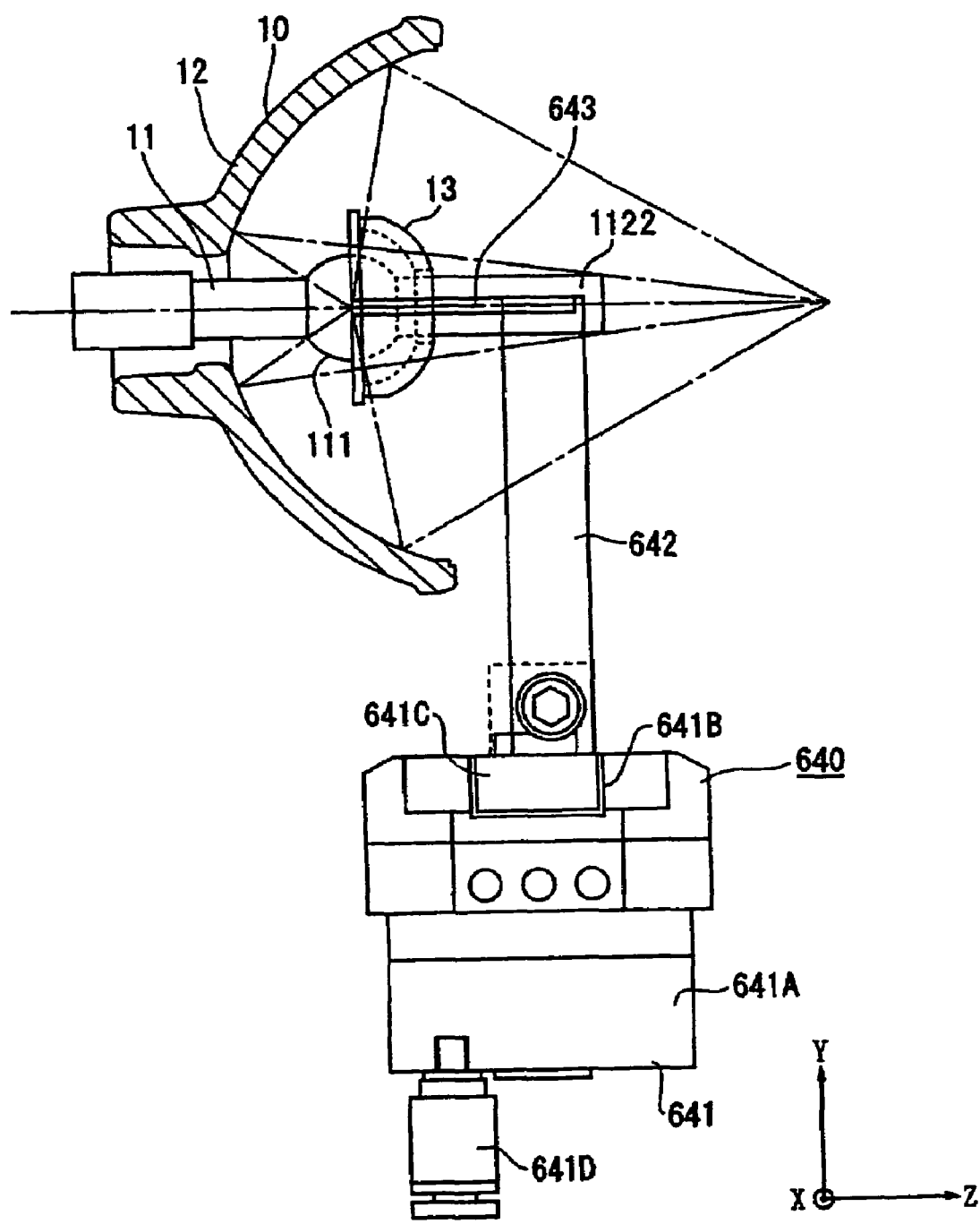
[FIG. 9]
Figure 10:
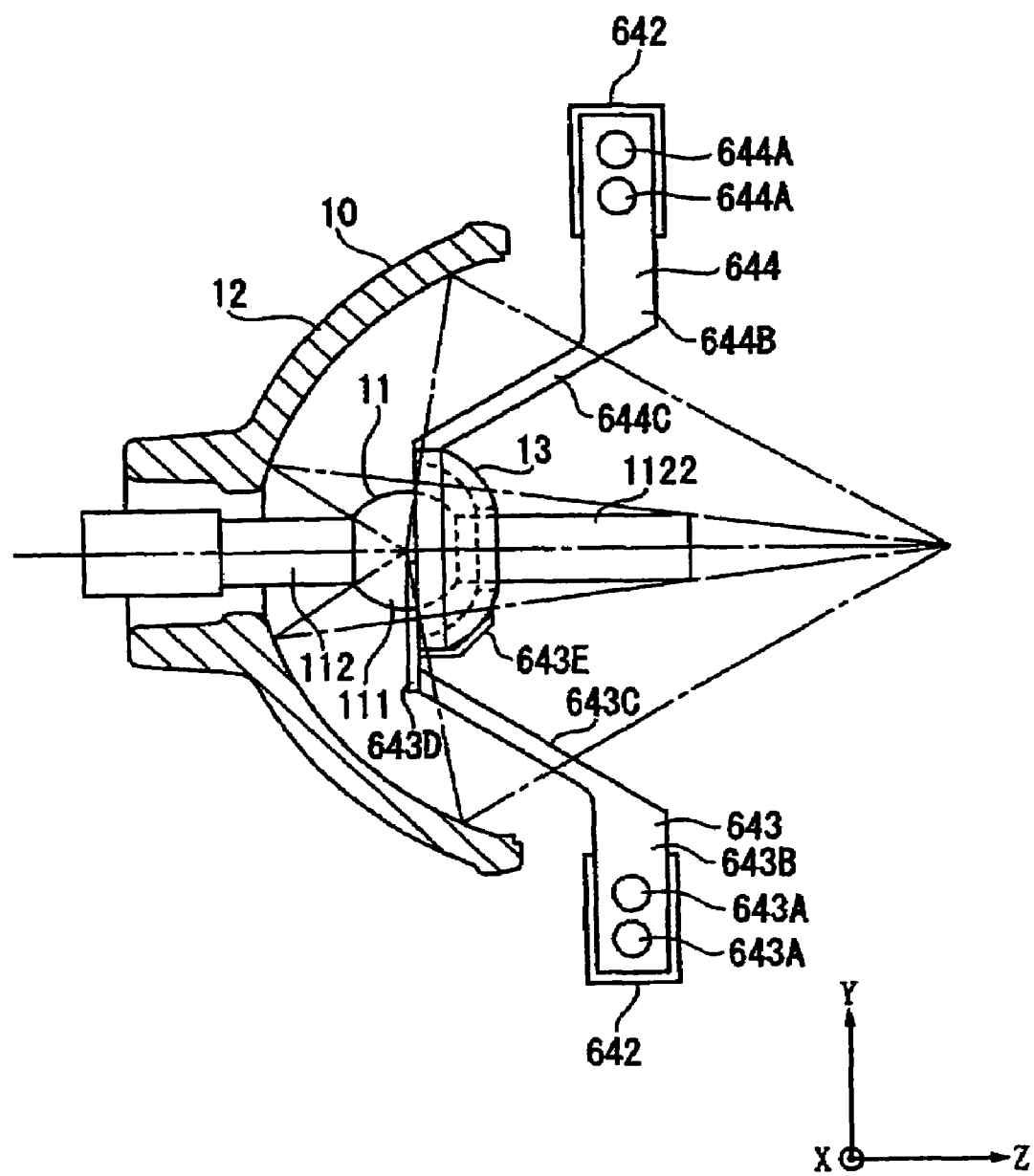
[FIG. 10]

As shown in FIG. 9 and FIG. 10, the secondary reflecting mirror holder 640 is a member for holding and positioning the secondary reflecting mirror 13 at the light emitting section 111 of the light source lamp 11, and includes a base 641, a pair of shaft members 642, and grip members 643, 644.

The base 641 is provided with a main body 641A to be mounted to the arm 636C of the angular position about X-axis adjusting unit 636, and the main body 641A is formed with a groove-shaped rail 641B extending in the X-axis direction on the top surface thereof. The main body 641A is provided with a joint 641D for supplying air on the lower surface thereof.

Two sliding pieces 641C are provided on the rail 641B so as to be capable of sliding in the X-axis direction in FIG. 9 and FIG. 10, and the respective sliding pieces 641C slide toward and away from each other.

The pair of shaft members 642 are supporting members for supporting the grip members 643, 644 respectively, and are column shaped members projecting upright on the pair of sliding pieces 641C respectively. The pair of shaft members 642 are formed with two each of female threaded holes, not shown in FIG. 9 and FIG. 10, on the top surfaces thereof.

The grip members 643, 644 are fixed respectively on the top surfaces of the pair of shaft members 642 at the proximal ends thereof, as shown in FIG. 10, and are machined metal plate members formed with gripping surfaces at the bent distal ends thereof. The proximal portions of the respective grip members 643, 644 are formed with holes 643A, 644A for being fixed to the female threaded holes on the shaft members 642.

Figure 11:
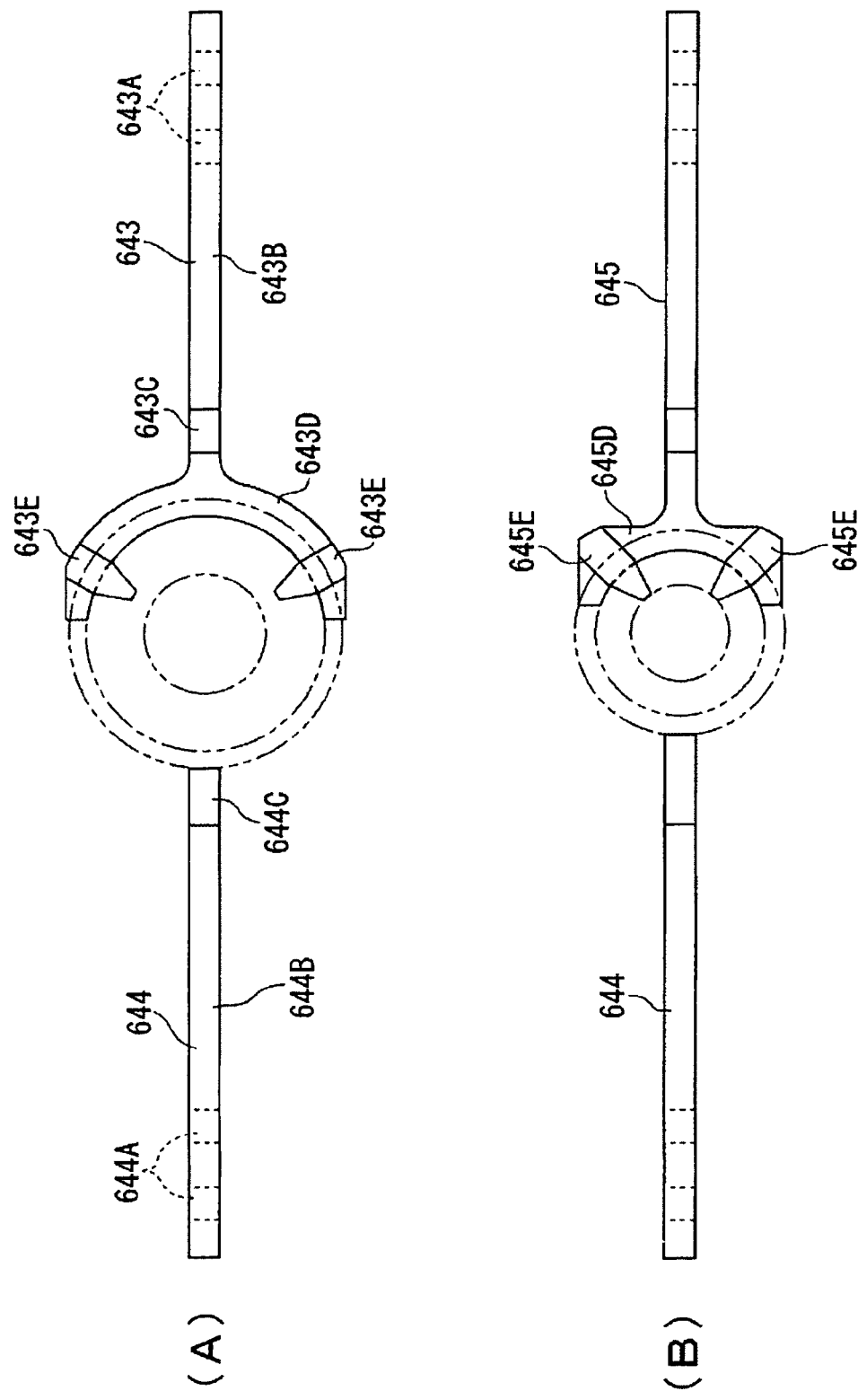
[FIG. 11]

The grip member 643 is, as shown in FIG. 10 and FIG. 11(A), provided with a proximal portion 643B and a bent portion 643C, and the bent portion 643C is formed with a holding surface 643D for holding the end surface of the luminous flux emitting port of the secondary reflecting mirror 13 and two claws 643E which projects outward from the holding surface 643D and comes into abutment with the outer peripheral surface of the secondary reflecting mirror 13 at the distal end thereof.

The grip members 643, being configured as described above, may be configured into a plurality of types according to the size of the secondary reflecting mirror 13. For example, in order to allow the secondary reflecting mirror having a smaller diameter than that in the present embodiment to be gripped, a grip member 645 may be modified into that being small in diameter of the holding surface 645D at the distal end and having a claw 645E of different shapes as shown in FIG. 11(B), so that it can grip the secondary reflecting mirror 13 of various diameters.

The grip member 644 includes a proximal portion 644B and a bent portion 644C as in the case of the grip member 643. However, the distal portions thereof are flat so as to follow the shape of the outer peripheral surface of the opening on the secondary reflecting mirror 13.

The secondary reflecting mirror 13 is held by the above-described grip members 643, 644 by moving the sliding pieces 641C of the main body 641A toward each other, holding the luminous flux emitting port of the secondary reflecting mirror 13 by the holding surface 643D of the holding member 643 as shown in FIG. 10, and supporting the outer surface of the secondary reflecting mirror by the claws 643E.

In this case, the outer peripheral edge of the luminous flux emitting port of the secondary reflecting mirror 13 is held by the distal surface of the grip member 644, whereby the secondary reflecting mirror 13 is gripped by the grip members 643, 644.

(Method of Manufacturing Light Source Unit)

Subsequently, using the manufacturing device 60 described above, a procedure for manufacturing the light source unit 10 will be described based on a flowchart shown in FIG. 12.

(Step S1) Set the integrated light source lamp 11 and the oval reflector 12 before mounting the secondary reflecting mirror 13 into the retaining frame 61 of the manufacturing device 60.

(Step S2) Set the secondary reflecting mirror 13 to the grip members 643, 644 of the secondary reflecting mirror holder 640.

(Step S3) Turn the light source lamp 11 on and allow a luminous flux to be emitted from the oval reflector 12.

(Step S4) Start detection of illumination intensity by the integrating sphere 621 of the luminous flux detecting unit 62.

(Step S5) Determine whether or not the maximum illumination intensity of the luminous flux from the light source unit 10 detected by the integrating sphere 621 is achieved.

(Step S6) When it is determined that the secondary reflecting mirror 13 is not at the position where the maximum illumination intensity is achieved, operate the Y-axis direction adjusting unit 632, the X-axis direction adjusting unit 633, the Z-axis direction adjusting unit 634, the angular position about Y-axis adjusting unit 635, the angular position about X-axis adjusting unit of the position adjusting mechanism 63 to adjust the posture of the secondary reflecting mirror 13 in the X-, Y-, and Z-axis directions.

Figure 13:
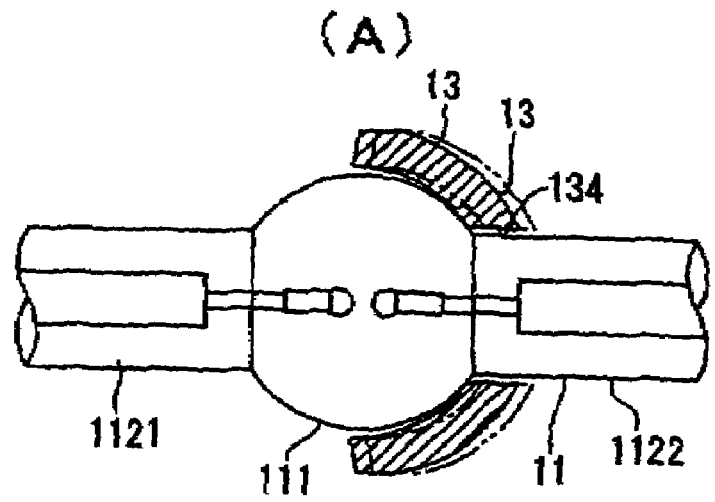
[FIG. 13]
Figure 13:
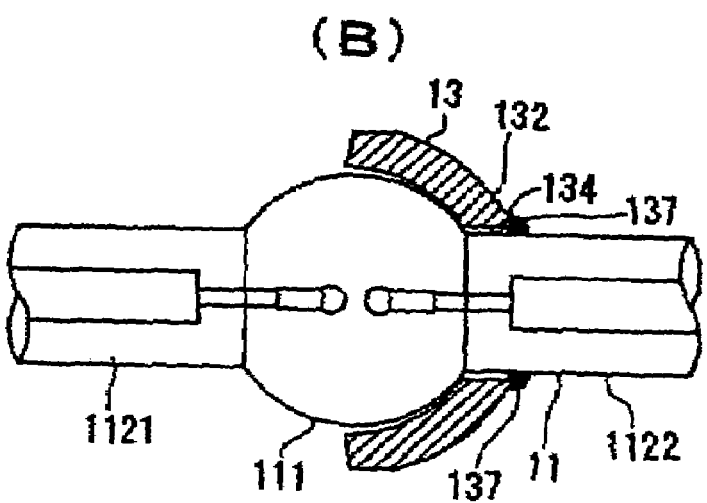
Figure 13:
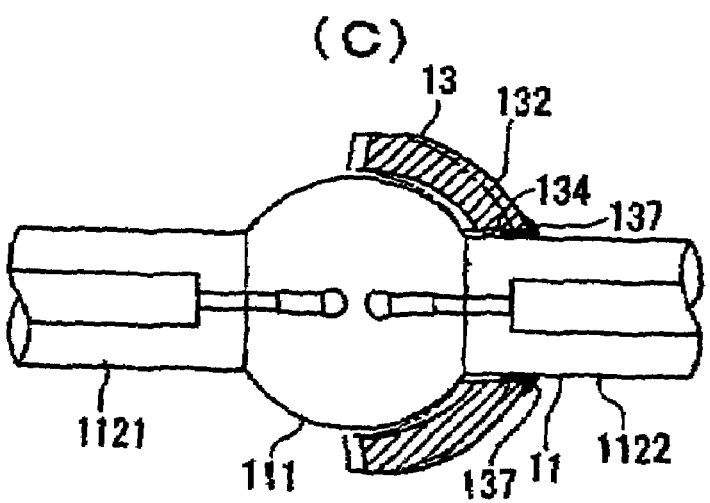

(Step S7) When the illumination intensity is determined to be the maximum, as shown in FIG. 13, move the secondary reflecting mirror 13 first from the position where the maximum illumination intensity is achieved toward the light emitting section 111 (FIG. 13(A)), apply an adhesive agent on the end surface on the side of the outer peripheral surface 132 of the adhering surface 134 of the secondary reflecting mirror 13 (FIG. 13(B)), then move the secondary reflecting mirror 13 to equally distribute the adhesive agent between the adhering surface 134 and the outer peripheral surface of the sealed section 1122, restore the secondary reflecting mirror 13 to the position where the maximum illumination intensity is obtained so that the adhesive agent is mounded on the outer peripheral surface 132 of the secondary reflecting mirror 13 to cure the adhesive agent (FIG. 13(C)).

(Step S8) When the adhesive agent is cured, turn the light source lamp 11 off, and remove the light source unit 10 from the retaining frame 61 and the secondary reflecting mirror holder 640.

EFFECT OF THE EMBODIMENT

According to the present embodiment described above, the following effects are achieved.

(1) Since the secondary reflecting mirror 13 is provided separately from the light source lamp 11, the reflecting film does not depend on the external shape of the light emitting section 111 as in the case of depositing the reflecting film on the light emitting section 111 of the light source lamp 11. Therefore, since the reflecting surface of the secondary reflecting mirror 13 can be formed into a shape which realizes an effective use of light reflected by the secondary reflecting mirror 13 in the oval reflector 12 and, in addition, the positional adjustment can be performed among the light source lamp 11, the secondary reflecting mirror 13, and oval reflector 12, luminous efficiency of light from the light source can be significantly improved in the light source unit 10 using the secondary reflecting mirror 13.

(2) Since the outer peripheral surface 132 of the secondary reflecting mirror 13 is accommodated within the circular cone shown by the boundaries L3, L4 connecting between a second focal position L2 of the oval reflector 12 and the distal end of the sealed section 1122 on the distal (front) side of the light source lamp 11, light reflected by the oval reflector 12 is not intercepted by the outer peripheral surface 132 of the secondary reflecting mirror 13 and the front sealed section 1122, and hence the luminous efficiency of light from the light source can further be improved.

(3) Since the secondary reflecting mirror 13 can be formed by polishing the cylindrical member 136 and hence accuracy of the curvature of the reflecting surface 131, for example, can be improved, the luminous efficiency of light form the light source can further be improved.

(4) Since the end surface of the secondary reflecting mirror 13 on the proximal (rear) side of the illumination flux emitting direction is formed into the inclined surface 135, light emitted from the center of light emission of the arc image D of the light emitting section 111 and to be directly reflected on the oval reflector 12 can be reflected on the oval reflector 12 without being intercepted by the end surface of the secondary reflecting mirror 13 on the proximal (rear) side of the illumination flux emitting direction. Therefore, the luminous efficiency of light from the light source can positively be improved.

(5) Since the outer peripheral surface 132 is polished so as to follow the spherically polished portion of the reflecting surface 131 of the secondary reflecting mirror 13, the surfaced accuracy of the outer peripheral surface 132 is ensured, and interception of light by the secondary reflecting mirror 13 may be reliably prevented. In addition, by polishing the reflecting surface 131 and the outer peripheral surface 132, material is hardly subjected to a mechanical load when machining the cylindrical member 136, whereby compact, light-weight, and low-profile secondary reflecting mirror 13 is achieved.

(6) In order to fix the secondary reflecting mirror 13 to the front sealed section 1122 of the light source lamp 11, by applying the adhesive agent entirely between the adhering surface 134 and the outer peripheral surface of the sealed section 1122 without forming a gap, the secondary reflecting mirror 13 can be firmly fixed to the light source lamp 11. On the other hand, by applying the adhesive agent intermittently at three or four places, there are formed gaps at other places, whereby they can be utilized as air flow paths for cooling the heated light emitting section 111, which is advantageous for cooling the light emitting section 111.

(7) Since the light source unit 10 is employed in the projector 1, the projector 1 in which the effects described above are achieved can be obtained, and downsizing and increase in brightness are achieved in the projector 1.

(8) Since the secondary reflecting mirror 13 can be fixed to the light source lamp 11 at the relative position where the optimal illumination intensity is obtained by adjusting the position of the secondary reflecting mirror 13 so as to obtain the optimal illumination intensity while detecting the luminous intensities of the luminous flux emitted from the light source lamp 11 and reflected directly on the oval reflector 12 and luminous flux reflected on the oval reflector 12 via the secondary reflecting mirror 13, the light source unit 10 in which the luminous efficiency of light from the light source is significantly improved can reliably be manufactured.

(9) When applying the adhesive agent between the adhering surface 134 of the secondary reflecting mirror 13 and the outer peripheral surface of the front sealed section 1122 of the light source lamp 11 since the secondary reflecting mirror 13 is moved from the position where the maximum illumination intensity is achieved toward the light emitting section 111 and then the adhesive agent is applied on the end surface of the adhering surface 134 on the side of the outer peripheral surface 132 before restoring the secondary reflecting mirror 13 to the position where the maximum illumination intensity is achieved again so that the adhesive agent is evenly distributed between the adhering surface 134 and the reflecting surface 132, the adhesive agent can be sufficiently be distributed evenly between the adhering surface 134 and the outer peripheral surface of the sealed section 1122 where the gap is small and hence it is difficult to apply the adhesive agent and, in addition, even the adhesive agent which is cured in a short time can sufficiently be distributed evenly between the adhering surface 134 and the outer peripheral surface of the sealed section 1122 within a short time. Therefore, the secondary reflecting mirror 13 can be firmly fixed to the sealed section 1122 at the position where the maximum illumination intensity is achieved, whereby the light source unit 10 with the high luminous efficiency can be manufactured.

(10) Since the adhesive agent 137 is applied so as to be mounded on the outside of the outer peripheral surface 132 of the secondary reflecting mirror 13, after the adhesive agent 137 is cured, the secondary reflecting mirror 13 can be restricted from moving toward the front (right in FIG. 5(A)) of the center axis of the luminous flux emitted from the oval reflector 12 in the direction of emission of the luminous flux with respect to the light source lamp 11. Therefore, lowering of the illumination intensity of illumination emitted form the light source unit 10 can be prevented.

[2] Second Embodiment

Subsequently, a second embodiment of the present invention will be described. In the description below, parts and members which have already been described are represented by the identical numerals and the description will be omitted or simplified.

In the first embodiment described above, the outer peripheral surface 132 of the secondary reflecting mirror 13 is a curved surface so as to follow the curvature of the reflecting surface 131, and the secondary reflecting mirror 13 is formed with the reflecting surface 131 and the outer peripheral surface 132 by polishing the cylindrical member 136.

Figure 14:
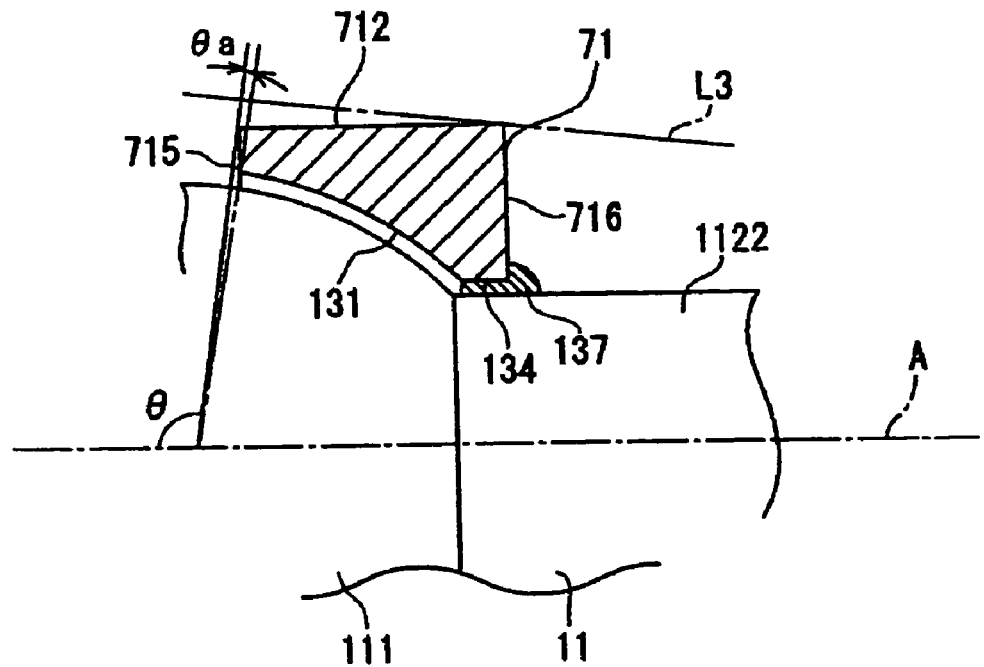
[FIG. 14]
Figure 14:
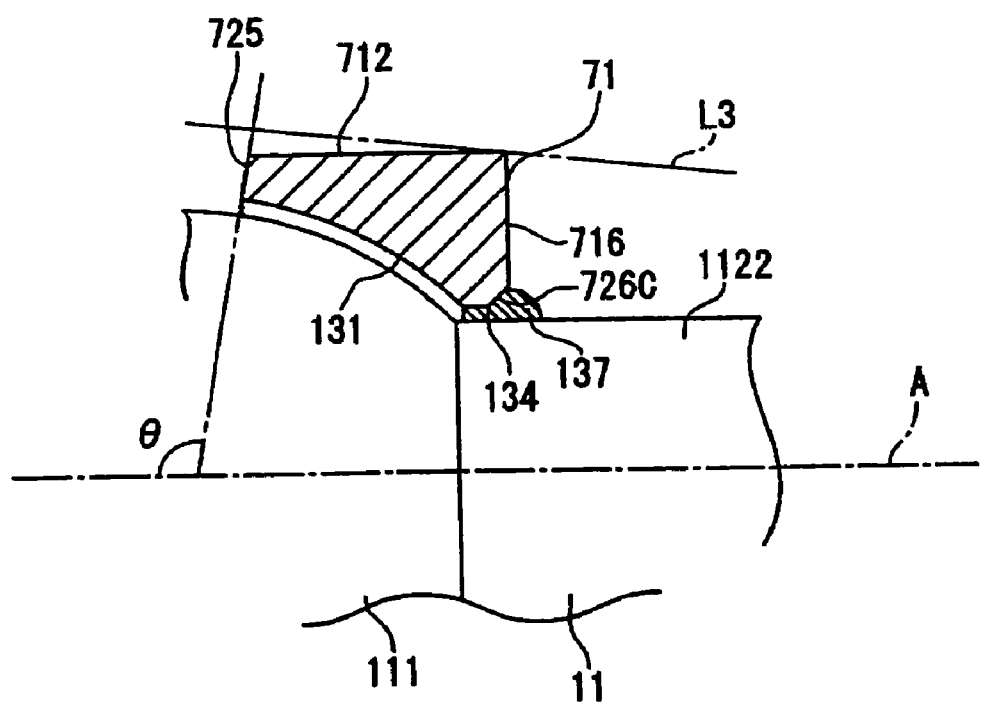
Figure 15:
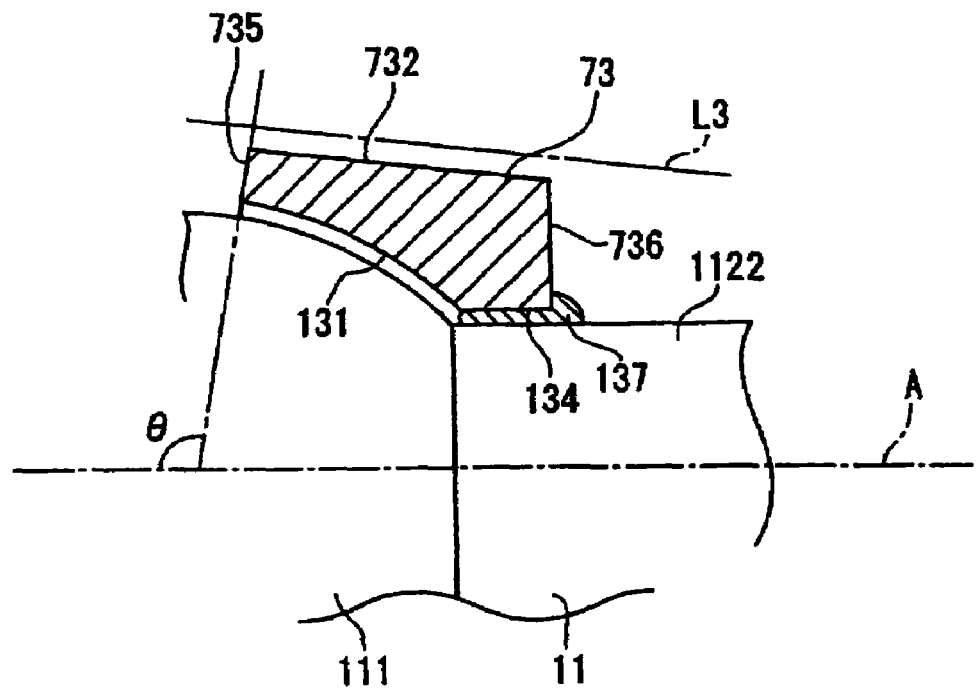
[FIG. 15]
Figure 15:
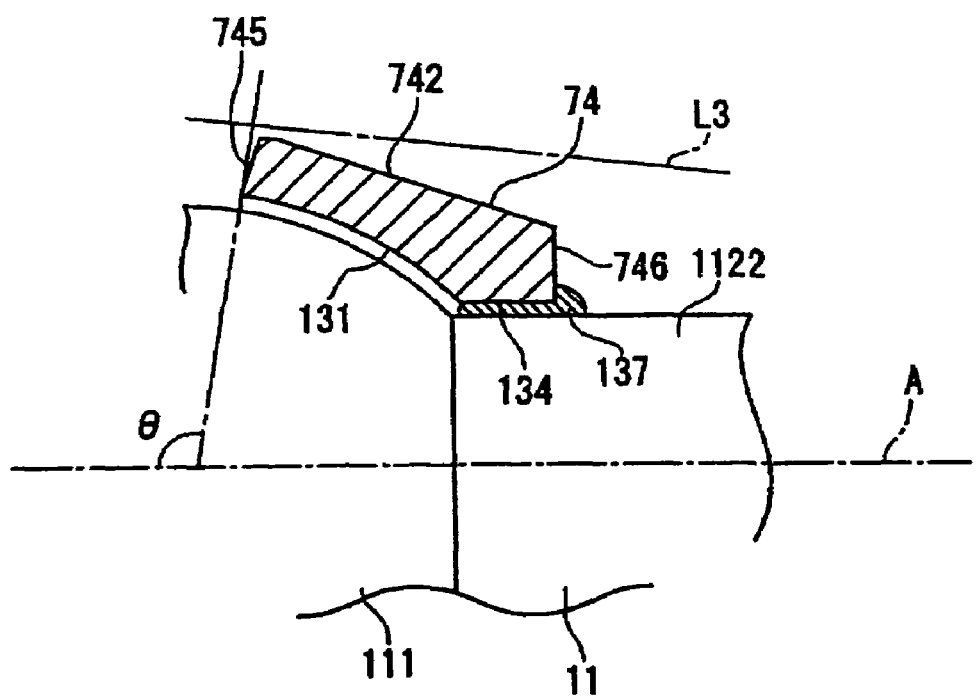

In contrast, secondary reflecting mirrors 71-74 according to the second embodiment are, as shown in FIG. 14 and FIG. 15, different in that outer peripheral surfaces 712, 722, 732, 742 are substantially cylindrical shape or substantially truncated conical shape. The reflecting surface 131 of each of the secondary reflecting mirrors 71-74 is formed by polishing the cylindrical member 136, but the outer peripheral surfaces 712, 722, 732, 742 are not machined at all or formed only by a simple cutting operation.

The secondary reflecting mirror 71 according to the second embodiment includes, as shown in FIG. 14(A), the cylindrical outer peripheral surface 712, a proximal end surface 715 being an end surface of the secondary reflecting mirror 71 on the side where the reflecting surface 131 is formed and being vertical to the outer peripheral surface 712, a distal end surface 716 being an end surface on the opposite side from the proximal end surface 715, and the reflecting surface 131 having a center of curvature at the center axis of the cylindrical outer peripheral surface 712, and has opposed cross sections being substantially trapezoidal shape. The secondary reflecting mirror 71 can be manufactured by machining the cylindrical member 136, and is formed only by machining the reflecting surface 131 without machining the outer peripheral surface and the end surface of the cylindrical member 136, and thus the outer peripheral surface 712, and the end surfaces 715, 716 are cut surfaces of the base material.

On the distal (front) side of the secondary reflecting mirror 71 of the illumination axis A in the direction of emission of the luminous flux, the end of the distal end surface 716 and the outer peripheral surface 712 are accommodated within the circular cone defined by the end of the distal end surface 716 and the outer peripheral surface 712 shown by the boundaries L3, L4. Since the proximal end surface 715 is an end surface vertical to the illumination axis A, the luminous flux emitted from the light emitting section 111 in the range of an angle θa shown in FIG. 14(A) is intercepted by the proximal end surface 715. However, the proximal end surface 715 is small so as to prevent the luminous efficiency of light emitted from the light emitting section 111 from lowering.

Preferably, the distal end surface 715 of the secondary reflecting mirror 71 is formed into an inclined surface 725 which matches the angle θ formed between the proximal (rear) side of the illumination axis A in the direction of emission of the luminous flux and the luminous flux radiated from the light emitting section 111 and directly entering the oval reflector 12, as shown in FIG. 14(B), as in the case of the inclined surface 135 in the first embodiment.

Furthermore, the secondary reflecting mirror 71 is chamfered at the meeting point between the distal end surface 716 and the adhering surface 134 so that a tapered surface 726C is formed.

The tapered surface 726C is formed so that the adhesive agent can easily be injected between the outer peripheral surface of the sealed section 112 and the adhering surface 134.

As shown in FIG. 15(A), the secondary reflecting mirror 73 has a distal end surface 736 and a proximal end surface 735 being the same as the distal end surface 725 and a proximal end surface 726 of the secondary reflecting mirror 72, and the outer peripheral surface 732 has a truncated conical shape accommodated within the circular cone indicated by the boundaries L3 and L4 and defined by the straight lines substantially parallel to the boundaries L3 and L4. In other words, the angle of inclination of the outer peripheral surface 73 with respect to the illumination axis A and the angle of inclination of the boundaries L3 or L4 with respect to the illumination axis A are substantially the same. The secondary reflecting mirror 73 can be manufactured by machining the cylindrical member, and the reflecting surface 131 of the secondary reflecting mirror 73 is formed by polishing and the outer peripheral surface 732 is formed by cutting entirely the side surface of the substantially truncated conical shape. In this shape, the length of the secondary reflecting mirror 73 in the direction of the illumination axis A can be increased, and hence the sufficient length of the adhering surface 134 can be secured, so that the area of the adhering surface can be increased.

As shown in FIG. 15(B), the secondary reflecting mirror 74 has a distal end surface 746 which is the same as the distal end surface 736 of the secondary reflecting mirror 73, and a proximal end surface 745 is an inclined surface such that an angle of inclination between the proximal (rear) side of the illumination axis A in the direction of emission of the luminous flux and the proximal end surface 745 is larger than the angle θ, so that interception of light can be prevented further reliably. The angle of inclination of the outer peripheral surface 742 of the secondary reflecting mirror 74 with respect to the illumination axis A is steeper, or larger, than the angle of inclination of the boundary L3 or L4 with respect to the illumination axis A so that the gap between the circular cone shown by the boundaries L3 and L4 and the outer peripheral surface 742 is increased. In other words, the secondary reflecting mirror 74 has a shape in which the outer peripheral surface 742 thereof can hardly be projected from the circular cone shown by the boundaries L3 and 14 even when the position of the secondary reflecting mirror 74 is adjusted with respect to the light source lamp 11. The secondary reflecting mirror 74 can be manufactured by machining the cylindrical member, and the reflecting surface 131 of the secondary reflecting mirror 74 is formed by polishing and the outer peripheral surface 742 thereof is formed by entirely cutting the side surface of the substantially truncated conical shape.

The light source unit provided with the secondary reflecting mirrors 71-74 can be manufactured in the same manner as the method of manufacturing in the first embodiment using the manufacturing device 60 in the first embodiment.

According to the second embodiment described above, the following effects in addition to the effects (1) to (4), (6) to (10) described in the aforementioned embodiment are achieved.

(11) By forming the outer peripheral surfaces 732, 742 into a truncated conical shape as in the case of the secondary reflecting mirrors 73, 74, interception of light emitted from the oval reflector 12 can be prevented further reliably, and the luminous efficiency of light emitted from the light source lamp 11 can further be improved, so that illumination having a high illumination intensity can be emitted from the light source unit.

In this structure, since the sizes of the secondary reflecting mirrors 73, 74 in the direction of the illumination axis A can be increased to obtain a larger area for the adhering surface, the adhesive strength of the secondary reflecting mirrors 73, 74 with respect to the light source lamp 11 can be improved. Therefore, the illumination intensity of illumination emitted from the light source unit 10 can be prevented from lowering.

(12) In the case of the secondary reflecting mirror 71, since the outer peripheral portion is not machined, manufacturing of the secondary reflecting mirror 71 can further be simplified.

(13) In the case of the secondary reflecting mirror 71, since the meeting point between the distal end surface and the adhering surface, which is a portion to which the adhesive agent is applied, is chamfered and hence is formed with the tapered surface 726C, the adhesive agent can be injected between the adhering surface 134 and the outer peripheral surface of the sealed section 1122 easily, and hence the adhesive strength can further be improved. Therefore, the illumination intensity of illumination emitted from the light source unit 10 can be prevented from lowering.

[3] Third Embodiment

Subsequently, a third embodiment of the present invention will be described. In the description below, parts and members which have already been described are represented by the identical numerals and the description will be omitted or simplified.

In the case of the secondary reflecting mirror 13 according to the first embodiment and the secondary reflecting mirrors 71, 73, 74 according to the second embodiment, the meeting points between the outer peripheral surfaces 132, 712, 732, 742 and the adhering surface 134 are not machined at all, as shown in FIG. 4, FIG. 14, and FIG. 15.

Figure 16:
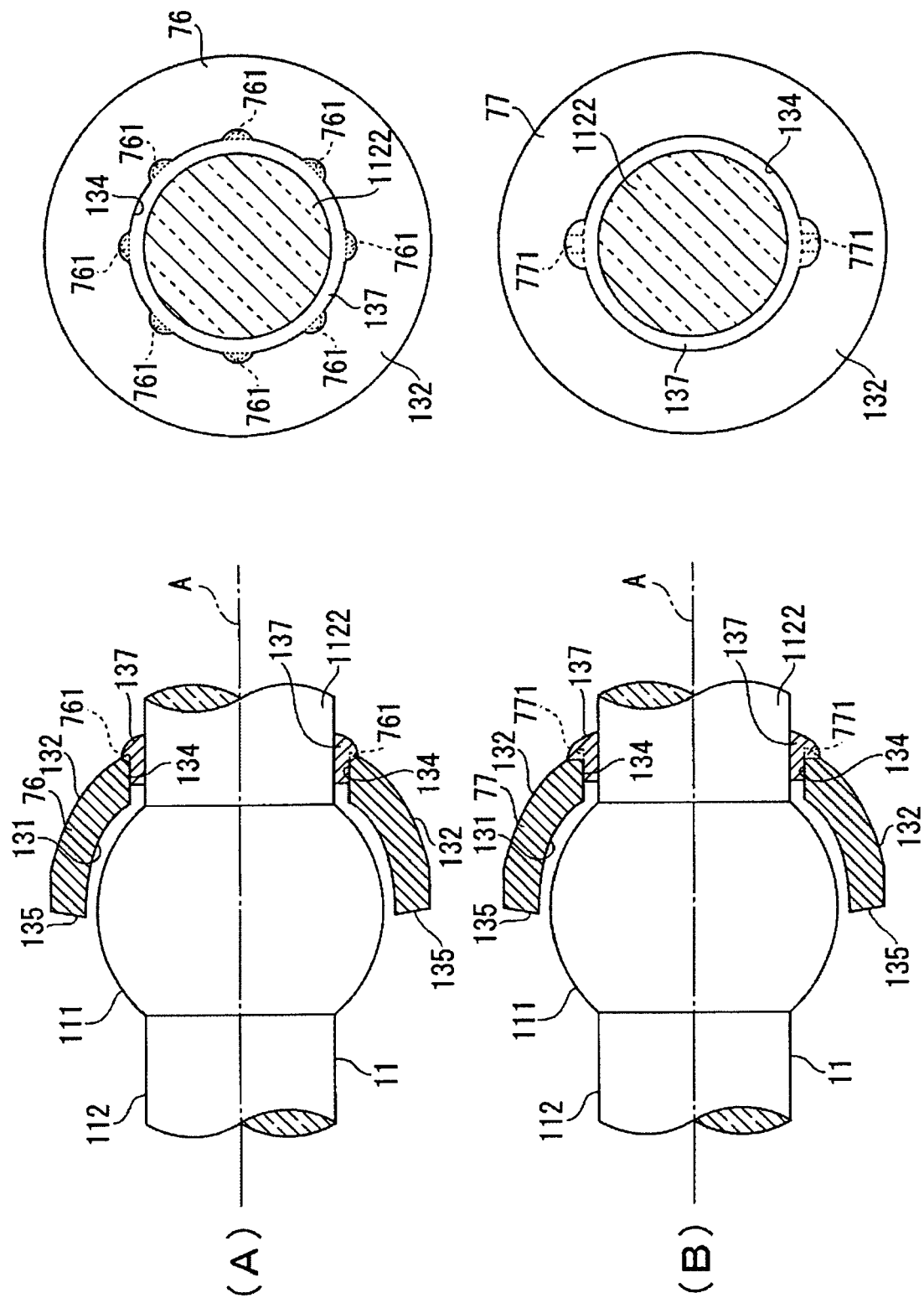
[FIG. 16]

In contrast, as shown in FIG. 16(A), the secondary reflecting mirror 76 according to the third embodiment is different in that a plurality of notched grooves 761 are formed along the ridged line at the meeting point between the outer peripheral surface 132 and the adhering surface 134.

The notched grooves 761 are formed so as to extend outward from the peripheral edge of the opening for inserting the sealed section 1122 of the secondary reflecting mirror 76, and the shape of each notched groove 761 is substantially triangular when viewed from the front.

Such notched grooves 761 can be formed by generating intentionally chipping of 0.1 mm or larger along the peripheral edge of the opening on the outer peripheral surface 132 when machining the opening on the secondary reflecting mirror 76. Although the notched grooves 761 are formed at eight positions so as to extend outward from the opening in FIG. 16(A), the positions and the number of the notched grooves 761 may be varied as needed depending on the quality of the adhesive agent 137.

In addition to the notched grooves 761 by chipping, the secondary reflecting mirror 77 having grooves 771 formed along the peripheral edge of the opening on the outer peripheral surface 132 by grinder or the like may also be employed, as shown in FIG. 16(B).

The light source unit provided with the secondary reflecting mirrors 76 and 77 may be manufactured in the same manner as the method of manufacturing in the first embodiment using the manufacturing device 60 in the first embodiment.

However, when applying the adhesive agent 137 of silica/alumina between the adhering surface 134 and the outer peripheral surface of the sealed section 1122, the adhesive agent is applied so as to be mounded on the outer peripheral surface 132 on the outside of the opening so that the adhesive agent 137 is filled also within the respective notched grooves 761 or the grooves 771 to achieve fixation.

According to the secondary reflecting mirrors 76 and 77 of the third embodiment, the following effects in addition to the effects described in (1) to (10) are achieved.

(14) Since the notched grooves 761 or the grooves 771 are formed along the peripheral edges of the opening on the secondary reflecting mirrors 76, 77, and hence the adhesive agent 137 can be filled in the notched grooves 761 and the grooves 771, the secondary reflecting mirrors 76, 77 can be prevented from rotating with respect to the light source lamp 11 after the adhesive agent 137 is cured, so that displacement of the secondary reflecting mirrors 76, 77, which have been positioned with respect to the light source lamp 11, after the adhesive agent 137 is cured may be prevented. Therefore, lowering of the illumination intensity of illumination emitted from the light source unit 10 may be prevented.

[4] Fourth Embodiment

Subsequently, a fourth embodiment of the present invention will be described. In the description below, parts and members which have already been described are represented by the identical numerals and the description will be omitted or simplified.

As described above, the secondary reflecting mirror 13 according to the first embodiment has the outer peripheral surface 132 being curved surface so as to follow the curvature of the reflecting surface 131, and the outer peripheral surface 132 is polished so as to follow the reflecting surface 131 and the thickness thereof are substantially uniform (FIG. 4(B)).

In contrast, a secondary reflecting mirror 81 according to the present embodiment is different in cross-sectional shape.

Also, when depositing and forming the dielectric multilayer film on the reflecting surface, the preparation as described later is performed.

Figure 17:
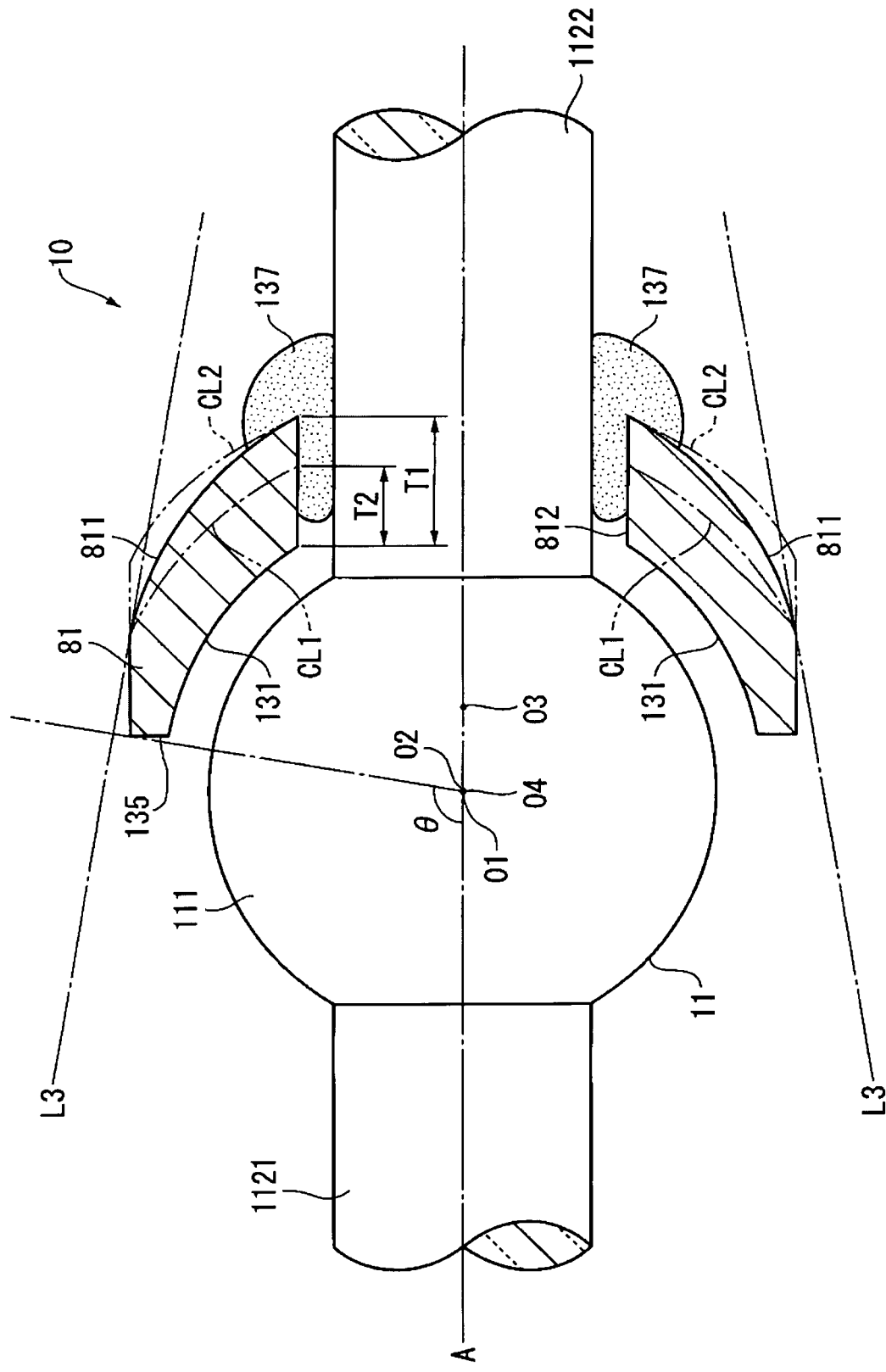
[FIG. 17]

In the secondary reflecting mirror 81, as shown in FIG. 17, both of the reflecting surface 131 and an outer peripheral surface 811 are spherical surface, and the portion where an adhering surface 812 to be mounted to the front sealed section 1122 is formed has a larger thickness in comparison with the end where the reflecting surface 131 which comes into contact with the light emitting section 111 is formed. Therefore the area of the adhering surface 812 is large.

Such difference in thickness is resulted from the fact that the center O3 of curvature of the outer peripheral surface 811 and the center O1 of curvature of the reflecting surface 131 are displaced from each other on the illumination axis A.

The secondary reflecting mirror 81 as described above almost occupies the space defined by the circular cone (See also FIG. 2) shown by the above-described boundaries L3 and L4 and the light source lamp 11.

Here, though the distance between the center O3 of curvature of the outer peripheral surface 811 and the center O1 of curvature of the reflecting surface 131 varies depending on the shape of the secondary reflecting mirror 81 or the light source lamp 11, it is set to 1.7 mm in the present embodiment.

Figure 29:
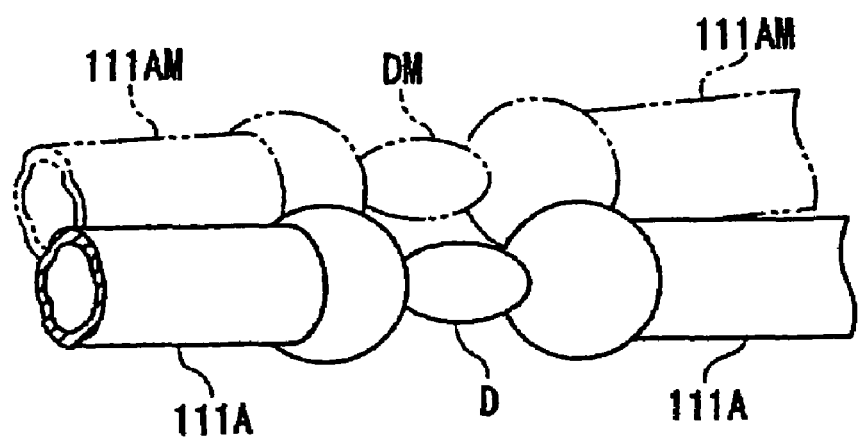
[FIG. 29]
Figure 29:
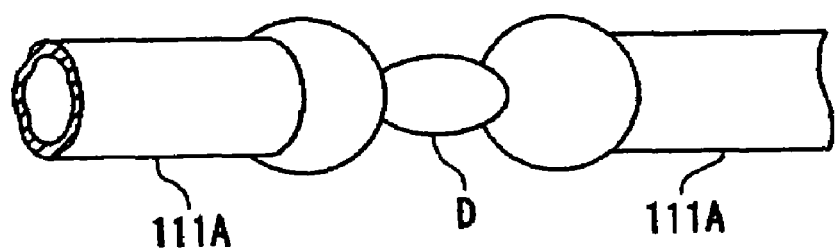
Figure 29:
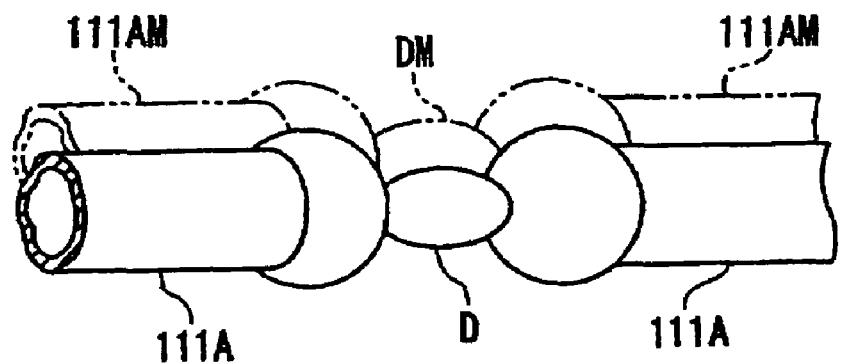

In the present embodiment, the center O4 of the sphere of the light emitting section 111 substantially matches the center O2 (FIG. 29) of light emission between electrodes 111A in the light emitting section 111. The outer peripheral surface 811 is formed into a spherical shape of Φ14.4 mm. When mounting the secondary reflecting mirror 81 to the front sealed section 1122, the center O4 of sphere of the light emitting section 111 and the center O1 of the curvature of the reflecting surface 131 are matched and the distance between the center L4 of the sphere of the light emitting section 111 and the outer peripheral surface 811 is set to 7.2 mm, which corresponds to the radius of the sphere including the outer peripheral surface 811. Accordingly, the outer peripheral portion of the secondary reflecting mirror 81 is accommodated within the circular cone shown by the boundaries L3 and L4. The angle θ formed between the portion of the illumination axis A on the proximal (rear) side in the direction of emission of the luminous flux and the luminous flux radiated from the light emitting section 111 and directly entering the oval reflector 12 is 105° or below.

Here, for example, the outer peripheral surface of the secondary reflecting mirror having the centers of curvature O1, O3 of the reflecting surface 131 and the outer peripheral surface 811 being coaxial is such that the thickness T2 of the portion on which the adhering surface on the front sealed section 1122 is formed is thinner than the thickness T1 of the secondary reflecting mirror 81, which has the center O3 of curvature deviated from the center O1 of curvature as shown by the two-dot chain line CL1 in FIG. 17, and hence the sufficient area of the adhering surface 812 cannot be secured.

The outer peripheral surface of the secondary reflecting mirror having the entire thickness set to the same value as the thickness T1 protrude from the circular cone shown by the boundaries L3 and L4, as shown by the two-dot chain line CL2 in FIG. 17, and hence the luminous flux reflected by the oval reflector 12 is intercepted.

Such a secondary reflecting mirror 81 is formed, for example, by polishing a thick cylindrical member 136a (14 mm in outer diameter Φ in this case), and the center of curvature of polishing is moved after having formed the reflecting surface 131 and then the outer peripheral surface 811 is formed.

In this case, the plurality of notched grooves 761, 771 as in the third embodiment described above (FIGS. 22(A), (B)) may be formed along the ridge at the meeting point between the outer peripheral surface 811 of the secondary reflecting mirror 81 and the adhering surface 812.

Then, a dielectric multi-layer film of tantalum pentoxide (Ta2O5) and silica dioxide (SiO2) is deposited and formed on the reflecting surface 131. As a preparation, masking of the adhering surface 812 is performed in the following manner.

Figure 18:
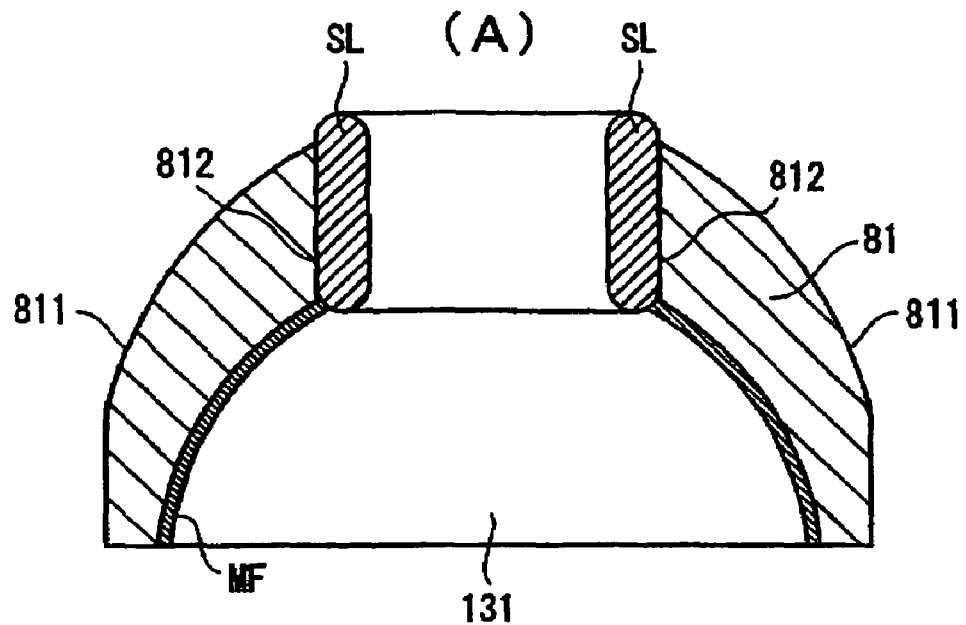
[FIG. 18]
Figure 18:
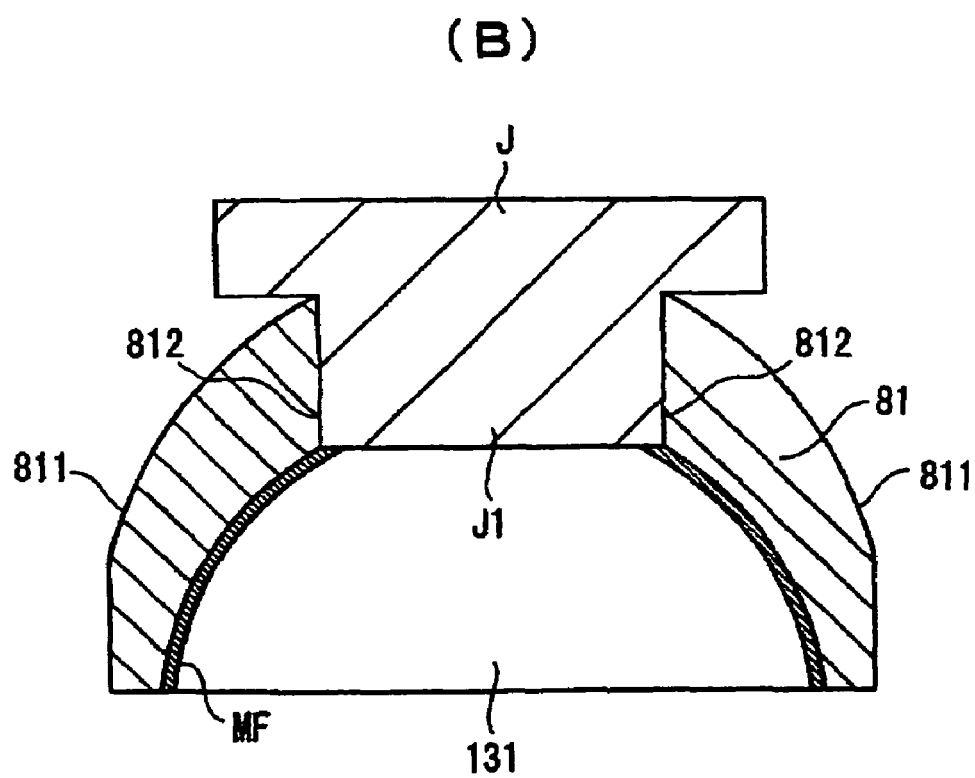

The secondary reflecting mirror 81 on which masking is performed is shown in FIGS. 18(A), (B).

The adhering surface 812 is coated with a sealing material SL which cures like rubber (or gel) as masking, as shown in FIG. 18(A). When deposition of a dielectric multilayer film MF of the reflecting surface 131 is performed in this state, the dielectric multilayer film does not extend over and attached onto the adhering surface 812, so that the adhering surface 812 can be maintained in a flat and smooth state. The sealing material SL is to be removed after the dielectric multilayer film MF is formed.

Masking on the adhering surface 812 may be performed by covering the adhering surface 812 with a jig J which fits the opening for inserting the sealed section 1122 of the secondary reflecting mirror 81, as shown in FIG. 18(B) as well. The distal portion of the jig J forms a disk-shaped fitting portion J1 which entirely comes into abutment with the adhering surface 812. Deposition and formation of the dielectric multilayer film MF is performed with the respective openings of the secondary reflecting mirror 81 closed with the jigs J and the adhering surface 812 masked.

Then, the secondary reflecting mirror 81 manufactured in the manner described above is mounted to the sealed section 112 of the light source lamp 11 and the adhesive agent 137 of silica/alumina is applied from the side of the outer peripheral portion 811. In this case, it is applied so as to be mounded on the outside of the outer peripheral surface 811.

The light source unit having the secondary reflecting mirror 81 can be manufactured in the same manner as the method of manufacturing in the first embodiment using the manufacturing device 60 in the first embodiment.

According to the fourth embodiment as described above, the following effects in addition to the effects (1) to (10) described in the aforementioned embodiments are achieved.

(15) Since the center O3 of the curvature of the outer peripheral surface 811 is displaced at the position forwardly of the center O1 of the curvature of the reflecting surface 131 on the illumination axis A so that the secondary reflecting mirror 81 is accommodated within the circular cone shown by the boundaries L3 and L4, interception of light emitted from the oval reflector 12 is prevented further reliably and the luminous efficiency of light emitted from the light source lamp 11 can further be improved, whereby illumination of high illumination intensity can be emitted form the light source unit.

In this structure, the area of the adhering surface 812 may be increased by increasing the length of the secondary reflecting mirror 81 in the direction of the illumination axis A within the range in which the secondary reflecting mirror 81 is accommodated within the circular cone shown by the boundaries L3 and L4, that is, within the area in which luminous flux cannot be used, thereby being adhered firmly to the light source lamp 11. Therefore, lowering of the illumination intensity of illumination emitted from the light source unit 10 can be prevented.

(16) Since the area of the secondary reflecting mirror 81 extending toward the proximal (rear) side of the illumination axis A in the direction of emission of the luminous flux and covering the light emitting section 111 between the circular cone shown by the boundaries L3 and L4 and the outer peripheral portion of the light source lamp 11 may be increased, and hence the maximum angle θ formed between the rear portion of the illumination axis A in the direction of emission of the luminous flux and the luminous flux entering from the light emitting section 111 directly to the oval reflector 12 may be reduced, the size of the oval reflector 12 in the direction of the illumination axis A may further be reduced.

(17) Since masking is performed on the adhering surface 812 so that the dielectric multi-layer film is not adhered dispersedly on the adhering surface 812 when depositing and forming the dielectric multi-layer film on the reflecting surface 131, the adhering strength can be improved. Therefore, lowering of the illumination intensity of illumination emitted from the light source unit 10 can be prevented.

[5] Fifth Embodiment

Subsequently, a fifth embodiment of the present invention will be described. In the description below, parts and members which have already been described are represented by the identical numerals and the description will be omitted or simplified.

The secondary reflecting mirrors 13, 71, 73, 74, 76, 81 are manufactured by cutting or polishing the cylindrical member as a base in the aforementioned embodiments.

In contrast, the secondary reflecting mirror according to the fifth embodiment is different in that base material such as quartz or alumina ceramics is brought into a melted state, and press-molded.

Figure 21:
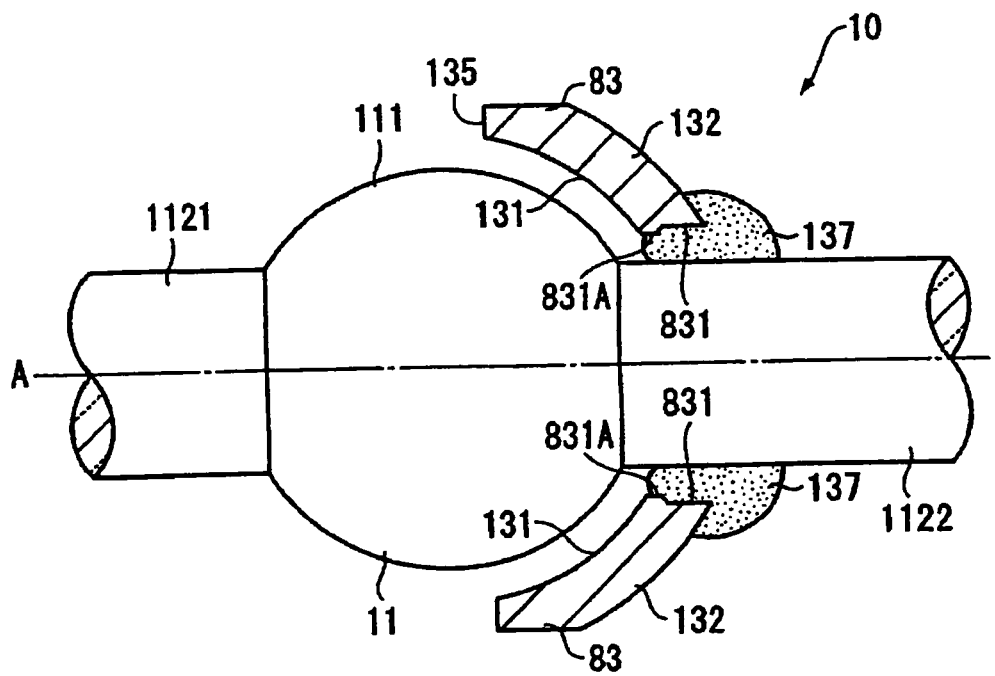
[FIG. 21]

In other words, as shown in FIG. 21, the secondary reflecting mirror 75 according to the fifth embodiment is formed with a necked portion 753 extending from a reflecting surface 751 and an outer peripheral surface 752 toward the distal (front) side of the light source lamp 11, and is formed with an adhering surface 754 on the inner surface side of the neck portion 753. The adhering surface 754 is formed as an inner peripheral surface of a truncated conical shaped hole which gradually increases in diameter from the reflecting surface 751 toward the distal (front) side, so that the adhesive agent can easily be injected therein from the distal (front) side of the secondary reflecting mirror 75.

A proximal end surface 755 of the secondary reflecting mirror 75 is formed as an inclined surface extending along the maximum angle θ formed between light emitted from the light emitting section 111 and directly entering the oval reflector 12 and the portion of the illumination axis A on the proximal (rear) side in the direction of emission of the luminous flux, and the meeting point with the outer peripheral surface 752 is chamfered into an R-surface, so as to be accommodated within the circular cone shown by the boundaries L3 and L4.

In addition, a distal end surface 756 of the secondary reflecting mirror 75 is configured as a cross-section of R-surface.

Formation of the R-surface at the end of the secondary reflecting mirror 75 is employed considering removal from the die after press-molding and devised to prevent deformation of the reflecting surface 751 by being caught on the die at the time of removal from the die at the end thereof.

The light source unit provided with the secondary reflecting mirror 75 can be manufactured in the same manner as the method of manufacturing in the first embodiment using the manufacturing device 60 in the first embodiment.

Since the secondary reflecting mirror 75 is formed with the adhering surface 754 in the form of the truncated conical shaped hole, which is gradually increasing in diameter from the reflecting surface 751 toward the distal (front) side, if the sufficient adhesive agent can be injected between the adhering surface 754 of the secondary reflecting mirror 75 which is adjusted to the position at which the maximum illumination intensity is achieved and the outer peripheral surface of the light source lamp 11, the operation to move the secondary reflecting mirror 75 to distribute the adhesive agent evenly may be omitted in (Step S7).

According to the fifth embodiment, the following effects in addition to the effects shown in (1), (2), (4), (6) to (10) described in the embodiment described above are achieved.

(18) Since the secondary reflecting mirror 75 is formed by press-molding, the secondary reflecting mirrors 75 with a high degree of accuracy can be manufactured in large quantities for a short time in comparison with the case of machining the cylindrical member.

Also, since press-molding is employed, flexibility in shape of the secondary reflecting mirror 75 is high in comparison with cutting or polishing, various shapes of secondary reflecting mirror can be manufactured.

(19) Since the secondary reflecting mirror 75 is formed with the neck portion 753, the sufficient length of the adhering surface 754 can be secured so that the adhering area with respect to the sealed section 1122 is increased to assure firm fixation to the light source lamp 11. In addition, by forming the adhering surface 754 into the truncated conical inner periphery broadening toward the distal (front) side, the adhesive agent can easily be injected therein and hence further strong adhesion and fixation are achieved. Therefore, lowering of the illumination intensity of illumination emitted from the light source unit 10 can be prevented.

(20) Since the secondary reflecting mirror 75 is formed with the adhering surface 754 in the form of a truncated conical shape hole gradually increasing in diameter from the reflecting surface 751 toward the distal (front) side, the adhesive agent can easily be injected from the distal (front) side of the illumination axis A in the direction of emission of the luminous flux onto the adhering surface 754 of the secondary reflecting mirror 75.

Figure 19:
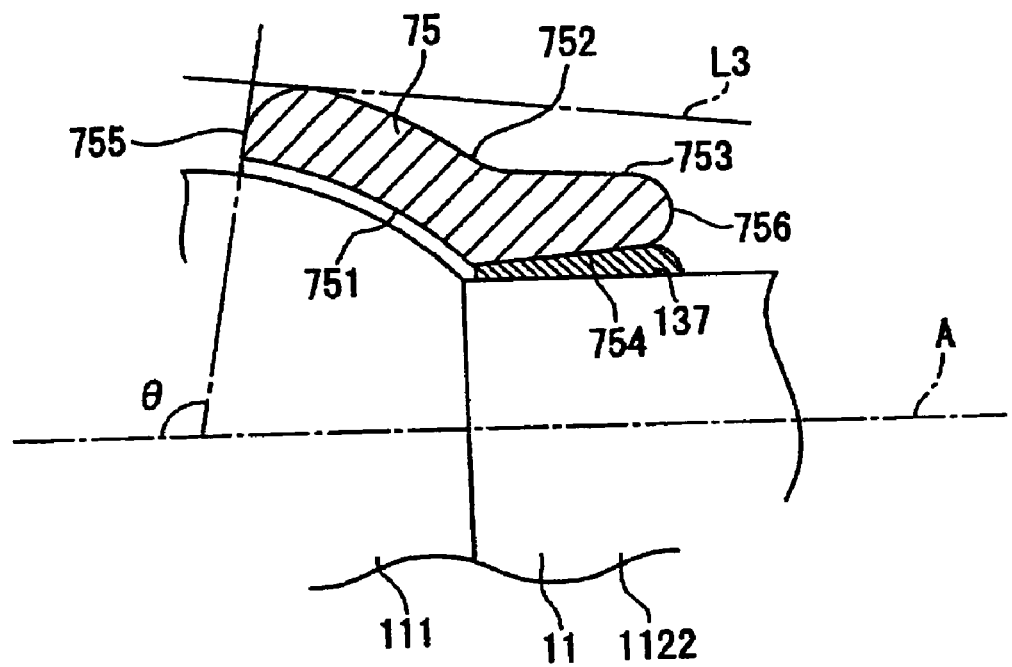
[FIG. 19]

After the adhesive agent 137 is cured, the secondary reflecting mirror 75 having the adhering surface 745 in such a shape can restrict movement of the secondary reflecting mirror 75 toward the direction of emission of the luminous flux (right side in FIG. 19) of the illumination axis A with respect to the light source lamp 11. Therefore, lowering of the illumination intensity of illumination emitted from the light source unit 10 can be prevented.

(21) In the method of manufacturing the light source unit provided with the secondary reflecting mirror 75, since the secondary reflecting mirror 75 is formed with the adhering surface 754 in the form of the truncated conical shaped hole gradually increasing in diameter toward the distal (front) side from the reflecting surface 751 so that the adhesive agent can easily be injected from the distal (front) side of the illumination axis A in the direction of emission of the luminous flux onto the adhering surface 754 of the secondary reflecting mirror 75 and the adhesive agent 137 can be filled sufficiently between the adhering surface 754 and the outer peripheral surface of the sealed section 1122, the operation to move the secondary reflecting mirror 75 to distribute the adhesive agent evenly can be omitted, and hence the manufacturing operation may be simplified.

[6] Sixth Embodiment

Subsequently, a sixth embodiment of the present invention will be described. In the description below, parts and members which have already been described are represented by the identical numerals and the description will be omitted or simplified.

The adhering surfaces 134, 812 according to the embodiment described above is formed into a cylindrical shape having the same diameter from the reflecting surface 131 to the outer peripheral surface or the distal end surface.

In contrast, a secondary reflecting mirror 84 according to the present embodiment is different in that an adhering surface 841 is formed into a conical truncated shaped tapered surface gradually reducing in diameter from the outer peripheral surface 132 toward the reflecting surface 131. As regards other structures such as the outer peripheral surface, the embodiments described above can be applied.

Figure 20:
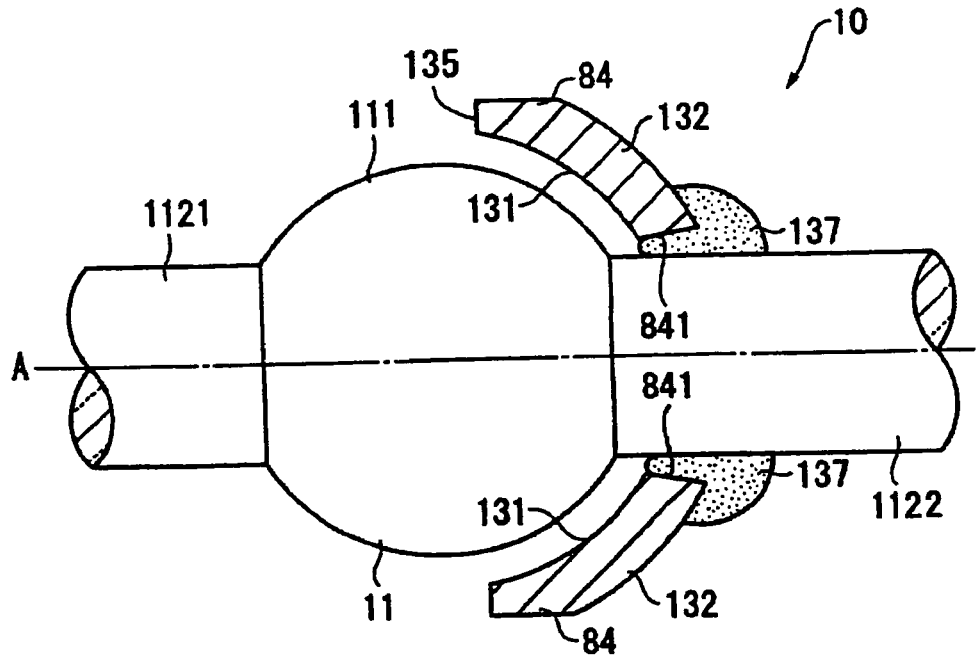
[FIG. 20]

The adhering surface 841 of the secondary reflecting mirror 84 is, as shown in FIG. 20 as well, formed into a truncated conical shaped tapered surface gradually reducing in diameter from the outer peripheral surface 132 toward the reflecting surface 131. In other words, the distance between the adhering surface 841 and the sealed section 1122 is small on the side of the reflecting surface 131, and the area of the reflecting surface 131 is increased correspondingly. On the contrary to the side of the reflecting surface 131, the distance between the adhering surface 841 and the sealed section 1122 is large on the side of the outer peripheral surface 132.

The light source unit provided with the secondary reflecting mirror 84 can be manufactured in the same manner as the method of manufacturing in the first embodiment using the manufacturing device 60 in the first embodiment.

Since the secondary reflecting mirror 84 is formed with the adhering surface 841 of the truncated conical shaped hole gradually increasing in diameter from the reflecting surface 131 toward the outer peripheral surface 132, if the sufficient adhesive agent can be injected between the adhering surface 841 of the secondary reflecting mirror 84 which is adjusted to the position at which the maximum illumination intensity is achieved and the outer peripheral surface of the light source lamp 11, the operation to move the secondary reflecting mirror 84 to distribute the adhesive agent evenly may be omitted in (Step S7).

According to the sixth embodiment as described above the following effects in addition to the effects described in the aforementioned embodiments are achieved.

(22) The adhesive agent 137 can easily be injected from the side of the outer peripheral surface 132 being larger in distance between the adhering surface 841 and the sealed section 1122, and the adhesive agent 137 is prevented from flowing over the portion near the adhering surface 841 on the side of the reflecting mirror 131, being smaller in diameter, thereby preventing deterioration of reflecting property of the secondary reflecting mirror 84. In addition, since the reflecting surface 131 is increased at the reduced diameter portion, it can further contribute to improve the luminous efficiency of light from the light source.

Also, after the adhesive agent 137 is cured, the secondary reflecting mirror 83 may be restricted mechanically from moving rearwardly of the direction of emission of the luminous flux with respect to the light source lamp 11 by the tapered portion which is reduced in diameter.

[7] Seventh Embodiment

Subsequently, a seventh embodiment of the invention will be described. In the description below, parts and members which have already been described are represented by the identical numerals and the description will be omitted or simplified.

The adhering surfaces 134, 754, 812, 841 of the secondary reflecting mirrors in the aforementioned embodiments, a shoulder or a projection is not formed.

In contrast, a secondary reflecting mirror 83 according to the present embodiment is different in that an adhering surface 831 is formed with a shoulder. As regards other structures such as the outer peripheral surface, the embodiments described above can be applied.

As shown in FIG. 21 as well, according to the secondary reflecting mirror 83, the end of the adhering surface 831 on the side of the reflecting surface 131 projects toward the outer peripheral surface of the sealed section 1122, and is formed with a shouldered portion having a surface continuing from the reflecting surface 131, and this part is represented as a shoulder 831A. In other words, the shoulder 831A corresponds to the meeting point between the adhering surface 831 and the reflecting surface 131 on the side of the reflecting surface 131.

The distance between the adhering surface 831 and the sealed section 1122 is increased from the meeting point between the outer peripheral surface 132 and the adhering surface 831 to the shoulder 831A.

The light source unit provided with the secondary reflecting mirror 83 can be manufactured in the same manner as the method of manufacturing in the first embodiment using the manufacturing device 60 in the first embodiment.

As regards the secondary reflecting mirror 83, since the distance between the adhering surface 831 and the sealed section 1122 is increased from the meeting point between the outer peripheral surface 132 and the adhering surface 831 to the shoulder 831A, if the sufficient adhesive agent can be injected between the adhering surface 831 of the secondary reflecting mirror 83 which is adjusted to the position at which the maximum illumination intensity is achieved and the outer peripheral surface of the light source lamp 11, the operation to move the secondary reflecting mirror 83 to distribute the adhesive agent evenly may be omitted in (Step S7).

According to the seventh embodiment, the following effects in addition to the effects described in the aforementioned embodiments are achieved.

(23) Since the adhesive agent 137 can be injected easily from the side of the outer peripheral surface 132 in which the distance between the adhering surface 132 and the sealed section 1122 is large and, in addition, the adhesive agent 137 can be blocked by the shoulder 831A, the adhesive agent 137 is prevented from flowing over and contaminating the reflecting surface 131.

In addition, with the shoulder 831A, the secondary reflecting mirror 83 is restricted mechanically from moving rearwardly of the direction of emission of the luminous flux with respect to the light source lamp 11 after the adhesive agent 137 is cured.

In addition, since the luminous flux radiated from the light emitting section 111 can be reflected at the meeting point between the shoulder 831A and the reflecting surface 131, it can contribute to improve the luminous efficiency of light from the light source.

[8] Eighth Embodiment

Subsequently, an eighth embodiment of the present invention will be described. In the description below, parts and members which have already been described are represented by the identical numerals and the description will be omitted or simplified.

The adhering surface 134, 812 of the secondary reflecting mirror according to the aforementioned embodiments are formed into a cylindrical shape of the same diameter from the reflecting surface 131 to the outer peripheral surface or to the distal end surface.

Figure 22:
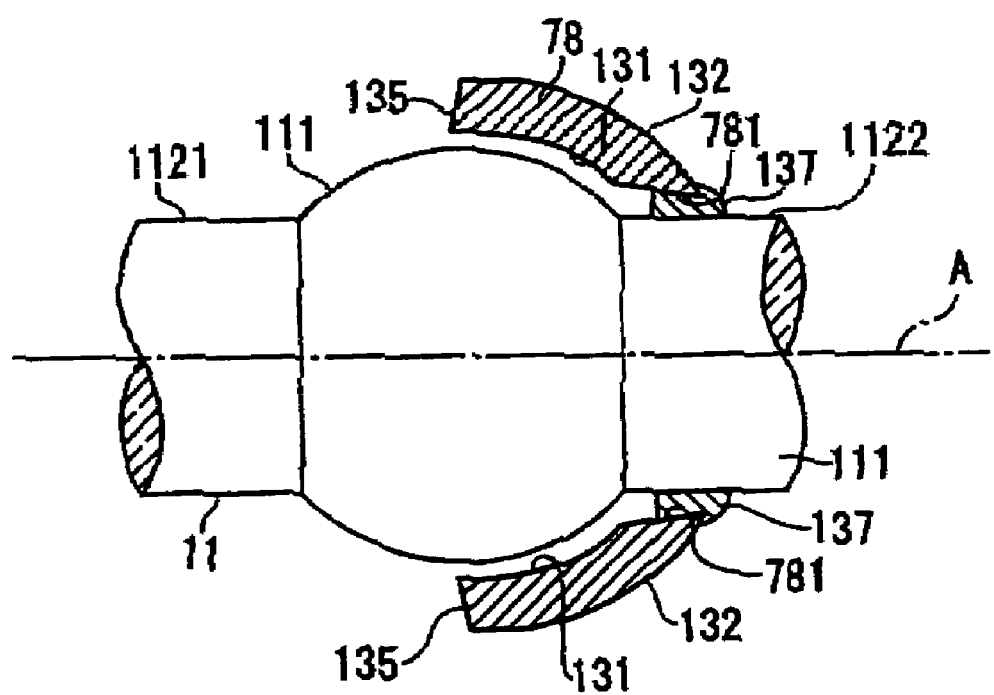
[FIG. 22]

In contrast, a secondary reflecting mirror 78 of the present embodiment is, as shown in FIG. 22, different in that an adhering surface 781 on the inner peripheral surface of the opening is formed into a truncated conical shaped tapered surface gradually reducing in diameter from the reflecting surface 131 to the outer peripheral surface 132. As regards other structure such as the outer peripheral surface, the aforementioned embodiment can be applied.

The secondary reflecting mirror 78 as described above is mounted to the sealed section 1122 of the light source lamp 11, and the adhesive agent 137 is applied thereon from the side of the outer peripheral surface 132. In this case, the adhesive agent 137 can be applied so as to be mounted on the outside of the outer peripheral surface 132.

Figure 23:
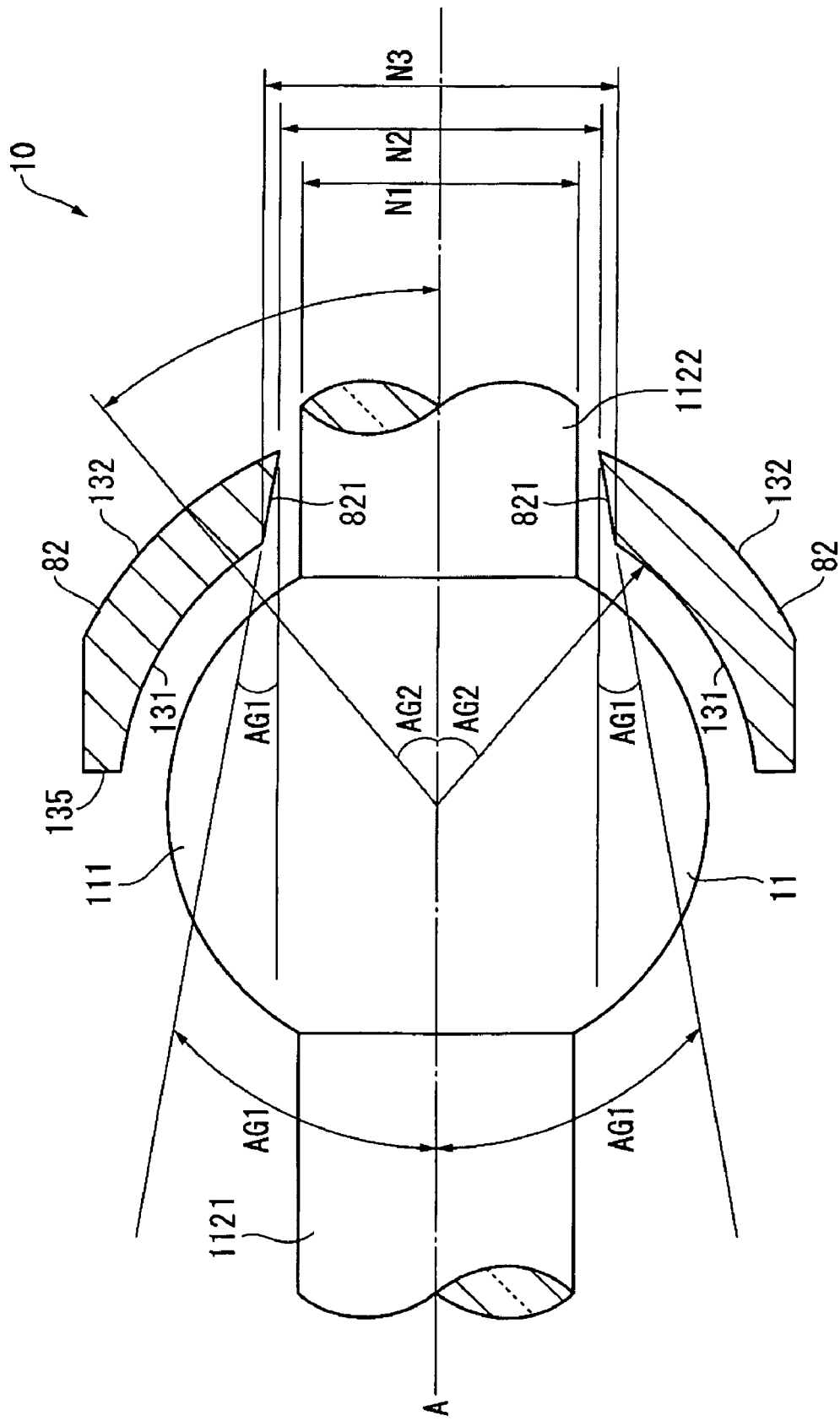
[FIG. 23]

In the case of the secondary reflecting mirror 82, the tapered angle AG1 of the adhering surface 821 is set to 10° with respect to the illumination axis A, as shown in FIG. 23 as well.

When the outer peripheral surface of the sealed section 1122 and the illumination axis A are parallel to each other, the adhering surface 821 also forms the tapered angle AG1 with respect to the outer peripheral surface of the sealed section 1122.

Figure 24:
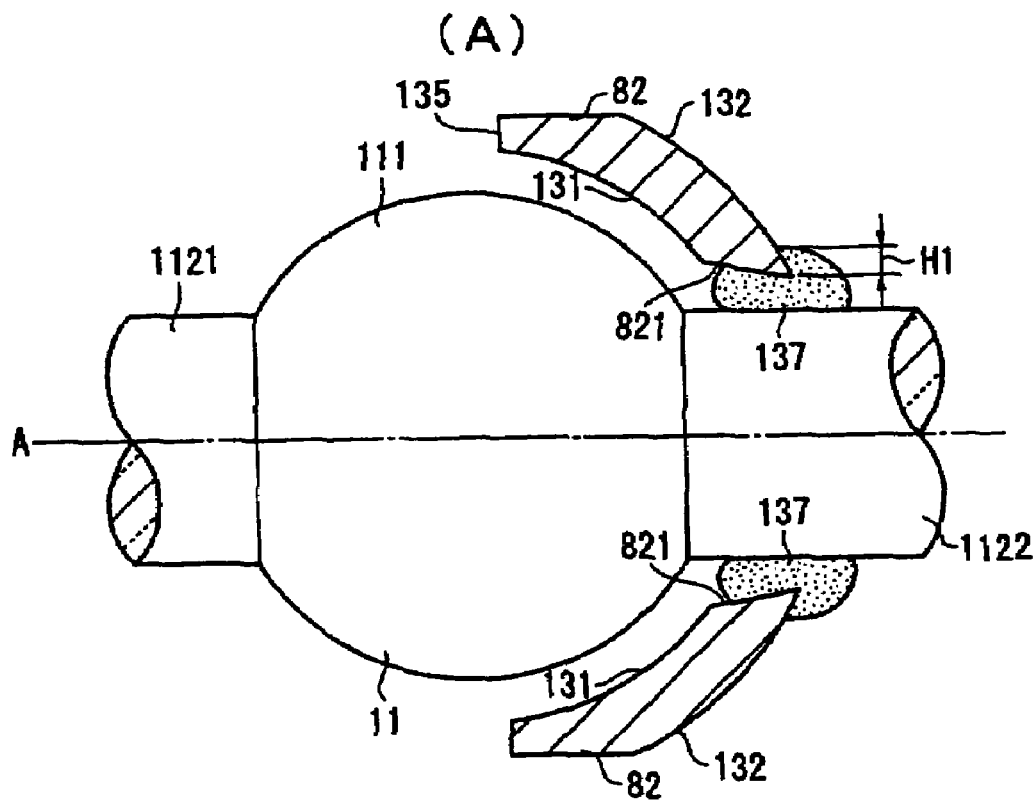
[FIG. 24]
Figure 24:
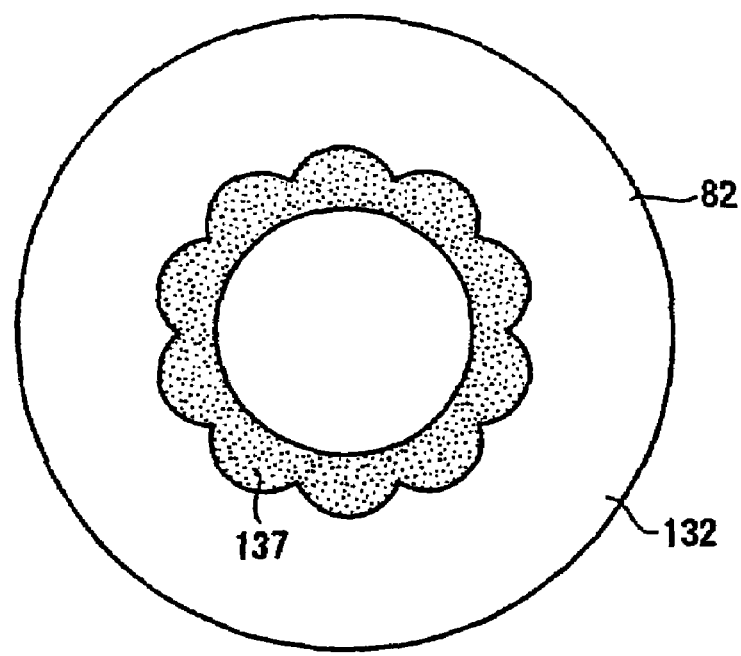

In addition, the adhesive agent 137 to be applied between the adhering surface 821 and the sealed section 1122 is applied so as to be mounded roundly about 1 mm in height from the adhering surface 821 on the outside of the outer peripheral surface 132 (See H1 in FIG. 24(A)), as shown in FIG. 24(A). When the portion on which the adhesive agent 137 is applied is viewed from the front side of the light emitting section 111 in the direction of emission of the luminous flux, as shown in FIG. 24(B), the adhesive agent 137 is formed into a ring-shape that the mounded portion is continuing along the peripheral edge of the opening for inserting the sealed section 1122 of the secondary reflecting mirror 82.

Here, the tapered angle AG1 (FIG. 23) may be set as appropriate within the range between 1° and 10° inclusive depending on the shapes of the secondary reflecting mirror 82, the oval reflector 12, and the light source lamp 11.

In the present embodiment, for example, the diameter of the opening for inserting the sealed section 1122 of the secondary reflecting mirror 82 on the side of the outer peripheral surface 132 is set to N2, which is the largest outer diameter N1 of the sealed portion 1122 plus 0.5 mm. Then, the sufficient reflecting surface 131 is secured so that the light-usable angle AG2 formed between the ridge at the meeting point between the reflecting surface 131 and the adhering surface 821 and the illumination axis A becomes 40° or smaller. The diameter of the opening of the secondary reflecting mirror 82 on the side of the reflecting surfaces 131 at this time is shown as N3 in FIG. 23.

The adhesive agent 137 is filled as needed depending on the shapes of the secondary reflecting mirror 81 and the light source lamp 11, material quality or viscosity of adhesive agent 137. For example, the dimension of the adhering surface 821 in the direction of the illumination axis A is set to 2.94 mm, and the dimension of the adhesive gent 137 on the outside of the outer peripheral surface 132 in the same direction is set to 1 mm. Also, the adhesive agent 137 is applied so as to be mounted by 1 mm from the adhering surface 821.

The light source unit provided with the secondary reflecting mirrors 78 and 82 according to the invention can be manufactured in the same manner as the method of manufacturing in the first embodiment using the manufacturing device 60 in the first embodiment.

According to the eighth embodiment the following effects in addition to the effects described in (1) to (21) in the aforementioned embodiments are achieved.

(24) Since the adhesive agent 137 is applied so as to be mounded on the outside of the outer peripheral surface 132 of the secondary reflecting mirror 78, the secondary reflecting mirror 78 can be restricted from moving toward the distal (front) side (right side in FIG. 22) of the illumination axis A with respect to the light source lamp 11 after the adhesive agent 137 is cured. Since the adhering surface 781 is formed into a tapered surface increasing in diameter toward the proximal (rear) side, the secondary reflecting mirror 78 can be restricted from moving toward the distal (rear) side (left side in FIG. 22) of the illumination axis A in the direction of emission of the luminous flux when the adhesive agent 137 is cured. Therefore, with the secondary reflecting mirror 78 having such an adhering surface 781, when it is fixed to the light source lamp 11 with the adhesive agent 137, movement in the direction of the illumination axis A can be restricted, and hence lowering of the illumination intensity of illumination emitted from the light source unit 10 can be prevented.

(25) Since the meeting point between the adhering surface 821 and the outer peripheral surface 132 forms an acute angle, the adhesive agent 137 is filled in such a manner that the portion of acute angle clamps the adhering surface 821 and the outer peripheral surface 132 from both sides, and firm adhesion is achieved. Even when the adhesive agent of silica/alumina which is high in heat resistance but insufficient in adhesion properties is employed as the adhesive agent 137, the movement of the secondary reflecting mirror 82 is reliably restricted.

Also, since the tapered angle AG1 of the adhering surface 821 is set to the range between 1° and 10° inclusive, the larger reflecting surface 131 can be secured and the luminous flux radiated from the light emitting section 111 can be utilized laconically.

Therefore, the secondary reflecting mirror 81 having such a adhering surface 821, when it is adhered to the light source lamp 11 with the adhesive agent 137, may contributes to improve the luminous efficiency of light from the light source emitted from the light emitting section while restricting the movement of the secondary reflecting mirror 82 in the direction of the illumination axis A sufficiently, whereby the illumination intensity of illumination emitted from the light source unit 10 may be improved.

[9] Ninth Embodiment

Subsequently, a ninth embodiment of the present invention will be described. In the description below, parts and members which have already been described are represented by the identical numerals and the description will be omitted or simplified.

In the aforementioned embodiment, the surfaces of the adhering surfaces 134, 754, 781, 812, 821, 831, 841 of the secondary reflecting mirror are not machined specifically.

Figure 25:
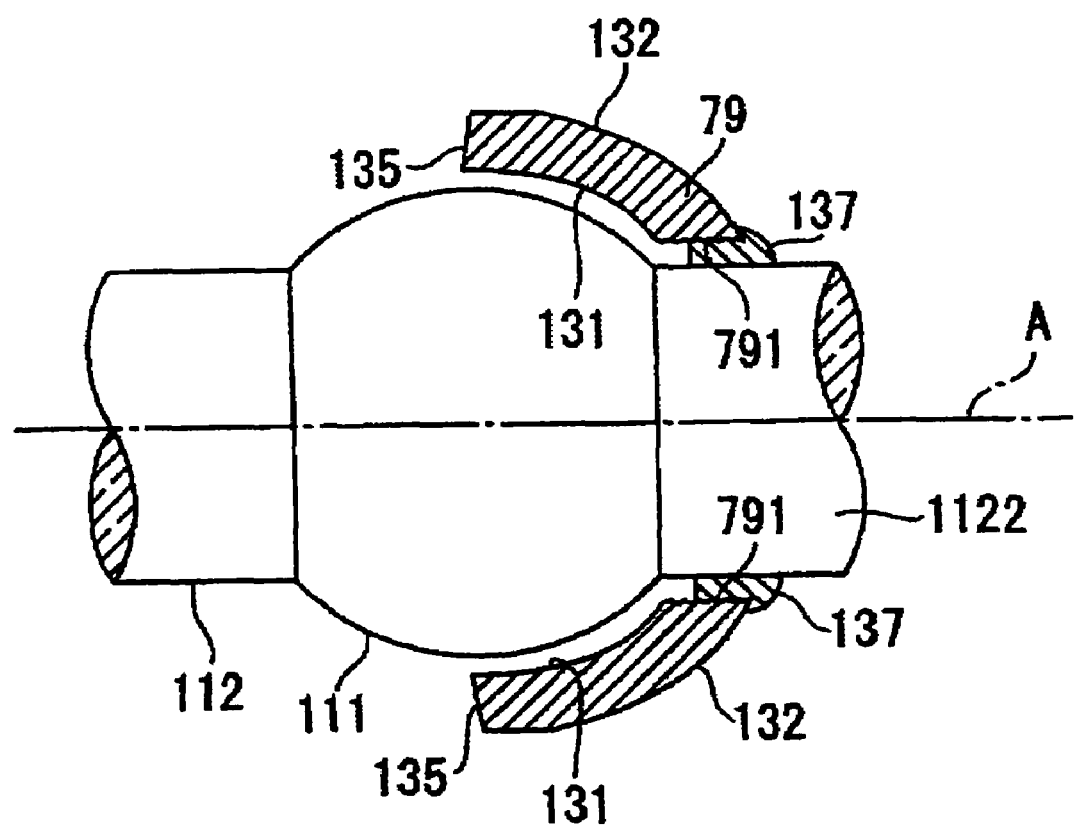
[FIG. 25]

In contrast, a secondary reflecting mirror 79 according to the present embodiment is, as shown in FIG. 25, different in that an adhering surface 791 of the secondary reflecting mirror 79 is formed into a roughened surface with concavity and convexity. As regards other structures such as the outer peripheral surface, the embodiments described above can be applied.

The concavity and convexity on the adhering surface 791 can be formed by roughening the surface by machining, or by conducting chemical processing in the stage of material.

When the adhesive agent 137 is applied on the adhering surface 791, as in the case described above, movement in the direction of the illumination axis A is restricted by the adhesive agent 137 crept into the concavity and convexity and, in addition, rotation about the illumination axis A and displacement in the direction of the illumination axis A can also be restricted.

The light source unit provided with the secondary reflecting mirror 79 can be manufactured in the same manner as the method of manufacturing in the first embodiment using the manufacturing device 60 in the first embodiment.

According to the secondary reflecting mirror 79 of the ninth embodiment, the following effects in addition to the effects of the aforementioned embodiments are achieved.

(26) Since the adhering surface 791 of the secondary reflecting mirror 79 has such structure that the adhesive agent 137 creeps into the concavity and convexity, movement in the direction of the illumination axis A with respect to the light source lamp 11 is restricted after the adhesive agent 137 is cured and, in addition, rotation about the illumination axis A can also be restricted. Therefore, with the secondary reflecting mirror 78 having such an adhering surface 781, when it is fixed to the light source lamp 11 with the adhesive agent 137, movement in the direction of the illumination axis A can be restricted, and lowering of the illumination intensity of illumination emitted from the light source unit 10 can be prevented.

[10] Tenth Embodiment

Subsequently, a tenth embodiment of the present invention will be described. In the description below, parts and members which have already been described are represented by the identical numerals and the description will be omitted or simplified.

In the aforementioned embodiment, process other than cutting, polishing and press-molding is not specifically performed on the outer peripheral surface of the secondary reflecting mirror.

Figure 26:
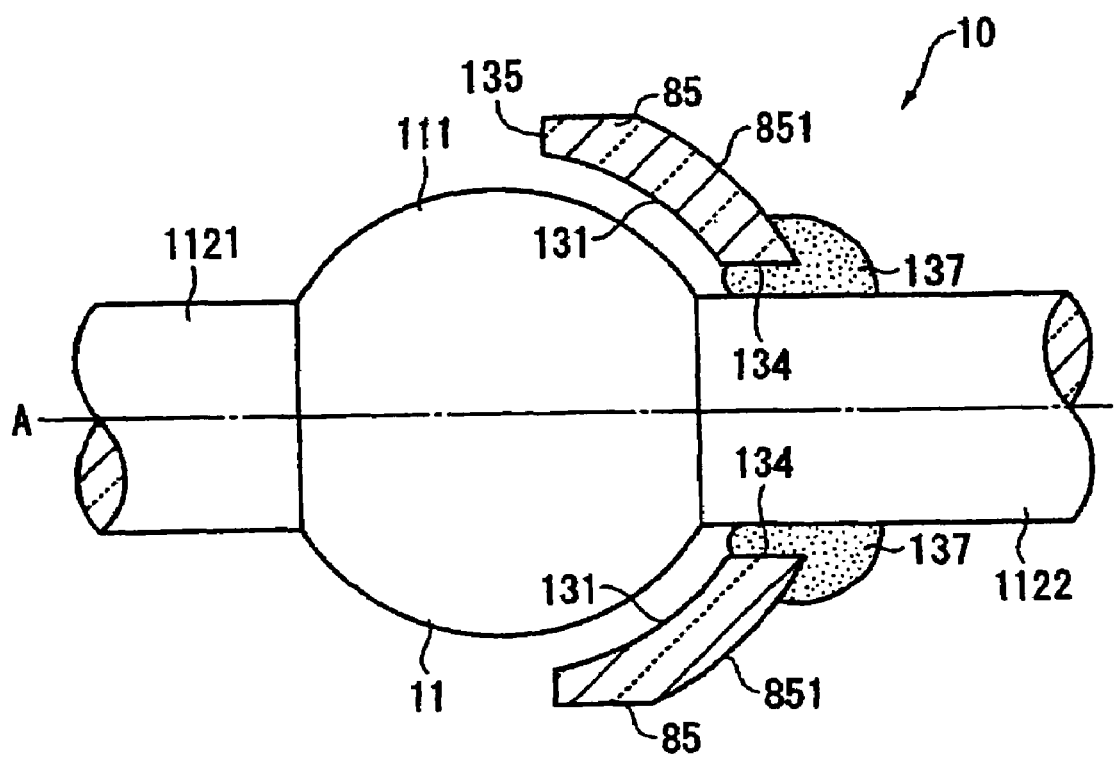
[FIG. 26]

In contrast, a secondary reflecting mirror 85 according to the present embodiment is different in that an outer peripheral surface 851 is mirror polished and provided with translucency so that the adhering surface 134 can see through from the outer peripheral surface 851 (FIG. 26). As regards other structures such as the shape of the outer peripheral surface, the embodiments described above can be applied.

The secondary reflecting mirror 85 is, as described above, formed by polishing the cylindrical member 136 formed of crystallized glass such as quartz or Neo Ceram (trade mark of a product from Asahi Glass Co., Ltd.), or translucent material such as sapphire or alumina ceramics, and then mirror polished by additional polishing process on the outer peripheral surface 851 thereof. The secondary reflecting mirror 85 is transparent from the outer peripheral surface 851 to the back side of the dielectric multi-film on the reflecting surface 131, and from the outer peripheral surface 851 to the adhering surface 13 as shown in FIG. 26.

In this case, coating formation or heat treatment on the outer peripheral surface 851 may be employed as the mirror-polishing.

It is also conceivable to provide the translucency so that, for example, only the portion from the above-described specific machined portion on the outer peripheral surface 851 to the end of the adhering surface 134 on the side of the reflecting surface 131 can be seen through by partial polishing or coating.

Since the secondary reflecting mirror 85 is shaped out from the translucent cylindrical member 136, the portion from the outer peripheral surface 851 to the adhering surface 134 is provided with translucency without polishing into a further smooth surface, and hence the adhering surface 134 can be seen through from the side of the outer peripheral surface 851.

It is also possible to polish the adhering surface 134 further smoothly or to heat up in the substantially same manner as the outer peripheral surface 851, as a matter of course.

In addition, the distance between the adhering surface 134 and the sealing portion 1122 is set to a small distance, and, the area of the reflecting surface 131 is expanded correspondingly.

The light source unit provided with the secondary reflecting mirror 85 can be manufactured in the same manner as the method of manufacturing in the first embodiment using the manufacturing device 60 in the first embodiment. Since the reflecting surface 131 of the secondary reflecting mirror 85 can be seen through from the outer peripheral surface 851, if the adhesive agent can be injected between the adhering surface 841 of the secondary reflecting mirror 84 which is adjusted to the position at which the maximum illumination intensity is achieved and the outer peripheral surface of the light source lamp 11 while viewing the range of application, the operation to move the secondary reflecting mirror 84 to distribute the adhesive agent evenly may be omitted in (Step S7).

According to the tenth embodiment, the following effects in addition to the effects described in the aforementioned embodiments are achieved.

(27) The outer peripheral surface 851 of the secondary reflecting mirror 85 is machine to provide translucency so that the adhering surface 134 can be seen through from the side of the outer peripheral surface 851, and hence the amount of injection of the adhesive agent 137 can be adjusted to the optimal amount while monitoring the state of filling thereof between the adhering surface 134 and the sealed section 1122 so that the adhesive agent 137 is prevented from flowing over the reflecting surface 131.

Therefore, the reflecting property of the secondary reflecting mirror 85 is prevented from being hindered by the adhesive agent 137. In addition, since the management of injection of the adhesive agent 137 is easy as described above, the distance between the adhering surface 134 and the sealed section 1122 is reduced to increase the area of the reflecting surface 131, and hence it can contribute to improve the luminous efficiency of light from the light source.

[11] Eleventh Embodiment

Subsequently, the present embodiment will be described. In the description below, parts and members which have already been described are represented by the identical numerals and the description will be omitted or simplified.

In the method of manufacturing the light source unit provided with the secondary reflecting mirror according to the aforementioned embodiments, the position of the secondary reflecting mirror in the aforementioned embodiments with respect to the light source lamp 11 using the manufacturing device 60 is adjusted by the steps of illuminating the light source lamp 11, detecting the illumination intensity of the luminous flux emitted from the projecting optical system 50 by the integrating sphere 621 in the luminous flux detecting unit 62, and adjusting the position of the secondary reflecting mirror of the aforementioned embodiments with respect to the light source lamp 11 so that the maximum illumination intensity detected by the integrating sphere 621 is achieved.

In contrast, the method of manufacturing the light source unit according to an eleventh embodiment is different in that, in positional adjustment of the secondary reflecting mirror with respect to the light source lamp 11, the position of the secondary reflecting mirror with respect to the light source lamp 11 is adjusted by the steps of using the manufacturing device provided with the luminous flux detecting unit for detecting the amount of displacement between the arc image D formed between the electrodes in the light emitting section 111 and the reflected arc image DM formed by the secondary reflecting mirror 13, picking up the arc image D and the reflected arc image DM of the illuminated light source lamp 11 by an image pickup device such as CCD of the luminous flux detecting unit through the reflecting portion 122 of the oval reflector 12, detecting the amount of displacement between the arc image D and the reflected arc image DM from the images picked up by an image processing unit, and simultaneously, adjusting the position of the secondary reflecting mirror with respect to the light source lamp 11 so that the amount of displacement detected by the luminous flux detecting unit becomes the optimum amount of displacement.

The manufacturing device according to the present embodiment is provided with the retaining frame 61 and the position adjusting mechanism 63 as in the manufacturing device 60. Further, the manufacturing device according to the present embodiment includes a plurality of image pickup devices such as CCD for picking up the arc image D formed between the electrode in the light emitting section 111 and the reflected arc image DM picked up by the secondary reflecting mirror 13 through the reflecting portion 122 of the oval reflector 12, an image processing unit for processing the image picked up by the image pickup devices and calculating the amount of displacement between the arc image D and the reflected arc image DM, and a determination unit for determining whether or not the amount of displacement calculated by the image processing unit is the optimal amount of displacement.

Subsequently, a method of manufacturing the light source unit provided with the secondary reflecting mirror 71 using the manufacturing device will be described based on a flowchart shown in FIG. 27. The light source unit provided with other secondary reflecting mirrors of the aforementioned embodiments may also be manufactured according to the same manufacturing method.

(Step S11) Set the integrated light source lamp 11 and the oval reflector 12 before mounting the secondary reflecting mirror 71 into the retaining frame 61.

(Step S12) Set the secondary reflecting mirror 71 to the grip members 643, 644 of the secondary reflecting mirror holder 640.

Figure 28:
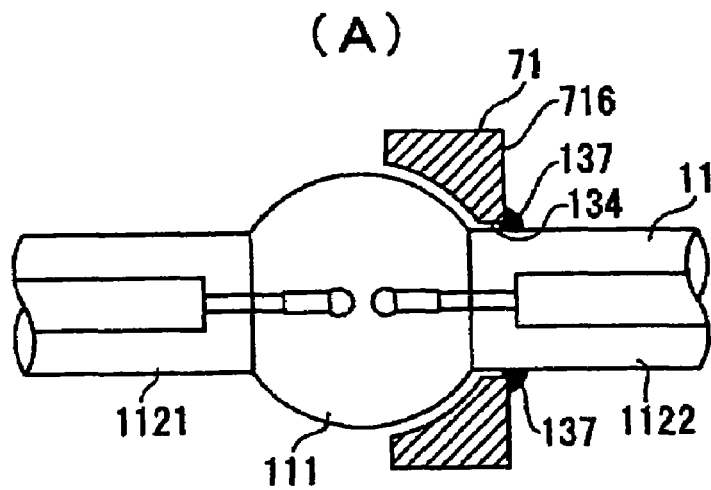
[FIG. 28]
Figure 28:
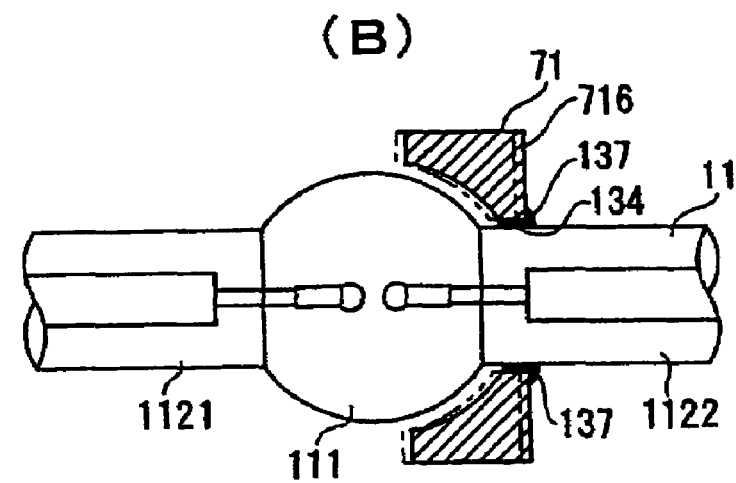
Figure 28:
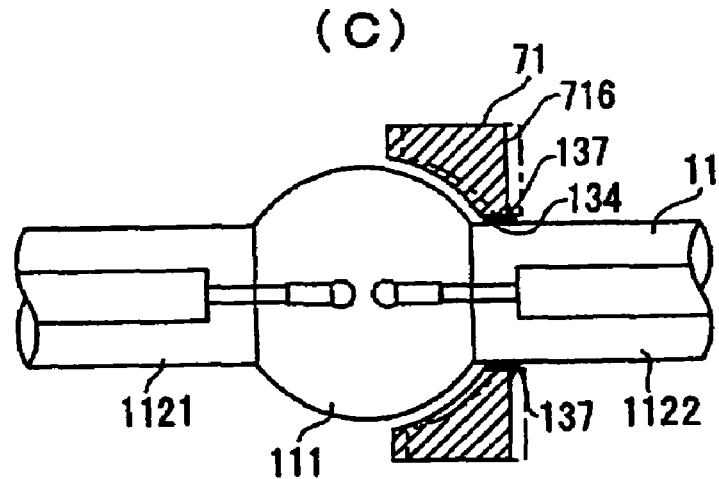

(Step S13) Apply the adhesive agent so as to cross over the distal end surface 716 of the secondary reflecting mirror 71 and the outer peripheral surface of the sealed section 112 as shown in FIG. 28(A).

(Step S14) Turn the light source lamp 11 on.

(Step S15) Pick up an image of the actual arc image D in the light emitting section 111 and the reflected arc image DM formed by the secondary reflecting mirror 71 by the image pickup devices such as CCD.

(Step S16) Calculate the amount of displacement between the arc image D and the reflected arc image DM from the arc image D and the reflected arc image DM picked up by the image pickup device by the image processing unit.

(Step S17) Determine whether or not the amount of displacement between the arc image D and the reflected arc image DM calculated by the image processing unit is an optimal amount by means of the determination unit.

Here, determination of the amount of displacement between the arc image D and the reflected arc image DM is performed in the following manner. That is, as shown in FIG. 29(A), when the arc image D formed between the electrodes 111A and the reflected arc image DM formed between the reflected images 111AM of the electrodes 111A are too far, the reflected arc image DM comes apart from the first focal position of the oval reflector, and hence the reflected arc image DM cannot be used sufficiently as light from the light source. On the other hand, as shown in FIG. 29(B), when the arc image D and the reflected arc image DM are completely matched, the temperature in the light emitting section 111 increases by plasma absorption, and hence the light amount of the reflected arc image DM is decreased. Therefore, as shown in FIG. 29(C), such amount of displacement that the arc image D and the reflected arc image DM are slightly displaced, and partly overlapped is selected as the optimal amount of displacement.

(Step S18) When the determination unit determines that the amount of displacement between the arc image D and the reflected arc image DM is not optimal amount, the Y-axis direction adjusting unit 632, the X-axis direction adjusting unit 633, the Z-axis direction adjusting unit 634, the angular position about Y-axis adjusting unit 635, and the angular position about X-axis adjusting unit of the position adjusting mechanism 63 are operated to adjust the posture of the secondary reflecting mirror 71 in the X-, Y- and X-axis direction. In this case, as shown in FIG. 28(B), (C), and the position is adjusted while repeating the operation of moving the secondary reflecting mirror 71 toward the distal side of the light source lamp 11 and then restoring the original position to distribute the adhesive agent between the outer peripheral surface of the sealed section 112 and the adhering surface 134.

(Step S19) When the determination unit determines that the amount of displacement between the arc image D and the reflected arc image DM is the optimal amount of displacement, the adhesive agent is cured.

(Step S20) When the adhesive agent is cured, the light source lamp is turned off, and the light source unit 10 is removed from the manufacturing device.

The adhesive agent used in the present embodiment is preferably such that a certain period is required until it is cured, and is preferably a special type such as a thermosetting adhesive agent.

According to the eleventh embodiment as described above, the following effects are achieved.

(28) Since the relative position between the light source lamp 11 and the secondary reflecting mirror 71 is adjusted while detecting the amount of displacement between the arc image D and the reflected arc image DM, the luminous efficiency of light from the light source can be improved positively by adjusting the positions of the arc image D and the reflected arc image DM to the state in which the largest light energy is obtained.

(29) By applying the adhesive agent prior to the position adjustment, the adhesive agent can be distributed evenly between the outer peripheral surface of the sealed section 1122 and the adhering surface simultaneously with the position adjustment, and hence the manufacturing procedure can be simplified, thereby achieving strong adhesion and fixation.

[12] Twelfth Embodiment

Subsequently, a twelfth embodiment of the present invention will be described. In the description below, parts and members which have already been described are represented by the identical numerals and the description will be omitted or simplified.

In the eleventh embodiment described above, when manufacturing the light source unit, the position adjustment of the secondary reflecting mirror 71 with respect to the light source lamp 11 is performed with the light source lamp 11 turned on while detecting the arc image D and the reflected arc image DM by an image pickup device 621a so that the optimal amount of displacement is achieved between the arc image D formed between the electrodes in the light emitting section 111 and the reflected arc image DM formed by the secondary reflecting mirror 13.

In contrast, the method of manufacturing the light source unit according to the twelfth embodiment is different in that the position of the secondary reflecting mirror with respect to the light source lamp 11 is adjusted so that the optimal amount of displacement between the respective electrodes 111A and the reflected images 111AM is obtained while picking the images of the pair of electrodes 111A in the light emitting section 111 and the reflected images 111AM of the respective electrodes 111A formed by the secondary reflecting mirror by the image pickup devices such as CCD without illuminating the light source lamp 11.

Figure 30:
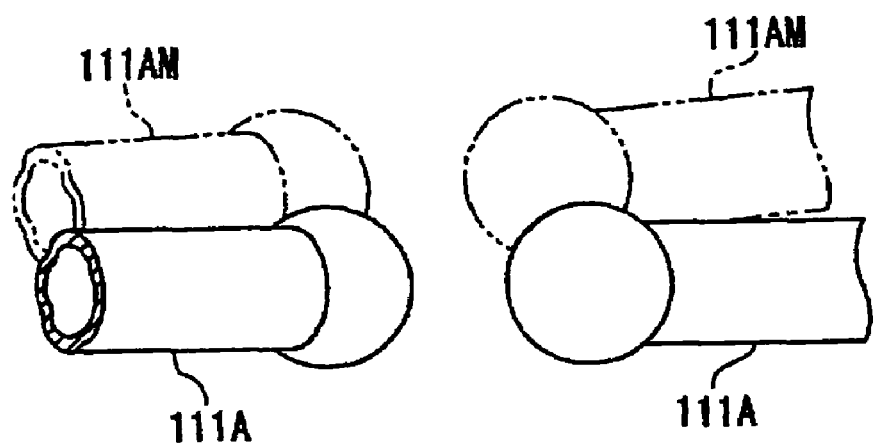
[FIG. 30]
Figure 30:
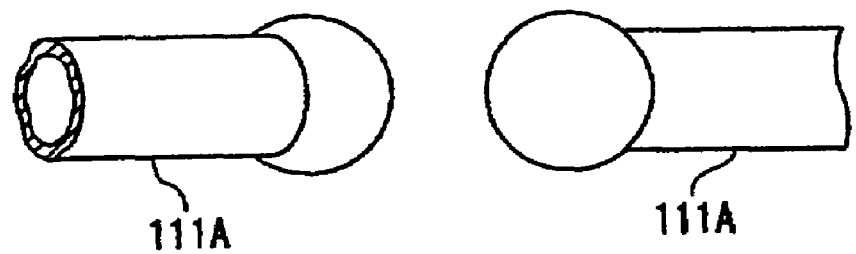
Figure 30:
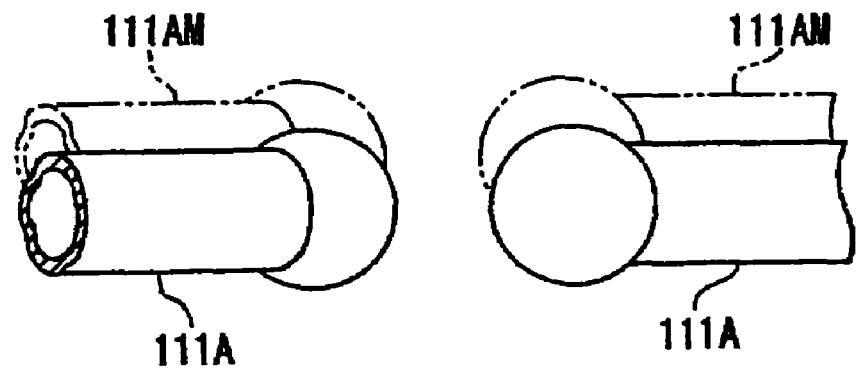

In other words, as shown in FIG. 30, the reflected images 111AM of the pair of electrodes 111A disposed at a distance from each other and the respective electrodes 111A formed by the secondary reflecting mirror are picked up by the image pickup devices, and then the picked up images is processed, and the position of the secondary reflecting mirror is adjusted while confirming the positions of the both electrode images 111A, 111AM.

Basically, the position of the secondary reflecting mirror 71 with respect to the light source lamp 11 is adjusted in the same manner as the manufacturing method according to the eleventh embodiment. However, instead of the steps of turning the light source lamp 11 on and determining whether or not the detected amount of displacement between the arc image D and the reflected arc image DM is the optimal amount of displacement, the steps of detecting the amount of displacement between the electrodes 111A and the reflected images 111AM without turning the light source lamp 11 on, and determining whether or not the amount of displacement is the optimal amount of displacement. The light source unit provided with other secondary reflecting mirrors in the aforementioned embodiments may be manufactured in the same manufacturing method.

As shown in FIG. 30(A), when the positions of the images of the electrodes 111A and the reflected images 111AM are too far from each other, the positions of the arc image D and the reflected arc image DM formed therebetween come apart too much correspondingly, and hence it is considered that the reflected arc image DM cannot be used as light from the light source efficiently.

Also, as shown in FIG. 30(B), when the positions of the images of the electrodes 111A and the reflected images 111AM are completely matched, the arc image D and the reflected arc image DM generated between the electrodes 111A are overlapped, thereby increasing plasma absorption.

Therefore, as shown in FIG. 30(C), the relative position where the images of the electrodes 111A and the reflected images 111AM are partly overlapped is determined to be the optimal amount of displacement and used as a criteria of determination of the position adjustment.

According to the present embodiment as described above, the following effects are achieved.

(29) Since the images of the electrodes 111A and the reflected images 111AM are picked up for adjusting the position, it is not necessary to turn the light source lamp on for adjusting the position, whereby the procedure may be simplified. In addition, since light is not emitted from the light source lamp, even when removing the light source unit from the manufacturing device, the respective portions of the manufacturing device such as the retaining frame are not heated and hence it can be removed quickly.

[13] Thirteenth Embodiment

Subsequently, a thirteenth embodiment will be described. In the description below, parts and members which have already been described are represented by the identical numerals and the description will be omitted or simplified.

According to the aforementioned twelfth embodiment, the images of the electrodes 111A and the reflected image 111AM of the electrodes 111A via the secondary reflecting mirror are picked up by the image pickup device, and based on the picked up images, the position of the secondary reflecting mirror with respect to the light source lamp 11 is adjusted so that the optimal amount of displacement between the electrodes 111A and the reflected images 111AM is achieved.

In contrast, the method of manufacturing the light source unit according to the thirteenth embodiment is different in that the position of the center O2 of light emission of the light emitting section 111 is obtained from the positions of the pair of electrodes, the position of the center O1 of the curvature of the spherical reflecting surface from the image of the reflecting surface of the secondary reflecting mirror, and based on these positions, the position of the secondary reflecting mirror with respect to the light source lamp 11 is adjusted so that the optimal amount of displacement between the center O1 of the curvature of the reflecting surface 131 and the center O2 of light emission is achieved.

Figure 31:
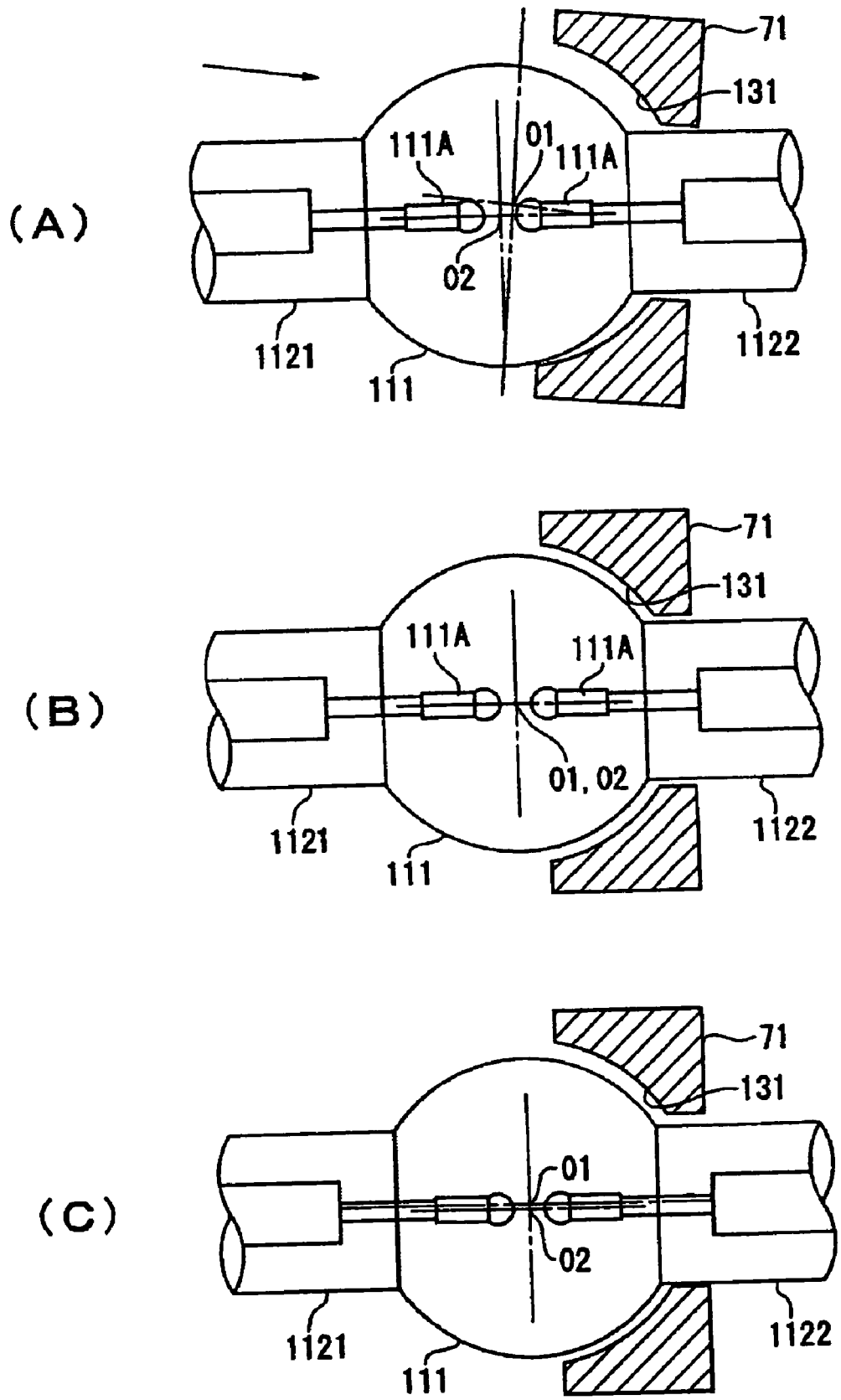
[FIG. 31]

In other words, according to the present embodiment, as shown in FIG. 31(A), the curved shape of the spherical reflecting surface 131 of the secondary reflecting mirror 71 is figured out, and based on the curved shape, the center O1 of the curvature of the reflecting surface 131 and then the center O2 of light emission is obtained from the positions of the pair of electrodes 111A, which are disposed apart from each other.

The center O1 of the curvature of the reflecting surface 131 can be obtained by figuring out the inner cross-sectional shape of the secondary reflecting mirror 71 using the X-ray analysis unit or the like, and processing the image of the arcuate cross section of the reflecting surface 131. Alternatively, the center O1 of the curvature can be obtained using the depth of the focal point, which is obtained by picking up the image of the reflecting surface 131 by the image pickup device such as CCD from the direction indicated by an arrow in FIG. 31(A).

The center O2 of light emission is determined by picking up the images of the pair of electrodes 111A by the image pickup devices such as CCD and performing the image processing thereon, and then obtaining the mid point between the electrodes 111A as the center O2 of the light emission.

Basically, it can be manufactured in the same procedure as the manufacturing method in the eleventh embodiment except that the center O1 of the curvature and the center O2 of light emission are to be obtained. However, instead of the steps of turning the light source lamp 11 on, detecting the amount of displacement between the arc image D and the reflected arc image DM, and determining whether or not the amount of displacement between the center O1 of the curvature of the reflecting surface 131 and the center O2 of light emission is the optimal amount of displacement without illuminating the light source lamp 11 instead of the step of determining whether or not the amount of displacement is the optimal. The light source unit provided with other types of secondary reflecting mirror in the aforementioned embodiments may be manufactured in the same manufacturing method.

Determination whether or not the amount of displacement of the center position is optimal or not is based on such idea that the center O1 of the curvature and the center O2 of light emission are too far as shown in FIG. 31(A), the arc image D and the reflected arc image DM are also apart from each other too much correspondingly, and hence the reflected arc image DM cannot be utilized efficiently as light from the light source. Also, as shown in FIG. 31(B), if the center O1 of the curvature and the center O2 of light emission are completely matched, there arises a fear that the temperature increases due to plasma absorption. Therefore, as shown in FIG. 31(C), the relative position in which it is estimated that the center O1 of the curvature and the center O2 of light emission are slightly displaced and the arc image D and the reflected arc image DM are partly overlapped is determined to be the amount of deviation of the optimal displacement.

(30) According to the thirteenth embodiment, in the same manner as the third embodiment, the secondary reflecting mirror 71 can be adhered and fixed to the light emitting section 111 of the light source lamp 11 without turning the light source lamp on.

[14] Modifications of Embodiments

The present invention is not limited to the aforementioned embodiments, and the following modifications shown below are also included.

The proximal end surface of the secondary reflecting mirror 74 in the aforementioned embodiments may be formed into an inclined surface extending along the maximum angle θ formed between the proximal side of the illumination axis A in the direction of emission of the luminous flux and the luminous flux emitted from the light emitting section 111 and directly entering the oval reflector 12 as in the first embodiment described above.

The inclined surface or the proximal end surface of the secondary reflecting mirror 13, 71, 73-79, 81-85 of the aforementioned embodiment may be formed into an inclined surface having an angle of inclination larger than that formed between the inclined surface matching the angle θ and the proximal (rear) side of the illumination axis A in the direction of emission of the luminous flux in the same manner as the proximal end surface 745 of the secondary reflecting mirror 74 in the second embodiment.

The tapered surface 726C may be formed at the meeting point between the outer peripheral surface or the distal end surface of the secondary reflecting mirror 13, 73-77, 78, 79, 82-85 in the aforementioned embodiments in the same manner as the second embodiment described above.

The notched grooves 761 or the grooves 771 may be formed on the ridge at the meeting point between the outer peripheral surface or the distal end surface of the secondary reflecting mirror 13, 71, 73-75, 78, 79, 82-85 and the adhering surface in the aforementioned embodiments, as in the third embodiment described above.

Masking may be performed on the adhering surface as in the fourth embodiment described above when depositing the dielectric multi-layer film on the reflecting surface of the secondary reflecting mirror 13, 71, 73-77, 78, 79, 82-85 in the aforementioned embodiments so that the dielectric multilayer film is prevented from being adhered on the adhering surface.

The adhering surface of the secondary reflecting mirror 13, 71, 73, 74, 76, 77, 79, 81, 85 in the aforementioned embodiment may be formed into a truncated conical shaped tapered surface gradually reducing in diameter from the outer peripheral surface or the distal end surface toward the reflecting surface as in the sixth embodiment described above.

The adhering surface of the secondary reflecting mirror 13, 71, 73-77, 79, 81, 83, 85 in the aforementioned embodiments may be formed with a shoulder having a surface continuing from the reflecting surface as in the seventh embodiment described above.

The adhering surface of the secondary reflecting mirror 13, 71, 73-76, 79, 81, 85 in the aforementioned embodiments may be formed into a truncated conical shaped tapered surface gradually reducing in diameter from the reflecting surface toward the outer peripheral surface or the distal end surface as in the eighth embodiment described above.

The adhering surface of the secondary reflecting mirror 13, 71, 73-78, 81-85 in the aforementioned embodiments may be machined to form concavity and convexity thereon as in the ninth embodiment described above.

The outer peripheral surface and/or the distal end surface of the secondary reflecting mirror 13, 71, 73-79, 81-84 in the aforementioned embodiments may be mirror polished so that the adhering surface can be seen through as in the tenth embodiment described above.

In the method of manufacturing the light source unit provided with the secondary reflecting mirror in the aforementioned first embodiment, the secondary reflecting mirror is fixed to the light source lamp 11 by applying the adhesive agent after the secondary reflecting mirror is adjusted to the optimal position. However, the present invention is not limited thereto, and it is also possible to employ a method of manufacturing a light source unit including the steps of applying the adhesive agent before adjusting the position of the secondary reflecting mirror and when the position of the secondary reflecting mirror is adjusted to the optimal position, curing the adhesive agent to fix the secondary reflecting mirror to the light source lamp 11, as in the case of the method of manufacturing the light source unit provided with the secondary reflecting mirror in the eleventh embodiment.

In the methods of manufacturing the light source unit provided with the secondary reflecting mirrors in the eleventh embodiment described above, the twelfth embodiment, and the thirteenth embodiment, the adhesive agent is applied before adjusting the position of the secondary reflecting mirror, and then after the secondary reflecting mirror is adjusted to the optimal position, the adhesive agent is cured to fix the secondary reflecting mirror to the light source lamp 11. However, the present invention is not limited thereto, and may employ the method of manufacturing the light source unit in which the adhesive agent is not applied before the position of the secondary reflecting mirror is adjusted and, after the secondary reflecting mirror is adjusted to the optimal position, the adhesive agent is applied to fix the secondary reflecting mirror to the light source lamp 11, in the same manner as the method of manufacturing the light source unit provided with the secondary reflecting mirror in the first embodiment.

Although only the example of the projector 1 using the three liquid crystal panels 42R, 42G, 42B is shown in the aforementioned embodiments, the present invention may be applied to a projector using only one liquid crystal panel, a projector using two liquid crystal panels, or a projector using four or more liquid crystal panels.

Although the liquid crystal panel in which translucency on the light incoming surface is different from that on the light outgoing surface is used in the aforementioned embodiments, a liquid crystal panel of reflecting type having the identical translucency on the light incoming surface and the light outgoing surface may be employed.

Although the liquid crystal panels 42R, 42G, 42B are employed as a light modulating unit in the aforementioned embodiments, the present invention is not limited thereto, and the present invention may be employed as the light source unit for illuminating a device which modulates light using a micro-mirror. In this case, the polarizing plates on the optical flux incoming side and the optical flux outgoing side may be omitted.

Although the light source unit of the present invention is employed in the projector provided with the light modulating unit in the aforementioned embodiments, the present invention is not limited thereto, and the light source unit of the present invention may be applied to other types of optical instrument.

Although only the example of a front-type projector which projects from the direction to view the screen is shown in the aforementioned embodiments, the present invention may be applied to a rear-type projector which projects in the opposite direction from the direction to view the screen.

The shapes of the secondary reflecting mirror describe in the aforementioned embodiments are simply examples, and other shapes are also possible as long as the contour thereof can be accommodated within the circular cone shown by lines connecting the second focal position of the oval reflector with the end of the sealed section of the arc tube.

Other detailed structures and shapes for implementing the present invention may be employed within the range in which the object of the present invention may be achieved.

The present invention may be used not only for a projector, but also for other types of optical instrument.

Figure 12:
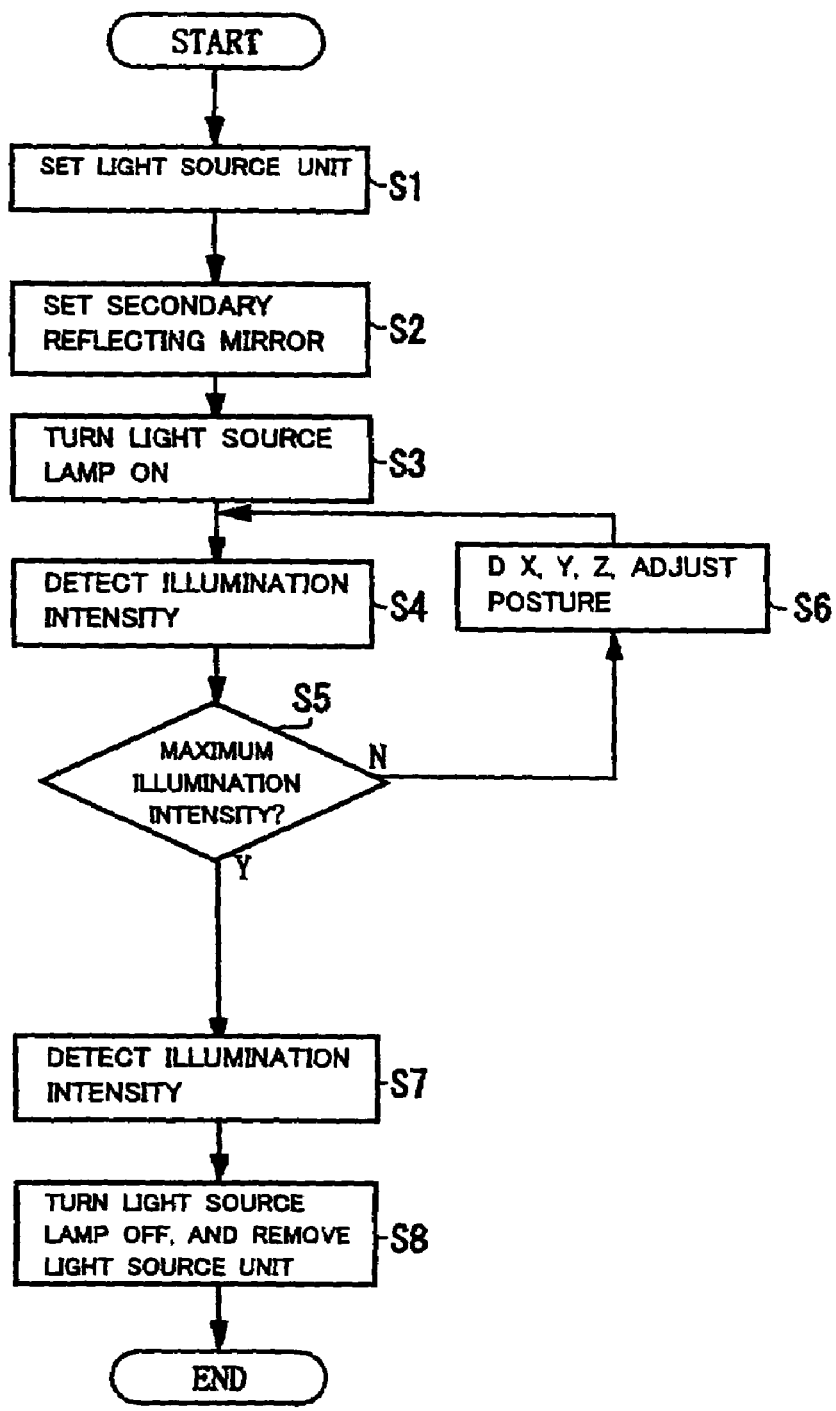
[FIG. 12]

[FIG. 12]
S1 SET LIGHT SOURCE UNIT
S2 SET SECONDARY REFLECTING MIRROR
S3 TURN LIGHT SOURCE LAMP ON
S4 DETECT ILLUMINATION INTENSITY
S5 MAXIMUM ILLUMINATION INTENSITY?
S6 X, Y, Z, ADJUST POSTURE
S7 APPLY/CURE ADHESIVE AGENT
S8 TURN LIGHT SOURCE LAMP OFF, AND REMOVE LIGHT SOURCE UNIT

Figure 27:
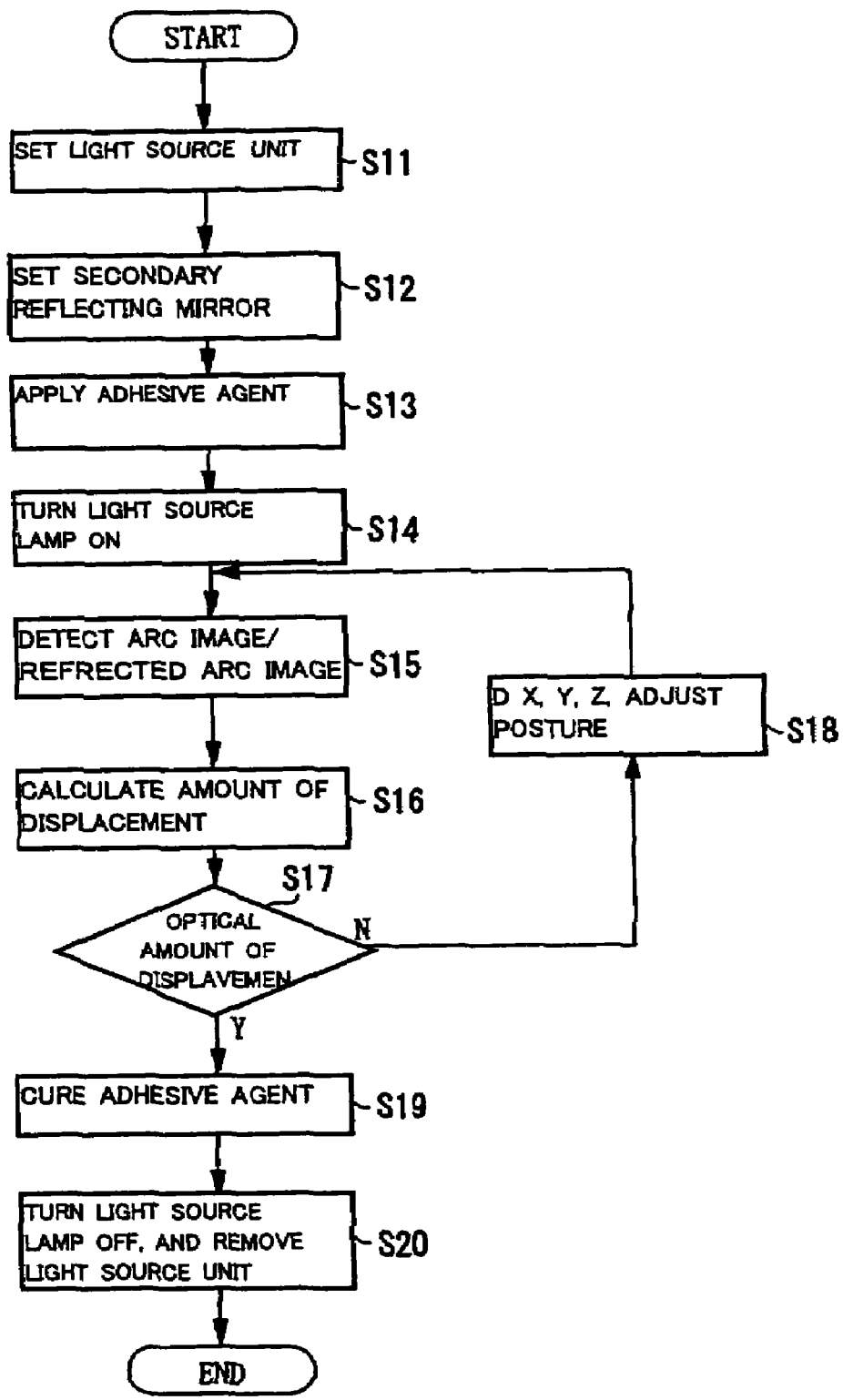
[FIG. 27]

[FIG. 27]
S11 SET LIGHT SOURCE UNIT
S12 SET SECONDARY REFLECTING MIRROR
S13 APPLY ADHESIVE AGENT
S14 TURN LIGHT SOURCE LAMP ON
S15 DETECT ARC IMAGE/REFLECTED ARC IMAGE
S16 CALCULATE AMOUNT OF DISPLACEMENT
S17 OPTIMAL AMOUNT OF DISPLACEMENT?
S18 X, Y, Z, ADJUST POSTURE
S19 CURE ADHESIVE AGENT
S20 TURN LIGHT SOURCE LAMP OFF, AND REMOVE LIGHT SOURCE UNIT

What is claimed is:

1. A light source unit, comprising:
an arc tube including, electrodes, sealed sections and a light emitting section in which discharging emission is performed between the electrodes and the sealed sections which are provided at both ends of the light emitting section, the light emitting section having a front side and a rear side;
an elliptic reflector including a reflecting surface to reflect a luminous flux radiated from the arc tube in a certain uniform direction; and
a secondary reflecting mirror having a reflecting surface disposed so as to oppose the reflecting surface of the elliptic reflector, covering the front side of the light emitting section, and reflecting the luminous flux radiated from the light emitting section toward the elliptic reflector,
the sealed sections being provided on the front side and the rear side of the light emitting section,
the secondary reflecting mirror being mounted on the front side sealed section of the arc tube as a separate member from the arc tube, and
the secondary reflecting mirror being provided with translucency so that an adhering surface can be seen from an outer peripheral surface.

2. The light source unit according to claim 1, the secondary reflecting mirror having an adhering surface opposing to an outer peripheral surface of the front side sealed section of the arc tube, and being fixed to the arc tube by applying an adhesive agent between the outer peripheral surface of the front side sealed section and the adhering surface.

3. The light source unit according to claim 2, the adhesive surface is not coated with a reflecting film to form the reflecting surface of the secondary reflecting mirror.

4. The light source unit according to claim 2, the adhesive agent being applied entirely between the outer peripheral surface of the front side sealed section and the adhering surface.

5. The light source unit according to claim 2, the adhesive agent being applied intermittently between the outer peripheral surface of the front side sealed section and the adhering surface.

6. A projector to form an optical image by modulating a luminous flux injected from a light source according to image information, and project it in an enlarged form, the light source unit according to claim 1 being provided.

7. The projector unit according to claim 6, the secondary reflecting mirror having an adhering surface opposing to an outer peripheral surface of the front side sealed section of the arc tube, and being fixed to the arc tube by applying an adhesive agent between the outer peripheral surface of the front side sealed section and the adhering surface.

8. The projector unit according to claim 7, the adhesive surface is not coated with a reflecting film to form the reflecting surface of the secondary reflecting mirror.

9. The projector unit according to claim 7, the adhesive agent being applied entirely between the outer peripheral surface of the front side sealed section and the adhering surface.

10. The projector unit according to claim 7, the adhesive agent being applied intermittently between the outer peripheral surface of the front side sealed section and the adhering surface.

* * * * *